US009317111B2

(12) United States Patent
Levien et al.

(10) Patent No.: US 9,317,111 B2
(45) Date of Patent: Apr. 19, 2016

(54) PROVIDING GREATER ACCESS TO ONE OR MORE ITEMS IN RESPONSE TO VERIFYING DEVICE TRANSFER

(75) Inventors: Royce A. Levien, Lexington, MA (US);
Richard T. Lord, Tacoma, WA (US);
Robert W. Lord, Seattle, WA (US);
Mark A. Malamud, Seattle, WA (US);
John D. Rinaldo, Jr., Bellevue, WA (US); Clarence T. Tegreene, Bellevue, WA (US)

(73) Assignee: Elwha, LLC, Bellevue, WA (US)

( * ) Notice: Subject to any disclaimer, the term of this patent is extended or adjusted under 35 U.S.C. 154(b) by 0 days.

(21) Appl. No.: 13/200,743

(22) Filed: Sep. 28, 2011

(65) Prior Publication Data

US 2012/0254988 A1 Oct. 4, 2012

Related U.S. Application Data

(63) Continuation-in-part of application No. 13/065,885, filed on Mar. 30, 2011, and a continuation-in-part of application No. 13/065,964, filed on Mar. 31, 2011, and a continuation-in-part of application No.

(Continued)

(51) Int. Cl.
*G06F 3/01* (2006.01)
*G06F 3/0346* (2013.01)

(52) U.S. Cl.
CPC .............. *G06F 3/011* (2013.01); *G06F 3/0346* (2013.01)

(58) Field of Classification Search
CPC . G06F 3/17; G06F 3/0346; G06F 2221/2111; G06F 21/32

USPC ..................................... 726/19; 455/411, 557
See application file for complete search history.

(56) References Cited

U.S. PATENT DOCUMENTS

| 5,875,257 | A | 2/1999 | Marrin et al. |
| 6,002,427 | A | 12/1999 | Kipust |
| 6,128,003 | A | 10/2000 | Smith et al. |
| 6,804,699 | B1 | 10/2004 | Henrie |
| 6,961,912 | B2 | 11/2005 | Aoki et al. |
| 7,190,351 | B1 | 3/2007 | Goren |
| 7,200,248 | B2 | 4/2007 | Horiguchi |
| 7,236,156 | B2 | 6/2007 | Liberty et al. |
| 7,260,726 | B1 | 8/2007 | Doe et al. |
| 7,437,765 | B2 | 10/2008 | Elms et al. |

(Continued)

OTHER PUBLICATIONS

Nadeem, "Application specific study, analysis and classification of body area wireless sensor network application", Mar. 2015, Computer Networks, p. 363-380.*

(Continued)

*Primary Examiner* — Taghi Arani
*Assistant Examiner* — Gregory Lane

(57) ABSTRACT

A computationally implemented method includes, but is not limited to: acquiring one or more indicators that suggest that a computing device has been transferred to a first user from a second user, the first user having at least greater accessing rights than the second user to one or more items via the computing device; detecting, in response to said acquiring, input that verifies that the computing device has been transferred to the first user; and providing at least greater access via the computing device to the one or more items in response to detecting the input verifying that the computing device has been transferred to the first user. In addition to the foregoing, other method aspects are described in the claims, drawings, and text forming a part of the present disclosure.

44 Claims, 22 Drawing Sheets

Related U.S. Application Data

13/066,848, filed on Apr. 25, 2011, now Pat. No. 8,402,535, and a continuation-in-part of application No. 13/066,917, filed on Apr. 26, 2011, now Pat. No. 8,347,399, and a continuation-in-part of application No. 13/135,314, filed on Jun. 29, 2011, and a continuation-in-part of application No. 13/135,392, filed on Jun. 30, 2011, and a continuation-in-part of application No. 13/199,237, filed on Aug. 22, 2011, and a continuation-in-part of application No. 13/199,286, filed on Aug. 23, 2011.

(56) References Cited

U.S. PATENT DOCUMENTS

| Number | Kind | Date | Name | Ref |
|---|---|---|---|---|
| 7,649,444 | B1 | 1/2010 | Fear et al. | |
| 7,774,486 | B2 | 8/2010 | Clarke | |
| 7,868,778 | B2 | 1/2011 | Kenwright | |
| 8,279,242 | B2 | 10/2012 | Bentley | |
| 8,289,130 | B2 | 10/2012 | Nakajima et al. | |
| 8,406,162 | B2 | 3/2013 | Haupt et al. | |
| 8,479,122 | B2 | 7/2013 | Hotelling et al. | |
| 2002/0126876 | A1 | 9/2002 | Paul et al. | |
| 2002/0176603 | A1 | 11/2002 | Bauer et al. | |
| 2003/0016253 | A1 | 1/2003 | Aoki et al. | |
| 2003/0107584 | A1 | 6/2003 | Clapper | |
| 2005/0039027 | A1 | 2/2005 | Shapiro | |
| 2005/0149726 | A1 | 7/2005 | Joshi et al. | |
| 2006/0052132 | A1 | 3/2006 | Naukkarinen et al. | |
| 2006/0277474 | A1 | 12/2006 | Robarts et al. | |
| 2007/0005616 | A1 | 1/2007 | Hay et al. | |
| 2007/0030824 | A1 | 2/2007 | Ribaudo et al. | |
| 2007/0042714 | A1* | 2/2007 | Ayed | 455/41.2 |
| 2007/0052672 | A1 | 3/2007 | Ritter et al. | |
| 2007/0118604 | A1* | 5/2007 | Costa Requena | 709/206 |
| 2007/0150827 | A1 | 6/2007 | Singh et al. | |
| 2007/0162574 | A1 | 7/2007 | Williamson et al. | |
| 2007/0174633 | A1 | 7/2007 | Draper et al. | |
| 2007/0222771 | A1 | 9/2007 | Brask et al. | |
| 2007/0234209 | A1 | 10/2007 | Williams | |
| 2007/0247425 | A1 | 10/2007 | Liberty et al. | |
| 2007/0259685 | A1 | 11/2007 | Engblom et al. | |
| 2008/0159496 | A1 | 7/2008 | Brown | |
| 2008/0201783 | A1 | 8/2008 | Tamai | |
| 2008/0233996 | A1* | 9/2008 | Ogasawara et al. | 455/550.1 |
| 2008/0266089 | A1 | 10/2008 | Haren et al. | |
| 2008/0271109 | A1 | 10/2008 | Singh et al. | |
| 2009/0005079 | A1 | 1/2009 | Shields et al. | |
| 2009/0006962 | A1 | 1/2009 | Ives et al. | |
| 2009/0015425 | A1 | 1/2009 | Palmqvist et al. | |
| 2009/0179765 | A1 | 7/2009 | Nymark et al. | |
| 2009/0210932 | A1 | 8/2009 | Balakrishnan et al. | |
| 2009/0239587 | A1 | 9/2009 | Negron et al. | |
| 2009/0240569 | A1 | 9/2009 | Ramer et al. | |
| 2009/0253410 | A1* | 10/2009 | Fitzgerald et al. | 455/411 |
| 2009/0292930 | A1 | 11/2009 | Marano et al. | |
| 2009/0297064 | A1 | 12/2009 | Koziol et al. | |
| 2010/0042827 | A1 | 2/2010 | Pratt et al. | |
| 2010/0053322 | A1 | 3/2010 | Marti et al. | |
| 2010/0124363 | A1 | 5/2010 | Ek et al. | |
| 2010/0157135 | A1 | 6/2010 | Dossaji et al. | |
| 2010/0167783 | A1 | 7/2010 | Alameh et al. | |
| 2010/0180210 | A1 | 7/2010 | Toyama et al. | |
| 2010/0222141 | A1 | 9/2010 | LaSalvia et al. | |
| 2010/0235667 | A1 | 9/2010 | Mucignat et al. | |
| 2010/0245042 | A1 | 9/2010 | Tsubaki | |
| 2010/0275159 | A1 | 10/2010 | Matsubara et al. | |
| 2011/0025842 | A1 | 2/2011 | King et al. | |
| 2011/0069940 | A1 | 3/2011 | Shimy et al. | |
| 2011/0072452 | A1 | 3/2011 | Shimy et al. | |
| 2011/0083109 | A1 | 4/2011 | Hildebrandt et al. | |
| 2011/0093806 | A1 | 4/2011 | Cohen et al. | |
| 2011/0107427 | A1 | 5/2011 | Cohen et al. | |
| 2011/0110557 | A1 | 5/2011 | Clark et al. | |
| 2011/0133908 | A1 | 6/2011 | Leung | |
| 2011/0141011 | A1 | 6/2011 | Lashina et al. | |
| 2011/0154266 | A1 | 6/2011 | Friend et al. | |
| 2011/0166972 | A1* | 7/2011 | Cohen et al. | 705/34 |
| 2011/0175822 | A1* | 7/2011 | Poon et al. | 345/173 |
| 2011/0197121 | A1 | 8/2011 | Kletter | |
| 2011/0202269 | A1 | 8/2011 | Reventlow | |
| 2011/0219340 | A1 | 9/2011 | Pathangay et al. | |
| 2011/0227856 | A1 | 9/2011 | Corroy et al. | |
| 2011/0231911 | A1 | 9/2011 | White et al. | |
| 2011/0241827 | A1 | 10/2011 | Varoglu | |
| 2011/0265179 | A1 | 10/2011 | Newman et al. | |
| 2011/0283241 | A1* | 11/2011 | Miller et al. | 715/863 |
| 2011/0317872 | A1 | 12/2011 | Free | |
| 2011/0321143 | A1 | 12/2011 | Angaluri et al. | |
| 2012/0017147 | A1 | 1/2012 | Mark | |
| 2012/0028625 | A1 | 2/2012 | Konig | |
| 2012/0062729 | A1 | 3/2012 | Hart et al. | |
| 2012/0081392 | A1* | 4/2012 | Arthur | 345/633 |
| 2012/0088543 | A1 | 4/2012 | Lindner et al. | |
| 2012/0108215 | A1 | 5/2012 | Kameli | |
| 2012/0124456 | A1 | 5/2012 | Perez et al. | |
| 2012/0131471 | A1 | 5/2012 | Terlouw et al. | |
| 2012/0151339 | A1 | 6/2012 | Zhang et al. | |
| 2012/0166966 | A1 | 6/2012 | Wood et al. | |
| 2012/0172085 | A1* | 7/2012 | Vuppu et al. | 455/556.1 |
| 2012/0191764 | A1 | 7/2012 | Leibu et al. | |
| 2012/0235790 | A1 | 9/2012 | Zhao et al. | |
| 2012/0256967 | A1 | 10/2012 | Baldwin et al. | |
| 2012/0293528 | A1 | 11/2012 | Larsen | |
| 2012/0299876 | A1 | 11/2012 | De Leon et al. | |
| 2012/0311438 | A1 | 12/2012 | Cranfill et al. | |
| 2012/0330660 | A1 | 12/2012 | Jaiswal | |
| 2013/0065608 | A1 | 3/2013 | Nakajima et al. | |
| 2013/0159939 | A1 | 6/2013 | Krishnamurthi | |

OTHER PUBLICATIONS

Hughes, Neil; "Apple Exploring Face Detection to Unlock, Customize & Interact with iOS Devices"; bearing a date of Apr. 5, 2012; pp. 1-4; AppleInsider; http://www.appleinsider.com/articles/12/04/05/apple_exploring_face_detection_to_unlock_customize_interact_with_ios_devices.html.

"Computer Detecting User Presence Video Mockup [Ubuntu]"; Web Upd8.org; Bearing a date of Sep. 14, 2010; pp. 1-11; located at: http://www.webupd8.org/2010/09/computer-cletecting-user-presence-video.html; printed on Mar. 30, 2011.

"How do I detect when a user is sitting in the chair in front of a computer?"; Superuser.com; Bearing a date of Aug. 11, 2009; 5 Total pages; located at: http://superuser.com/questions/21364/how-do-i-detect-when-a-user-is-sitting-in-the-chair-in-front-of-a-computer.

Pike, John; "Homeland Security: Biometrics"; GlobalSecurity.org; Bearing a date of Mar. 9, 2007; 4 Total pages; located at: http://www.globalsecurity.org/security/systems/biometrics.htm.

U.S. Appl. No. 13/374,479, Levien et al.
U.S. Appl. No. 13/374,352, Levien et al.
U.S. Appl. No. 13/374,213, Levien et al.
U.S. Appl. No. 13/374,083, Levien et al.
U.S. Appl. No. 13/373,796, Levien et al.
U.S. Appl. No. 13/373,679, Levien et al.
U.S. Appl. No. 13/317,832, Levien et al.
U.S. Appl. No. 13/317,827, Levien et al.
U.S. Appl. No. 13/200,800, Levien et al.
U.S. Appl. No. 13/199,286, Levien et al.
U.S. Appl. No. 13/199,237, Levien et al.
U.S. Appl. No. 13/135,392, Levien et al.
U.S. Appl. No. 13/135,314, Levien et al.
U.S. Appl. No. 13/066,917, Levien et al.
U.S. Appl. No. 13/066,848, Levien et al.
U.S. Appl. No. 13/065,964, Levien et al.
U.S. Appl. No. 13/065,885, Levien et al.

(56) References Cited

OTHER PUBLICATIONS

Kernchen et al.; "Multimodal user interfaces for context-aware mobile applications"; IEEE 16$^{th}$ International Symposium on Personal, Indoor and Mobile Radio Communications; bearing a date of Mar. 20, 2005; pp. 2268-2273; #1568961325; IEEE.

Noll et al.; "Integrating Mobile Devices into Semantic Services Environments"; The Fourth International Conference on Wireless and Mobile Communications; bearing a date of Mar. 4, 2008; pp. 137-143; IEEE Computer Society.

Kionix et al.; "Screen Rotation and Device Orientation"; AN 011; May 21, 2007; pp. 1-6; Kionix, Inc.

* cited by examiner

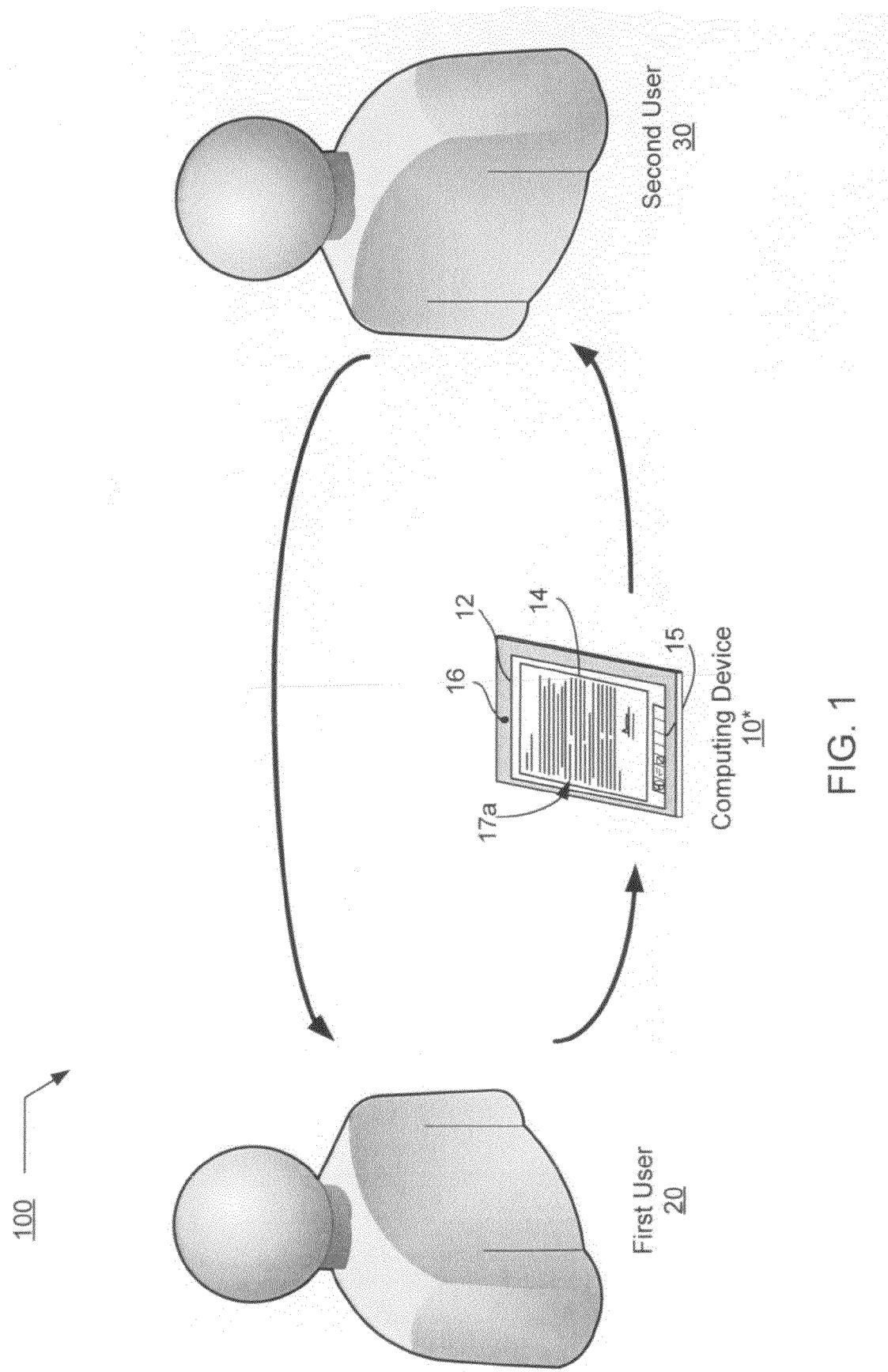

PROVIDING GREATER ACCESS TO ONE OR MORE ITEMS IN RESPONSE TO VERIFYING DEVICE TRANSFER

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

For purposes of the USPTO extra-statutory requirements, the present application constitutes a continuation-in-part of U.S. patent application Ser. No. 13/065,885, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 30 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/065,964, entitled ACCESS RESTRICTION IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 31 Mar. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,848, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 25 Apr. 2011, now U.S. Pat No. 8402535 which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/066,917, entitled PROVIDING GREATER ACCESS TO ONE OR MORE ITEMS IN RESPONSE TO DETERMINING DEVICE TRANSFER, naming Royce A. Levien; Richard T. Lord; Robert W. Lord; Mark A. Malamud; John D. Rinaldo, Jr.; Clarence T. Tegreene as inventors, filed 26 Apr. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,314, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 29 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/135,392, entitled PROVIDING PARTICULAR LEVEL OF ACCESS TO ONE OR MORE ITEMS IN RESPONSE TO DETERMINING PRIMARY CONTROL OF A COMPUTING DEVICE, naming Royce A. Levien; Richard T. Lord; Robert W. Lord; Mark A. Malamud; John D. Rinaldo, Jr.; Clarence T. Tegreene as inventors, filed 30 Jun. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,237, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 22 Aug. 2011, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/199,286, entitled SELECTIVE ITEM ACCESS PROVISION IN RESPONSE TO ACTIVE ITEM ASCERTAINMENT UPON DEVICE TRANSFER, naming Royce A. Levien; Richard T. Lord; Robert W. Lord; Mark A. Malamud; John D. Rinaldo, Jr.; Clarence T. Tegreene as inventors, filed 23 Aug. 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, *Benefit of Prior-Filed Application*, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

SUMMARY

A computationally implemented method includes, but is not limited to acquiring one or more indicators that suggest that a computing device has been transferred to a first user from a second user, the first user having at least greater accessing rights than the second user to one or more items via the computing device; detecting, in response to said acquiring, input that verifies that the computing device has been transferred to the first user, wherein said detecting, in response to said acquiring, input that verifies that the computing device has been transferred to the first user is performed via at least one of a machine, article of manufacture, or composition of matter; and providing at least greater access via the computing device to the one or more items in response to detecting the input verifying that the computing device has been transferred to the first user. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware in one or more machines or article of manufacture configured to effect the herein-referenced method aspects depending upon the design choices of the system designer.

A computationally implemented system includes, but is not limited to: means for acquiring one or more indicators that suggest that a computing device has been transferred to a first user from a second user, the first user having at least greater accessing rights than the second user to one or more items via the computing device; means for detecting, in response to said acquiring, input that verifies that the computing device has been transferred to the first user; and means for providing at least greater access via the computing device to the one or more items in response to detecting the input verifying that the computing device has been transferred to the first user. In addition to the foregoing, other system aspects are described in the claims, drawings, and text forming a part of the present disclosure.

A computationally implemented system includes, but is not limited to: circuitry for acquiring one or more indicators that suggest that a computing device has been transferred to a first user from a second user, the first user having at least greater accessing rights than the second user to one or more items via the computing device; circuitry for detecting, in response to said acquiring, input that verifies that the computing device has been transferred to the first user; and circuitry for providing at least greater access via the computing device to the one or more items in response to detecting the input verifying that the computing device has been transferred to the first user. In addition to the foregoing, other system aspects are described in the claims, drawings, and text forming a part of the present disclosure.

A computer program product comprising an article of manufacture including a non-transitory storage medium bearing one or more instructions for acquiring one or more indicators that suggest that a computing device has been transferred to a first user from a second user, the first user having at least greater accessing rights than the second user to one or more items via the computing device; one or more instructions for detecting, in response to said acquiring, input that verifies that the computing device has been transferred to the first user; and one or more instructions for providing at least greater access via the computing device to the one or more items in response to detecting the input verifying that the computing device has been transferred to the first user. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 shows a computing device 10* being transferred between two users in an exemplary environment 100.

DETAILED DESCRIPTION

Figure 2A:
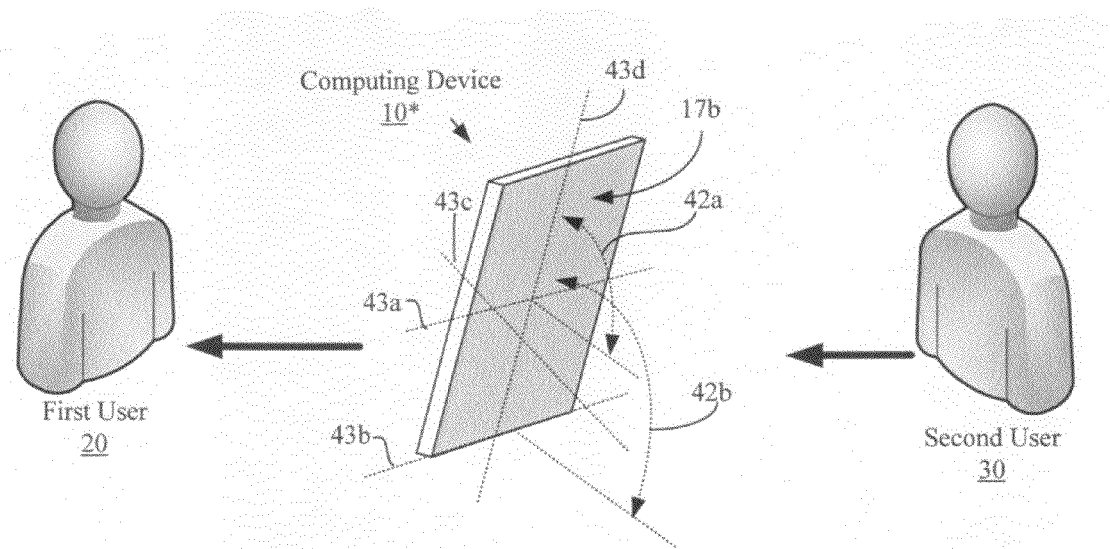
FIG. 2a shows one type of movement of the computing device 10* of FIG. 1 that may be directly detected/monitored by the computing device 10*.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Advances in computing technologies and related technologies (e.g., visual display technology, battery technology, etc.) in recent years have resulted in the development of computing devices that have increasingly smaller and smaller form factors while still maintaining exceptional processing capabilities. Examples of such computing devices include, for example, laptops, Netbooks, tablet computers (i.e., "slate" computers), e-readers, Smartphones, and so forth. Because of their compactness, such devices are becoming much easier to share among multiple users. That is, because of their small form factors, such devices allow users of such devices to easily pass or handoff their devices for others to use in order to access various items (e.g., documents, files, applications, and so forth). For example, suppose a primary user (e.g., an owner) of a tablet computer wants to show an image (e.g., a digital photograph) that is being displayed through his/her tablet computer to a friend sitting across a table from the primary user. Typically, in order to show the image that is being displayed through the tablet computer to the friend, the primary user may simply pass or handover the tablet computer to the friend thereby allowing the friend to view the electronic document.

Unfortunately by doing so, the primary user's friend, in addition to having access to the image, may have access to many other things that the primary user may not want the friend to have access to. For example, upon being handed the tablet computer, the friend may be able to view any confidential documents, image or audio files, applications, websites, passwords, and so forth, that may be open or running at the time that the tablet computer was handed over to the friend. Even worse, the primary user's friend may be able to not just access open applications and content, but may be able to retrieve/use/modify any content (e.g., documents, image files, audio files, etc.) or applications that may be accessible to the primary user through the tablet computer.

In accordance with various embodiments, computationally implemented methods, systems, and articles of manufacture are provided that can provide greater or lesser accessibility via a computing device (e.g., a tablet computer, a Smartphone, a laptop computer, or other types of portable computer device) to one or more items (e.g., electronic documents, files, image or audio files, applications, passwords, and so forth) depending upon whether the computing device, which may be associated with a first user (e.g., a user such as the primary user or owner of the computing device who can be identified by the computing device, such as by facial recognition system or voice recognition application, and who is recognized by the computing device as having superior access rights to the computing device and/or to items stored in the computing device), has been transferred from the first user to a second user (e.g., a third party who has inferior rights to access the one or more items than the first user) or whether the computing device has been transferred from the second user to the first user.

For example, if the computing device is being transferred from the first user to the second user, access to one or more electronic items (herein simply "items") through the computing device may be restricted. On the other hand, if the computing device is being returned from the second user to the first user, then greater access may be provided to the one or more items. At this time it should be noted that in cases where a computing device is being returned to the first user (e.g., a primary user of the computing device) from a second user (e.g., a third party having lower access rights to the computing device or to one or more items accessible through the computing device), a heighten level of proof that the computing device has been transferred back to the first user may be required since greater access is to be provided to the one or more items (which could include personal and/or confidential items).

In various embodiments, the computationally implemented methods, systems, and articles of manufacture may be designed to automatically determine whether a computing device that is associated with a first user (e.g., a user with superior access rights to the computing device and/or to one or more items that are accessible through the computing device) has been transferred from the first user to a second user (e.g., a third party having inferior access rights than the first user to the computing device and/or to the one or more items); and in response to determining that the computing device has indeed been transferred from the first user to the second user, automatically configure the computing device to restrict access to one or more items (e.g., documents, files, image or audio files, applications, passwords, and so forth) that may have been accessible to the first user when the first user was in possession of the computing device.

Additionally or alternatively, the computationally implemented methods, systems, and articles of manufacture, in some embodiments, may be designed to, among other things, acquire one or more indicators that suggest that the computing device has been transferred to the first user from the second user, the first user having at least greater accessing rights than the second user to the one or more items via the computing device. In some cases, the one or more indicators that may be acquired may be acquired as part of an automatic monitoring operation executed by the computing device that monitors various aspects of the computing device as well as the surrounding environment in order to determine whether computing device has been transferred between users (e.g., from the first user to the second user or from the second user to the first user). As will be further described herein one or more aspects of the computing device/environment may be monitored in order to at least infer that the computing device has been transferred between two users (e.g., the first user and the second user). These aspects that may be monitored include, for example, the direct movements of the computing device as detected by, for example, a movement sensor such as an accelerometer, visual cues such as a face or an eye as detected by an image capturing device such as a camera, and/or audio cues such as a voice pattern as detected by an audio capturing device such as a microphone.

Unfortunately, in cases where the computing device is being transferred from the second user (e.g., a user with inferior accessing rights to the computing device and/or to items stored in the computing device) to the first user (e.g., a user with superior accessing rights to the computing device and/or items stored in the computing device), the initial data provided through such detection means (detected movements of the computing device, visual cues, and/or audio cues) may be insufficient to satisfy the higher standard of proof that may be required in order to conclude that the computing device has indeed been transferred to the first user. That is, higher requirements of proof may be needed under these conditions since restrictions to access to one or more items through the computing device may be eased if the computing device is determined to be in the possession of the first user (e.g., a primary user of the computing device). For example, the monitoring of the movements of the computing device, by itself, may not be conclusive evidence that the computing device has been transferred back to the first user. Similarly, there are many situations where initially detected visual cues or audio cues may be insufficient to conclusively determine that the computing device has been transferred from the second user to the first user (e.g., if the first user's face or eye is not clearly visible to the camera of the computing device).

Thus, in order to correctly determine that the computing device indeed has been transferred to the first user, the computationally implemented methods, systems, and articles of manufacture may also be designed to detect, in response to acquiring one or more indicators that suggest that the computing device has been transferred to the first user from the second user, input that verifies that the computing device has been transferred to the first user. In some embodiments, the detection of such input data may involve soliciting for such input data. As will be further described herein, the input data (or simply "input") that may be solicited may be one or more types of input data (e.g., biometric data, user entry, gestures, and so forth). The input that may be detected and/or solicited may be the same or different type or types of data that were initially acquired during the monitoring phase described above. In cases where the same type of data is being solicited, the solicitation may merely be for better quality data (e.g., better visual or audio data). For example, if a facial recognition application is used to at least infer the presence of the first user in the vicinity of the computing device, and if the initial data that was collected to infer that the computing device has been transferred to the first user was based on an image that captured only a portion of the first user's face being in "front" of the computing device, then the solicitation may be for the first user to provide a better view of his/her face to the camera of the computing device) so that a more accurate verification can be made that the computing device has indeed been transferred to the first user (e.g., first user has possession of the computing device).

Upon detecting the input that verifies that the computing device has been transferred to the first user, the computationally implemented methods, systems, and articles of manufacture may be designed to provide at least greater access via the computing device to the one or more items. In various embodiments, the computationally implemented methods, systems, and articles of manufacture may be implemented at the computing device.

Referring now to FIG. 1 illustrating a computing device 10* in an exemplary environment 100 being transferred back-and-forth between two users. In particular, FIG. 1 shows a computing device 10* being transferred from a first user 20 to a second user 30, and from the second user 30 back to the first user 20. For purposes of the following description, the first user 20 will be a user, such as the primary user or owner of the computing device 10*, who the computing device 10* or the logic endowed with the computing device 10* can identify and who the computing device 10* (or its logic) recognizes as having superior access rights than others (e.g., the second user 30) to the computing device 10* and/or to one or more items (e.g., documents, image or audio files, applications, passwords, etc.) that may be stored/available through the computing device 10*. In contrast, the second user 30 may be any third party who has inferior access rights than the first user 20 to the computing device 10* and/or to the one or more items.

As will be further described herein, the illustrated computing device 10* may employ the computationally implemented methods, systems, and articles of manufacture in accordance with various embodiments. In particular, the computing device 10* may be endowed with logic that is designed to determine that the computing device 10* is being or has been transferred (e.g., handed or passed-off) from a first user 20 to a second user 30, and in response to such a determination, automatically restrict access to one or more items (e.g., electronic documents, image or audio files, passwords, applications, and so forth) that may have been accessible to the first user 20 when the first user 20 had possession of the computing device 10*.

The endowed logic may alternatively or additionally be designed to, upon the computing device 10* being transferred from the second user 30 (e.g., a user recognized by the computing device 10* as having inferior access rights) to the first user 20 (e.g., a user recognized by the computing device 10* as having superior access rights), acquire one or more indicators that when processed infer or suggest that the computing device 10* has been transferred to the first user 20 from the second user 30; solicit, in response to acquiring the one or more indicators, input that verifies that the computing device 10* has been transferred to the first user 20, and in response to receiving the input that verifies that the computing device 10* has been transferred to the first user 20 automatically provide at least greater access to the one or more items than the access that was allowed to the one or more items when the computing device 10* was in possession of the second user 30. Note that in some embodiments a computing device 10* may be in the possession of a user (e.g., the first user 20 or the second user 30) when the respective user has some control over the computing device 10* such as by holding the computing device 10*, by being in physical contact with the computing device 10*, by being physically closer to the computing device 10* than anyone else, or by being in a specific location with respect to the specific orientation of the computing device 10* (e.g., being located centered on the front side 17a (e.g., display side) of the computing device 10*.

In some embodiments, and for purposes of the following description, the first user 20 may be any user who has superior access rights than other users (e.g., second user 30) to the computing device 10* and/or to items (e.g., documents, images, applications, etc.) stored in the computing device 10*. Examples of a first user 20 include, for example, a primary user, such as the owner, of the computing device 10*. In contrast, a second user 30 for purposes of the following description may be any third party who has inferior access rights than the first user 20 to the computing device 10* and/or to the items that may be accessed via the computing device 10*. As will be further described herein, note that FIGS. 3a and 3b illustrate two different implementations of the computing device 10* of FIG. 1 illustrated in FIG. 3a as computing device 10' and in FIG. 3b as computing device 10".

Figure 2B:
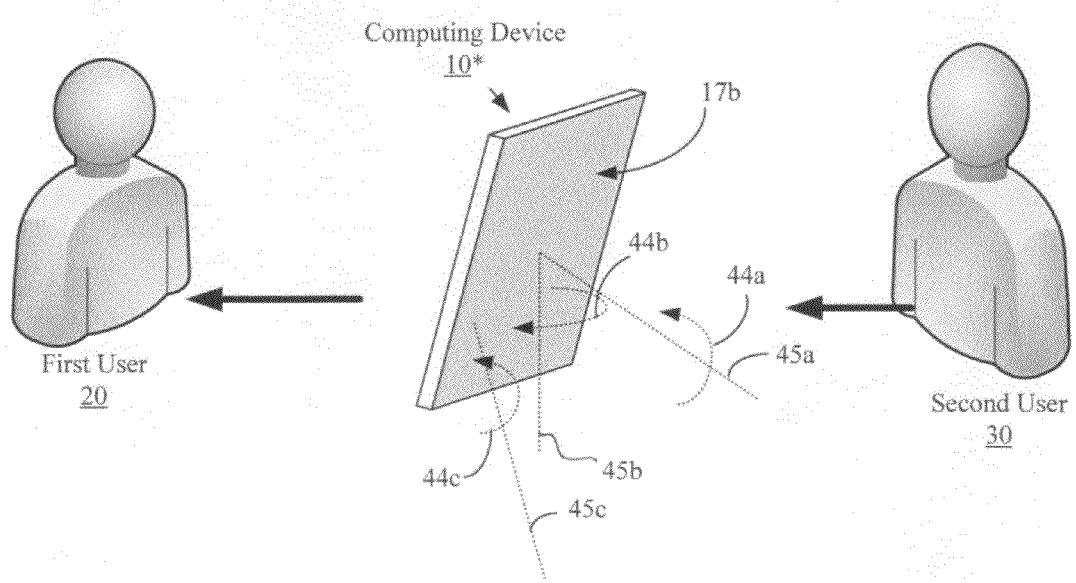
FIG. 2b shows another type of movement of the computing device 10* of FIG. 1 that may be directly detected/monitored by the computing device 10*.
Figure 2C:
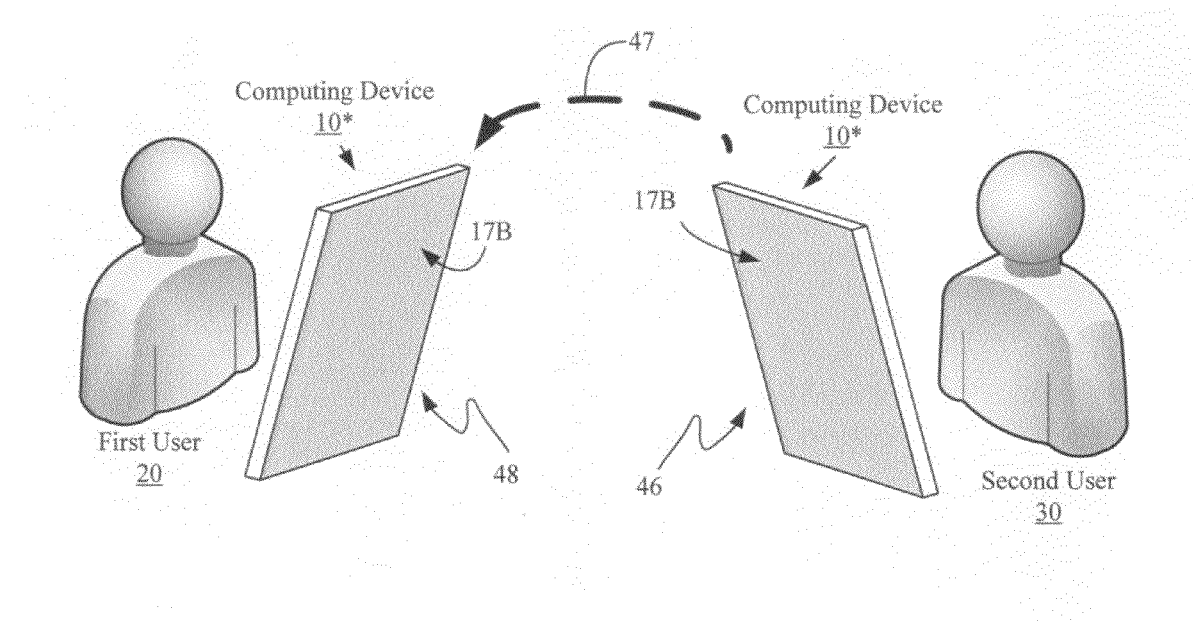
FIG. 2c shows another type of movement of the computing device 10* of FIG. 1 that may be directly detected/monitored by the computing device 10*.
Figure 2D:
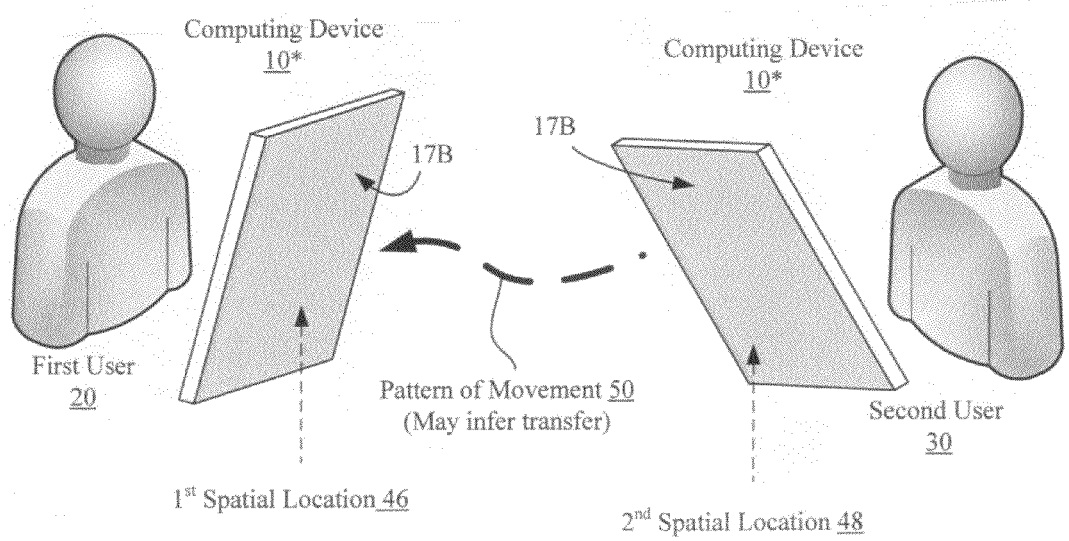
FIG. 2d shows overall 3-dimensional movements of the computing device 10* of FIG. 1 that may be directly detected/monitored by the computing device 10*.
Figure 2E:
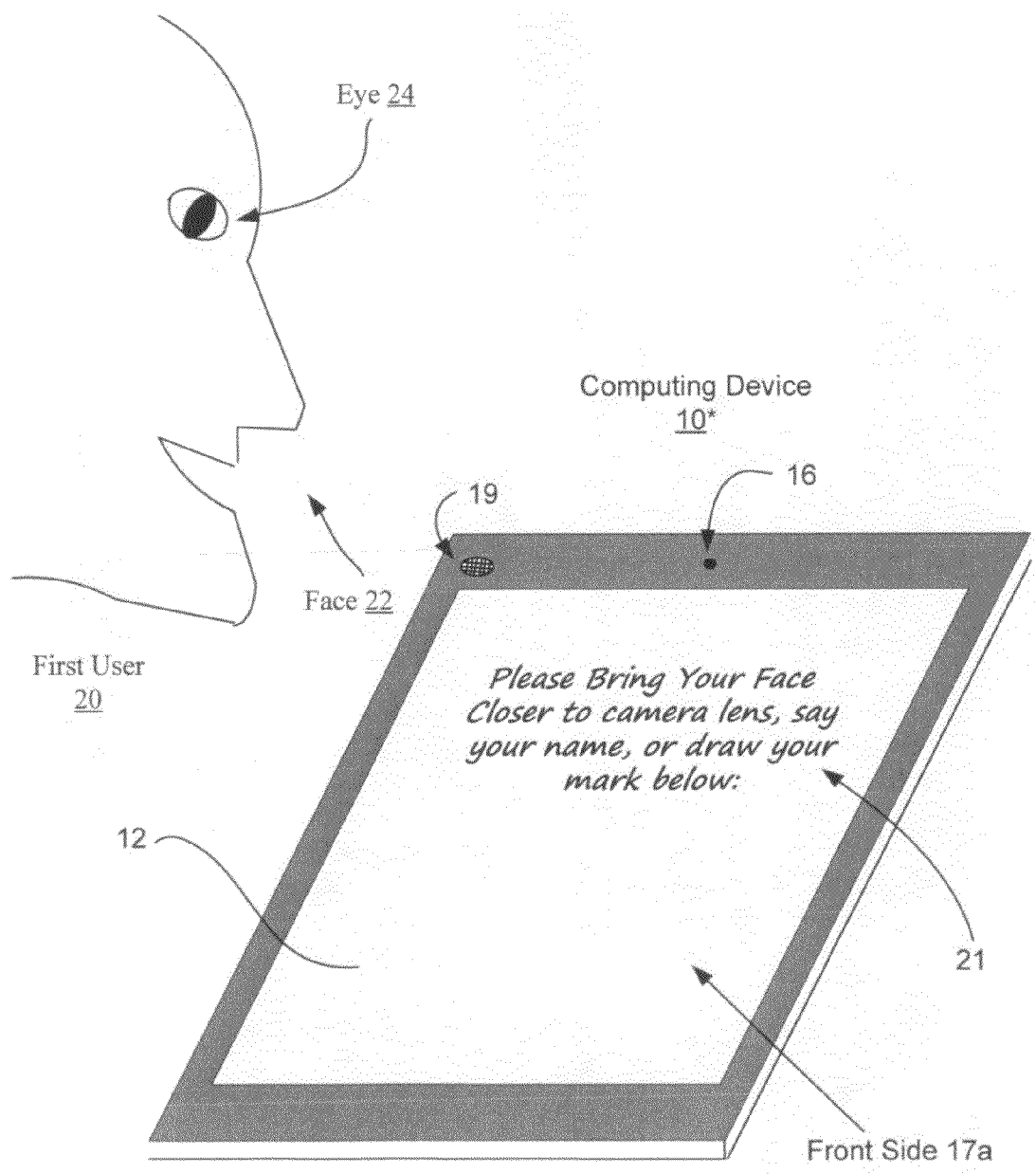
FIG. 2e shows the computing device 10* of FIG. 1 near the face and eye of the first user 20 illustrated in FIG. 1.
Figure 3A:
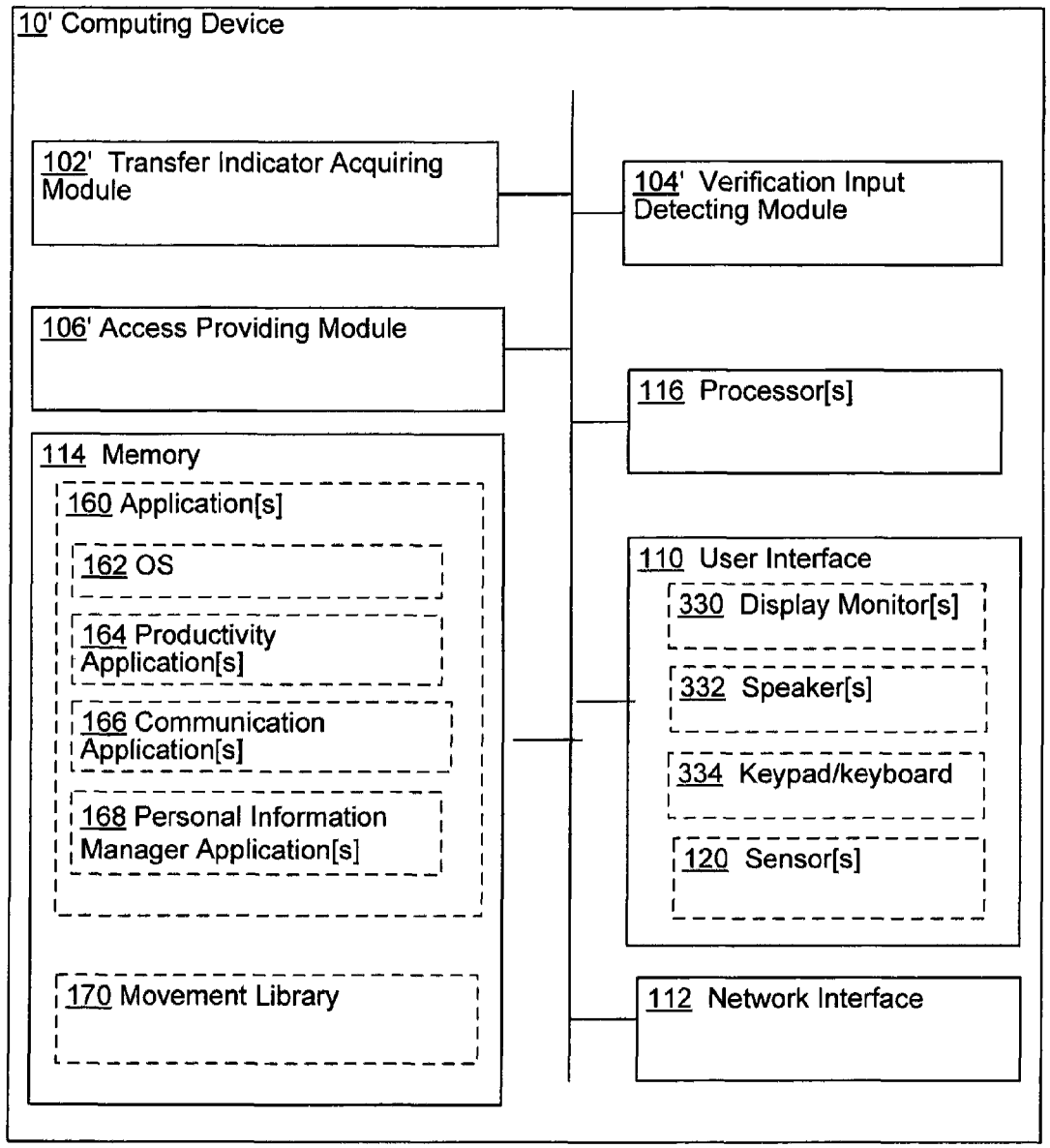
FIG. 3a shows a particular implementation of the computing device 10* of FIG. 1 illustrated as computing device 10'.
Figure 3B:
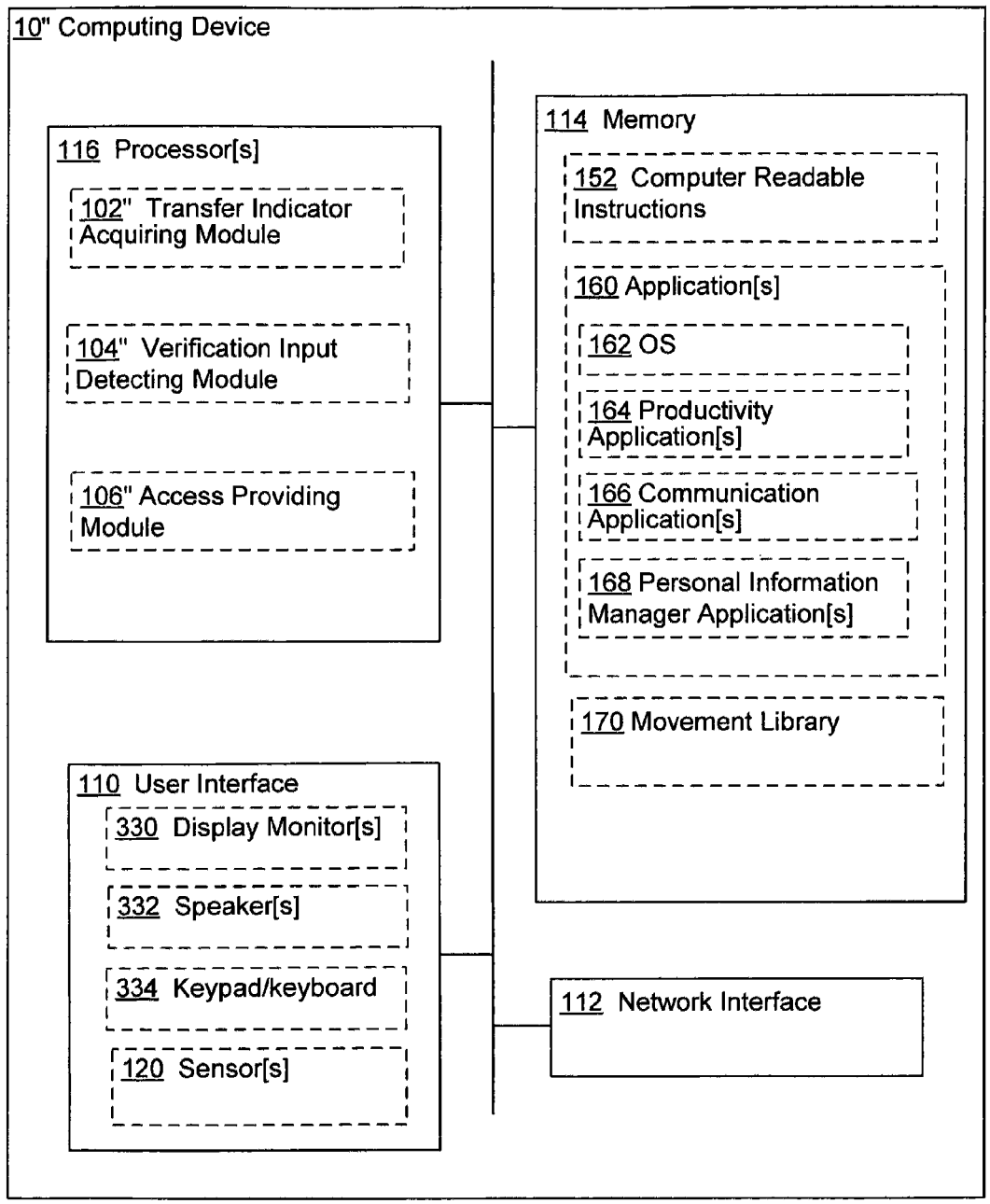
FIG. 3b shows another implementation of the computing device 10* of FIG. 1 illustrated as computing device 10".

In particular, and as will be further described herein, FIG. 3a illustrates a computing device 10' that is the "hardwired" or "hard" implementation of the computing device 10* of FIGS. 1, 2a, 2b, 2c, 2d, and 2e in which certain logic modules including a transfer indicator acquiring module 102', a verification input soliciting module 104', a verification input receiving and transfer verifying module 105', and an access providing module 106' are implemented using purely hardware or circuitry components (e.g., application specific integrated circuit or ASIC). In contrast, FIG. 3b illustrates a computing device 10" that is the "soft" implementation of the computing device 10* of FIGS. 1, 2a, 2b, 2c, 2d, and 2e in which certain logic modules including a transfer indicator acquiring module 102", a verification input soliciting module 104", a verification input receiving and transfer verifying module 105", and an access providing module 106" are implemented using one or more processors (e.g., microprocessors, controllers, etc.) executing one or more programming instructions (e.g., software stored in a non-transitory computer readable storage medium).

Note that for purposes of the following, "*" represents a wildcard. Thus, references in the following to the "computing device 10*" may be in reference to the computing device 10' of FIG. 3a or to the computing device 10" of FIG. 3b unless indicated otherwise. Note that the two different implementations of the computing device 10* of FIG. 1 illustrated in FIGS. 3a and 3b (e.g., illustrated as computing device 10' in FIG. 3a and as computing device 10" in FIG. 3b) are two extreme or opposite versions of the computing device 10* of FIGS. 1, 2a, 2b, 2c, and 2d in which certain logic modules (e.g., the transfer indicator acquiring module 102*, the verification input soliciting module 104*, the verification input receiving and transfer verifying module 105*, and the access providing module 106*) are implemented using purely "hardware solutions" (e.g., implemented using circuitry such as ASIC) as illustrated in FIG. 3a or using purely "software solutions" (e.g., implemented using software executed by hardware such as one or more processors) as illustrated in FIG. 3b. However, those having ordinary skill in the art will recognize that the computing device 10* or at least the logic modules (e.g., the transfer indicator acquiring module 102*, the verification input soliciting module 104*, the verification input receiving and transfer verifying module 105*, and the access providing module 106*) may be implemented using essentially any combination of hardware and software solutions. Further details related to the two implementations of computing device 10* illustrated in FIGS. 3a and 3b will be provided in greater detail below.

Although the computing device 10* illustrated in FIG. 1 is depicted as being a tablet computer, in alternative embodiments, the novel computationally implemented methods, systems, and articles of manufacture may be embodied in other types of computer systems having other form factors including other types of portable computer devices such as, for example, laptops, Netbooks, Smartphones, e-readers, and so forth. As illustrated in FIG. 1, the computing device 10* includes a display device 12 (e.g., a touchscreen) on the front side 17a (e.g., display side) of the computing device 10*. Also as depicted in FIG. 1, the display device 12 (e.g., touch screen) displaying an exemplary electronic document 14 and a tool bar 15. As further illustrated, the computing device 10* may include a camera 16 (e.g., a webcam) disposed on the front side 17a of the computing device 10*. In some embodiments, additional cameras may be included on the front side 17a and/or backside 17b (see, for example, FIGS. 2a-2d) of the computing device 10*.

There are a number of ways to determine or infer whether a computing device 10* is or has been transferred from one user to another (e.g., from a first user 20 to a second user 30 or from the second user 30 to the first user 20). In some cases, for instance, various sensor-provided data may be collected in order to make such determination or inference. Depending on the quality of such collected data, a determination or an inference may be made that the computing device 10* has been transferred between two users. For example, if the quality of the sensor-provided data is poor, then the collected sensor-provided data may only suggest (infer) that the computing device has been transferred between two users (e.g., from the second user 30 to the first user 20). On the other hand, if the quality of the data is good, then a determination (e.g., a more definitive conclusion) may be made that the computing device 10* has been transferred between two users.

The sensor-provided data that may be collected to determine or to infer that the computing device 10* has been transferred to, for example, the first user 20 from the second user 30 may indicate certain aspects of the computing device 10* (e.g., movements exhibited by the computing device 10* as a result of, for example, a user holding and deliberately moving the computing device 10* during the transfer of the computing device 10*) and/or various environmental aspects surrounding the computing device 10* (e.g., presence or absence certain visual and/or audio cues such as faces or voice patterns). For instance, when the computing device 10* of FIG. 1 is passed from, for example, the second user 30 (e.g., a third party having limited or restricted access rights to the computing device 10* and/or to items that may be available through the computing device 10*) to the first user 20 (e.g., a primary user or owner of the computing device 10* having at least greater access rights to the computing device 10* and/or its stored content than the second user 30), the second user 30 in passing off the computing device 10* may exhibit certain movements that is passed onto the computing device 10*. The occurrence of such movements, as exhibited by the computing device 10*, may at least infer that the computing device 10* is being transferred from, for example, the second user 30 to another user (e.g., the first user 20). These movements exhibited by the computing device 108 when detected may only suggest that the transfer (e.g., change in possession) of the computing device 10* from the second user 30 to another user (e.g., the first user 20) has occurred. That is, generally when only the movements of the computing device 10* are monitored (as opposed to monitoring a combination of direct movements, visual cues, and/or audio cues), such monitoring of the movements by itself may not result in a conclusive determination that the computing device 10* has been transferred between two users (e.g., from the second user 30 to the first user 20). Instead, at best, such detected movements may only suggest that the computing device 10* has been transferred between two users.

In many cases where a computing device 10* is being transferred between two users (e.g., from the second user 30 to the first user 20), the computing device 10* will often exhibit identifiable movements. Such identifiable movements may often be repeated whenever, for example, a computing device 10* is transferred between two users. Thus, in order to at least infer whether a computing device 10* is being transferred from the second user 30 to, for example, the first user 20, one may monitor the spatial movements of the computing device 10* in order to detect movements that matches with certain "signature movements" that have been identified as movements that occur when, for example, a computing device 10* is being transferred between two users (e.g., being transferred from the second user 30 to the first user 20).

In order to determine whether particular spatial movements exhibited by the computing device 10* is as a result of the transfer of the computing device 10* between two users (e.g., transfer from the second user 30 to the first user 20 or from the first user 20 to the second user 30), the computing device 10* may maintain in its memory 114 (see the computing device 10' and the computing device 10" of FIGS. 3a and 3b) a movement library 170 (see FIGS. 3a and 3b), which is a catalog or library of signature movements that have been identified as movements that may occur when a computing device 10* is being transferred between two users (e.g., transferred from the first user 20 to the second user 30 or from the second user 30 to the first user 20). Such a catalog or library may be used in order to determine whether the computing device 10* has been transferred from, for example, the second user 30 to the first user 20. That is, when movements of the computing device 10* that match with a signature movement stored in the movement library 170 have been detected, then the detection of such movements may at least infer (e.g., imply) that a transfer of the computing device 10* has occurred between two users (e.g., from the first user 20 to the second user 30, or from the second user 30 to the first user 20). Various types of signature movements may be stored in the movement library 170 including, for example, signature tilt movements, signature spin rotation movements, signature vibration movements, signature 3-dimensional movements, and so forth that infer or indicate the transfer of the computing device 10*.

One way to monitor the movements of the computing device 10* is to directly detect such movements using one or more integrated "movement" sensors that are designed to directly detect/measure movements of, the computing device 10*. Examples of such movement sensors include, for example, inertia sensors, accelerometers (e.g. three-axis or 3D accelerometers), gyroscopes, and so forth. These sensors (herein "movement" sensors 302—see FIG. 3f, which illustrates the one or more types of sensors 120 that may be included in the computing device 10 of FIG. 1) when integrated with a computing device 10* may be used to directly detect the actual movements/motions of the computing device 10* as the computing device 10* is being transferred from, for example, a first user 20 to a second user 30 or from the second user 30 to the first user 20.

Since not all movements of the computing device 10* that may be detected will be as a result of the computing device 10* being transferred between two users, in various embodiments and as will be further described herein, the computing device 10* may be endowed with particular logic for determining (e.g., identifying) which movements detected with the computing device 10* that have been detected at least suggests that the computing device 10* is or has been transferred from, for example, a second user 30 to a first user 20 (or vice versa) and which detected movements may merely be "noise movements" (e.g., random or accidental movements caused by the user holding the computing device 10* randomly or accidentally moving the computing device 10*).

Various types of movements of the computing device 10* may be tracked in order to at least infer that the computing device 10* is being transferred between, for example, a first user 20 and a second user 30. Examples of the type of movements that may be tracked include, for example, tilt type movements, spin type rotation movements, spatial relocation type movements, vibration movements, overall three-dimensional movements (which may be a composite of various types of movements), and so forth of the computing device 10*. In order to at least infer that the computing device 10* has been transferred from the first user 20 to the second user 30 or from the second user 30 to the first user 20, the various movements exhibited by the computing device 10* may be, individually or in combination, tracked using one or more movement sensors 302 that may be included with the computing device 10*. For example, in various embodiments, one or more movement sensors 302 (e.g., inertia devices, accelerometers, etc.) that can directly detect movements, and/or other types of sensors 120 (e.g., image capturing devices 304, audio capturing devices 306, etc.) that may be able to indirectly detect movements may be employed in order to track the movements of the computing device 10* as will be further described herein.

Referring now to FIG. 2a illustrating various types of tilts and tilt movements of the computing device 10* that may be detected and monitored using one or more sensors 120 (e.g., one or more movement sensors 302) in order to at least infer that the computing device 10* has been transferred between two users (e.g., transferred from a first user 20 to a second user 30 or from the second user 30 to the first user 20). That is, FIG. 2a shows the backside 17b of the computing device 10* and some of the tilt-type movements that may be monitored by the computing device 10* in order to at least infer that the computing device 10* has been transferred between two users such as from the second user 30 to the first user 20. As previously described, and in accordance with various embodiments, the first user 20 may be a primary user or owner of the computing device 10* and the second user 30 may be any third party (e.g., a friend or co-worker) who has lower or inferior access rights than the first user 20 to the computing device 10* and/or to one or more items that may be stored or available through the computing device 10*.

One type of tilt that may be detected/monitored is tilt 42a of the computing device 10* that may occur when the computing device 10* is at least partially rotated around a central horizontal axis 43a. A second type of tilt that may be detected is tilt 42b, which may occur when the computing device 10* is at least partially rotated around a bottom horizontal axis 43b. Although not depicted, another type of tilt that may occur and that may be monitored is when the computing device 10* is at least partially rotated around an angular axis 43c that is angular with respect to a horizontal axis (e.g., axis 43a or 43b) and is parallel to the plane of the backside 17b similar to axis 43a and axis 43b. Yet another type of tilt that may occur and that may also be monitored is when the computing device 10* is at least partially rotated around a vertical axis 43d. Note that although the vertical axis 43d is depicted as being centered along the backside 17b of the computing device 10*, just like the horizontal axis 43b, the vertical axis 43d does not have to be centered on the backside 17b and instead, may be offset from the center of the backside 17b of the computing device 10* (e.g., may be closer to one end of the device rather than an opposite end of the device.

By detecting that the computing device 10* has been tilted in a particular manner from a first tilt orientation to a second tilt orientation, at least an inference may be made that the computing device 10* has been transferred from the first user 20 to the second user 30 or from the second user 30 to the first user 20. In particular, when the first user 20 is handing off or transferring the computing device 10* to the second user 30, the first user 20 may tilt the computing device 10* in a particular way that may be identifiable. Similarly, when the second user 30 is handing off or transferring the computing device 10* to the first user 20, the second user 30 may tilt the computing device 10* in a particular way that may be similarly identifiable. Thus, when the computing device 10* is being transferred from a first user 20 to a second user 30 or vice versa, the computing device 10* (or rather the logic endowed with the computing device 10*) may track the movements (i.e., tilt movements) of the computing device 10* as it moves from a first tilt orientation (e.g., the tilt of the computing device 10* at the beginning of the transfer or when the first user 20 or the second user 30 was in possession of the computing device 10*) to a second tilt orientation (e.g., the tilt of the computing device 10* at the end of the transfer or when the second user 30 or the first user 20, for example, has acquired possession of the computing device 10*).

In order to make at least an inference that a transfer was made from the first user 20 to the second user 30 or from the second user 30 to the first user 20, the computing device 10* or at least the logic endowed in the computing device 10* may examine the particular movements of the computing device 10* (e.g., how the computing device 10* was reoriented from a first tilt orientation to a second tilt orientation including speed and cadence of the reorientation) as the computing device 10* moves from the first tilt orientation to a second tilt orientation. The computing device 10* may additionally or alternatively analyze the second tilt orientation (e.g., the tilt of the computing device 10* after it has finished being reoriented) at least with respect to the first tilt orientation in order to at least infer that the computing device 10* has been transferred. To further determine or at least infer that the computing device 10* has been transferred from the first user 20 to the second user 30 or from the second user 30 to the first user 20, the examination/analysis of the detected tilt movements of the computing device 10* may involve comparing the detected tilt movements of the computing device 10* with catalogued or library signature tilt movements (which may be stored in the memory 114 of the computing device 10) that are identified as being movements associated with transfer of the computing device 10* between two users.

That is, the computing device 10* may maintain in its memory 114 (see FIGS. 3a and 3b) a movement library 170 that may include a catalogue or library of signature movements including signature tilt movements that have been previously identified as tilt movements that may occur when, for example, a computing device 10* is transferred between two users (e.g., first user 20 and second user 30). Thus, when tilt movements that match with catalogued or library signature tilt movements have been detected, then a determination or inference may be made that a transfer of the computing device 10* between two users has occurred. Note that the above discussed tilt movements relates to the movement of the computing device 10* as it moves from a first tilt orientation to a second tilt orientation.

Thus, another aspect of tilt orientation changes that may be considered in order to at least infer that a transfer has taken place is to simply look at the end points of the tilt reorientation and their differences. In other words, to analyze the first tilt orientation (e.g., the tilt orientation of the computing device 10* before the computing device 10* being reoriented) and the second tilt orientation (e.g., the end tilt orientation of the computing device 10* after it has been reoriented) with respect to each other, and the differences between the first tilt orientation and the second tilt orientation. Thus, in some embodiments, the computing device 10* may also or additionally maintain a catalogue or library of changes of tilt orientation (e.g., tilt orientation changes) that have been previously identified as signature tilt changes that occur when, for example, a computing device 10* is transferred between two users. Such catalogue or library of tilt orientation changes may be stored as part of a movement library 170 stored in memory 114 (see FIGS. 3a and 3b) of the computing device 10* of FIG. 1 (e.g., the computing device 10' of FIG. 3a or the computing device 10" of FIG. 3b). Therefore, when tilt orientation changes that match with catalogued or library signature tilt orientation changes (e.g., as stored in the movement library 170 of the memory 114) have been detected, then at least an inference may be made that a transfer of the computing device 10* between two users (e.g., transfer from the first user 20 to the second user 30 or from the second user 30 to the first user 20) has occurred.

Referring now to FIG. 2b illustrating another type of movement of the computing device 10* that may be detected/monitored in order to at least infer that the computing device 10* has been transferred between two users. In particular, FIG. 2b shows a few types of spin rotation and spin rotation movements of the computing device 10* that may be detected/monitored using one or more sensors 120 (e.g., one or more movement sensors 302) in order to determine or infer that a transfer of the computing device 10* between two users has occurred. Note that this type of rotation (e.g., spin rotation) is different from the type of rotation associated with the previously described tilt movement where the "tilt" rotation involves the entire backside 17b (or the front side 17a) of the computing device 10* rotating around some axis in a sweeping motion. In a spin rotation, the backside 17b (or the front side 17a) of the computing device 10* substantially spins around an axis without the sweeping motion. Referring back to FIG. 2b, which shows some of the various types of spin rotations that may be monitored by the computing device 10* in order to at least infer that the computing device 10* has been transferred between two users (e.g., transferred from the first user 20 to the second user 30 or from the second user 30 to the first user 20).

Examples of the type of spin rotations that may be monitored include a spin rotation 44a of the computing device 10* that occurs when the computing device 10* is rotated around a center axis 45a that is centered and vertical to the backside 17b of the computing device 10*. Another type of spin rotation that may be monitored is a spin rotation 44b of the computing device 10* that occurs when the computing device 10* is rotated around a center axis 45b that may be centered but not vertical to the backside 17B of the computing device 10*. Instead, the center axis 45b is angular to the backside 17b of the computing device 10* such that when the computing device 10* is rotating around the center axis 45b, the computing device 10* will have a constant tilt with respect to the center axis 45b. Another type of rotation that may be monitored is spin rotation 44c of the computing device 10* that may occur when the computing device 10* is rotated around an axis 45c that may not be centered on the backside 17B of the computing device and that may not be vertical to the backside 17B of the computing device 10*.

By detecting that the computing device 10* has been spin rotated in a particular manner, at least an inference may be made that the computing device 10* has been transferred between two users (e.g., transferred from the first user 20 to the second user 30 or from the second user 30 to the first user 20). In particular, when the first user 20 is handing off or transferring the computing device 10* to the second user 30, the first user 20 may spin rotate the computing device 10* in a particular way. Thus, when the computing device 10* is being transferred from, for example, the second user 30 to the first user 20, the computing device 10* (or rather the logic endowed with the computing device 10*) may track the movements of the computing device 10* as it moves from a first spin orientation (e.g., the orientation of the computing device 10* at the beginning of the transfer or when the second user 30 was in possession of the computing device 10*) to a second spin orientation (e.g., the orientation of the computing device 10* at the end of the transfer or when the first user 20 has acquired possession of the computing device 10*).

Similar to the tilt or tilt movement detection/analysis described earlier, in order to make at least an inference that a transfer was made between two users (e.g., either transferred from the first user 20 to the second user 30 or from the second user 30 to the first user 20), the computing device 10* or at least the logic endowed in the computing device 10* may scrutinize the particular movements of the computing device 10* as the computing device 10* spin rotates from a first orientation (e.g., the initial orientation of the computing device 10* at the beginning of the transfer of the computing device 10* between two users) to a second orientation (e.g., the end orientation of the computing device 10* at the end of the transfer). The computing device 10* may additionally or alternatively analyze the second orientation (e.g., the orientation of the computing device 10* after it has finished being spin rotated) at least with respect to the first orientation (e.g., the orientation of the computing device 10* before it was spin rotated) in order to at least infer that the computing device 10* has been transferred. To further determine or at least infer that the computing device 10* has been transferred between two users (e.g., transferred from the first user 20 to the second user 30 or from the second user 30 to the first user 20), the examination/analysis of the detected spin rotation movements of the computing device 10* from the first orientation to the second orientation may involve comparing the detected spin rotation movements of the computing device 10* with catalogued or library signature spin rotation movements that are identified as being associated with transfer of the computing device 10*. That is, the computing device 10* may maintain in its memory 114 (see FIGS. 3a and 3b) a movement library 170 that may include a catalogue or library of signature movements including signature spin rotation movements that may have been previously identified as spin rotation movements that may occur when, for example, a computing device 10* is transferred between two users. When the computing device 10* or at least the logic endowed with the computing device 10* detects the computing device 10* exhibiting movements that match with the signature spin rotation movements stored in the movement library 170 then at least an inference may be made that the computing device 10* has been transferred between two users (e.g., transferred from the first user 20 to the second user 30 or from the second user 30 to the first user 20).

Turning now to FIG. 2c illustrating yet another type of movement of the computing device 10* that may be detected/monitored in order to at least infer that the computing device 10* has been transferred between two users. In particular, FIG. 2c shows the computing device 10* being relocated by moving from a first spatial location 46 to a second spatial location 48 when the computing device 10* is transferred between two users (e.g., transferred from the second user 30 to the first user 20). In various embodiments, such movements from the first spatial location 46 to the second spatial location 48, which will be referred to herein as "spatial relocation movements," may be detected using one or more sensors 120 (e.g., one or more movement sensors 302). In order to make at least an inference that a transfer was made from, for example, the second user 30 to the first user 20, the computing device 10* or at least the logic endowed in the computing device 10* may examine/analyze the particular spatial relocation movements 47 of the computing device 10 as it moves from the first spatial location 46 to the second spatial location 48, and to compare the pattern of spatial relocation movements 47 (e.g., path, speed, acceleration, and so forth).

In some cases, the computing device 10* (or rather the logic endowed with the computing device 10*) may additionally or alternatively analyze the second spatial location 48 with respect to the first spatial location 46 in order to determine or at least infer that the computing device 10* has been transferred from, for example, the second user 30 to the first user 20. To further determine or infer that the computing device 10* has been transferred from the second user 30 to the first user 20 (or vice versa), the examination/analysis of the detected spatial relocation movements of the computing device 10* may be compared with catalogued or library signature spatial relocation movements (or simply "signature spatial movements") that have been identified as being associated with the transfer of the computing device 10 between two users. That is, the computing device 10* may maintain in its memory 114 (see FIGS. 3a and 3b) a movement library 170 that may include a catalogue or library of signature movements including signature spatial relocation movements that may have been previously identified as spatial relocation movements that may occur when, for example, a computing device 10* is transferred between two users. When the computing device 10* or at least the logic endowed with the computing device 10* detects the computing device 10* exhibiting movements that match with signature spatial relocation movements stored in the movement library 170 at least an inference may be made that the computing device 10* has been transferred between two users (e.g., transferred from the first user 20 to the second user 30 or from the second user 30 to the first user 20).

In some embodiments, in order to at least infer that the computing device 10* has been transferred between two users (e.g., transferred from the second user 30 to the first user 20), the computing device 10* may be endowed with logic that detects/monitors vibrations that may have been exhibited by the computing device 10*. In some cases, such vibration may have been transferred to the computing device 10* from a user (e.g., the first user 20 or the second user 30) who is holding the computing device 10* after the computing device 10* has been transferred to the user from another user. That is, each user who may come in contact with the computing device 10* may pass on to the computing device 10* unique vibration patterns (e.g., as a result of user's heartbeat). Thus, when the second user 30, for example is holding the computing device 10*, the computing device 10* may vibrate in a particular signature vibration pattern that is associated with the second user 30. In contrast, when the computing device 10* has been transferred to the first user 20 from the second user 30, and the first user 20 is holding the computing device 10*, the computing device 10* may vibrate in a vibration pattern (e.g., signature vibration pattern) that is associated with the first user 20.

Thus, one way to infer that the computing device 10* has been transferred from the first user 20 to the second user 30, or from the second user 30 to the first user 20 is to detect/ monitor at least changes in vibrations of the computing device 10\*. In some cases, this may involve the computing device 10\* (or at least the logic endowed with the computing device 10\*) initially detecting the particular vibration pattern of the computing device 10\* when the computing device 10\* is being possessed by, for example, the second user 30, and to detect when the computing device 10\* no longer vibrates in such a particular vibration pattern. In order to determine whether the computing device 10\* has been transferred from, for example, the second user 30 to the first user 20, the computing device 10\* may be further designed to determine that the computing device 10\* is vibrating in a way that matches with a signature vibration pattern of the first user 20 when previously it had detected that the computing device 10\* was vibrating in a manner that did not match with the signature vibration pattern of the first user 20 (e.g., in a manner that matched with the signature vibration pattern of the second user 30). By making such a determination, at least an inference may be made that the computing device 10\* has been transferred from the second user 30 to the first user 20.

In some embodiments, the computing device 10\* may include logic that is designed to determine whether the computing device 10\* has moved away from one user, such as the second user 30, and has moved closer to another user, such as the first user 20, in order to determine whether the computing device 10\* has been transferred from the second user 30 to the first user 20. That is, by making such a determination, an inference may be made that the computing device 10\* has been transferred from the second user 30 to the first user 20. In some embodiments, in order to make such a determination, data from a combination of sensors 120 may be processed and analyzed. That is, in order to determine whether the computing device 10\* has moved away from the second user 30 and closer to the first user 20, a combination of one or more movement sensors 302 (see FIG. 3*f*) for directly detecting movements of the computing device 10\*, one or more image capturing devices 304 (e.g., webcam or digital camera), and/or one or more audio capturing devices 206 (e.g., microphones) may be employed in order to determine whether the computing device 10\* is moving away from the second user 30 and moving closer to the first user 20 (and thus, an inference that the computing device 10\* has been transferred from the second user 30 to the first user 20). For example, the computing device 10\* in some cases may employ one or more movement sensors 302 to detect the actual movements of the computing device 10\* and one or more image capturing devices 304 (along with facial recognition system/application) to determine that a face associated with the second user 30 is moving away from the computing device 10\* and a face associated with the first user 20 is moving closer to the computing device 10\*. Based on the data provided by both the movement sensors 302 and the image capturing devices 304, at least an inference may be made that the computing device 10\* has been transferred from the second user 30 to the first user 20.

In some embodiments, and as illustrated in FIG. 2*d*, rather than only monitoring for a particular type of movement (e.g., tilt-type movements, spin rotation movements, spatial relocation movements, vibration movements, and so forth) the computing device 10\* may be endowed with logic that is designed to detect/monitor the overall three-dimensional movements of the computing device 10\* and to determine whether the computing device 10\* has moved in a particular three-dimensional way that at least suggests or infers that the computing device 10\* has been transferred between two users (e.g., transferred from the first user 20 to the second user 30 or from the second user 30 to the first user 20). In order to accomplish this, the computing device 10\* may maintain in its memory 114 (see FIGS. 2*a* and 2*b*) a movement library 170 that may include a catalogue or library of signature movements including signature three-dimensional movements that may have been previously identified as three-dimensional movements that may occur when, for example, a computing device 10\* is transferred between two users. When the computing device 10\* or at least the logic endowed with the computing device 10\* detects the computing device 10\* exhibiting movements that match with the signature three-dimensional movements stored in the movement library 170 then at least an inference may be made that the computing device 10\* has been transferred between two users (e.g., transferred from the first user 20 to the second user 30 or from the second user 30 to the first user 20).

In many cases, it may be insufficient to rely only on the directly detected movements of the computing device 10\* in order to determine whether the computing device 10\* has been transferred between two users. For example, and as described earlier, in some instances, higher standards for determining whether a transfer has occurred (which may not be satisfied based purely only on the detected movements of the computing device 10\*) may be needed in order to ensure that confidential information is not inadvertently accessed. Thus, and as described briefly above, in addition to or alternative to detecting the movements of the computing device 10\* using, for example, movement sensors 302 (e.g., inertia sensors, accelerometers, gyroscopes, and so forth), environmental aspects surrounding the computing device 10\* may also or alternatively be detected/monitored in order to determine or infer whether the computing device 10\* has been transferred between two users (e.g., transferred from a first user 20 to a second user 30 or from the second user 30 to the first user 20). For instance, in some embodiments, the computing device 10\* or the logic endowed with the computing device 10\* may be designed to detect, using one or more image capturing devices 304, certain visual cues that when detected at least suggests the transfer of the computing device 10\* between two users (e.g., transfer from the second user 30 to the first user 20.

For example, in some embodiments, the computing device 10\* may be endowed with a facial recognition system (e.g., facial recognition software) that may be employed with one or more image capturing devices 304 (see FIG. 3*f*) in order to determine the presence or absence of a face associated with the first user 20 or the second user 30 within the proximate vicinity (e.g., within the immediate vicinity such as within three or four feet) of the computing device 10\*. For example, if the face of the second user 30, which may have been initially detected in the proximate vicinity of the computing device 10\*, is no longer detected in the proximate vicinity of the computing device 10\*, and if the face associated with the first user 20 is instead detected in the proximate vicinity of the computing device 10\*, then at least an inference may be made that a transfer of the computing device 10\* from the second user 30 to the first user 20 may have occurred. The phrase "proximate vicinity" as used here is in reference to the immediate area surrounding the computing device 10\* such as within a distance from the computing device 10\* from which an object or a person is at least visually (or audibly) discernible or identifiable by the computing device 10\* using, for example, a facial recognition system (or a voice verification system).

Another type of visual cues that the computing device 10\* or at least the logic endowed with the computing device 10\* may seek/consider in order to determine or infer whether the computing device 10\* has been transferred between two users (e.g., transferred from a first user 20 to a second user 30 or from the second user 30 to the first user 20) is the presence or absence of one or more eyes (e.g., irises or retinas) in the proximate vicinity of the computing device 10* that are determined to be associated with the first user 20 or the second user 30. In particular, if the eyes of the first user 20 is initially detected in the proximate vicinity of the computing device 10* but is subsequently determined not to be at least in the field of view of an image capturing device 304 of the computing device 10* and/or if one or more eyes of another person (e.g., second user 30) other than the first user 20 suddenly appears in the field of view of the image capturing device 304 (see camera 16 of FIG. 1 or 2e), then at least an inference may be made that the computing device 10* has been transferred from the first user 20 to the second user 30. Similarly, if one or more eyes of a person (e.g., second user 30) other than the first user 20 is initially detected in the proximate vicinity of the computing device 10* but is subsequently no longer detected at least in the field of view of the image capturing device 304 of the computing device 10* and/or if one or more eyes of the first user 20 suddenly appears in the field of view of the image capturing device 304 of the computing device 10* then at least an inference may be made that computing device 10* has been transferred from the second user 30 to the first user 20.

In various embodiments, the computing device 10* or at least the logic that may be endowed with the computing device 10* may be designed to detect absence or presence of audio cues in the proximate vicinity of the computing device 10* in order to determine or at least infer as to whether the computing device 10* has been transferred between two users (e.g., either transferred from a first user 20 to a second user 30 or transferred from the second user 30 to the first user 20). For example, in some embodiments, the computing device 10* may be endowed with voice verification system that may be designed to detect, via one or more audio capturing devices 206 (e.g., one or more microphones), the sudden presence or increase in volume of a voice in the proximate vicinity of the computing device 10* having a voice pattern that matches with the signature voice pattern of the first user 20. By making such a determination and/or by detecting the absence or diminishment of a voice associated with the second user 30 in the proximate vicinity of the computing device 10*, at least an inference may be made that the computing device 10* has been transferred from, for example, the second user 30 to the first user 20.

In various embodiments, the computing device 10* or at least the logic endowed with the computing device 10* may be designed to at least infer that the transfer of the computing device 10* between two users (e.g., either transferred from the first user 20 to the second user 30 or transferred from the second user 30 to the first user 20) has occurred based on one or more detected movements of the computing device 10*, one or more detected visual cues, and/or one or more detected audio cues. That is, since in many situations, a single type of indicator or measurement (e.g., detected movements of the computing device 10* or detected visual cues in the proximate vicinity of the computing device 10*) may not reliably or conclusively indicate that the transfer of the computing device 10* between two users has occurred, in some embodiments, the computing device 10* may attempt to make such determination based on a combination of different types of indicators/measurements (e.g., movements of the computing device 10*, visual cues, and/or audio cues).

However, even in situations where multiple types of data (e.g., movement data, image data, audio data, and so forth) are collected and processed, such procedures may at best only provide an inference or suggestion that the computing device 10* has been transferred from, for example, the second user 30 to the first user 20, That is, and as briefly explained earlier, in cases where greater access to one or more items via the computing device 10* is to be granted, such as when the computing device 10* is being transferred to a first user (e.g., a primary user of the computing device 10*) from the second user (a third party with lower accessing rights than the primary user), a higher level of proof that the computing device 10* has indeed been transferred to the first user 20 may be required in order to ensure that confidential or personal information is not inadvertently released. For purposes of this description, the data (e.g., sensor-provided data) that is collected that suggests (e.g., infers) that the computing device 10* has been transferred between two users, such as from the second user 30 to the first user 20, will be referred to as "indicators."

As briefly described earlier, in response to acquiring or receiving one or more indicators that suggest that the computing device 10* has been transferred to the first user 20 from the second user 30, the computing device 10* or at least the logic endowed in the computing device 10* may be designed to detect for input data that verifies that the computing device 10* has indeed been transferred to the first user 20. For example, in some cases, the first user 20 may be aware that whenever the first user 20 receives the computing device 10* back from another user (e.g. second user 30) who has inferior accessing rights to the computing device 10* than the first user 20, he/she is required to draw a unite figure, write a name, or sign a particular portion of a touch screen of the computing device 10* in order to alert the computing device 10* (or the endowed logic) that the first user 20 has regained possession of the computing device 10*. Thus, once the computing device 10* detects that the first user 20 has entered such input that verifies that the computing device 10* is back in the possession of the first user 20, the computer device 10* may accordingly reconfigure itself (in order to allow greater access to one or more items).

In some embodiments, the detection of the input data that verifies that the computing device 10* has been transferred to, for example, the first user 20 may involve soliciting for the input data. For example, in some instances, this may involve requesting the first user 20* (or whomever having possession of the computing device 10*) to provide the input data. If the input data is indeed solicited, then the solicitation may be made visually and/or audibly through one or more display monitors 330 and/or speakers 332 (see FIGS. 3a and 3b that illustrate two particular implementations of the computing device 10*). In some cases, the solicitation may be made by making a request for biometric input to be provided. Examples of biometric input that may be requested include, for example, a clear and unobstructed view of a face or an eye be provided to a camera 16 (see FIG. 2e) of the computing device 10* or clear unmuffled voice of a user (e.g., first user 20) be spoken to a microphone 19 (see FIG. 2e) of the computing device 10*. Alternatively or additionally, the solicitation of the input may involve requesting that personal credentials (e.g., password) be entered via, for example, a keypad, a touchscreen, or a microphone, or requesting a "secret" gesture be executed on a touchscreen (e.g., display monitor 330 of FIGS. 3a and 3b) or to show such gesture to a camera 16 (e.g., image capturing device 304 of FIG. 3f) of the computing device 10*.

In various embodiments, and as described earlier, in response to detecting the input verifying that the computing device 10* has been transferred to the first user 20, the computing device 10* or at least the logic that may be endowed with the computing device 10* may be designed to provide at least greater access via the computing device 10* to one or more items (e.g., electronic documents, image or audio files, applications, passwords, and so forth) that were at least not partially accessible when the computing device 10* was in the possession of the second user 30. In various embodiments, the one or more items that greater access may be provided to may be one or more electronic items that the second user 30 may have had limited or restricted access to or had completely no access to prior to the transfer of the computing device 10* when the second user 30 had possession of the computing device 10*.

Referring to FIG. 2e illustrating a face 22 and an eye 24 of the first user 20 near the front side 17a of the computing device 10* of FIGS. 1, 2a, 2b, 2c, and 2d. In some embodiments, in order to obtain input that verifies that the computing device 10* has been transferred to the first user 20, the first user 20 may be requested to bring his/her face 22 or eye 24 close to the camera 16 of the computing device 10* so that the camera 16 can have a clear and close view of the face 22 or the eye 24. Alternatively or additionally, the first user 20 may be requested to speak into a microphone 19 of the computing device 10* so that the computing device 10* can verify for example that the first user 20 has possession of the computing device 10*. As further illustrated in FIG. 2e, displaying on the display device 12 (e.g., display monitor 330 of FIGS. 3a and 3b) is a message 21 that requests the first user 20 (or whoever else has the possession of the computing device 10*) to perform some sort of act in order to obtain input that verifies that the computing device 10* is in the possession of, for example, the first user 20.

In various embodiments, in response to receiving the input verifying that the computing device 10* has been transferred to the first user 20, the computing device 10* or the logic endowed with the computing device 10* may be designed to provide via the computing device 10* at least greater access to one or more items. The type of access to be provided in response to receiving the input verifying that the computing device 10* has been transferred to the first user 20 may depend on a number of factors including what type of items is the greater access or accesses being provided to. For example, if the one or more items are one or more software applications (herein "applications"), then the greater access (or accesses) to be provided may be access to one or more functionalities of the one or more applications 160 (see FIGS. 3a and 3b). Alternatively, the greater access to be provided to the one or more applications 160 in some cases may mean access to the one or more applications 160 being completely unblocked and/or unhidden. In contrast, if the one or more items are one or more electronic documents (e.g., productivity documents, image or audio files, etc.), then providing at least greater access to such items may relate to providing greater editorial access (e.g., allowing modifications, deletions, additions, and so forth to the items) to the one or more items.

In some cases, providing at least greater access to the one or more items may mean providing viewing access to the one or more items, while in other cases, it may mean providing audio access to the one or more items. In still other cases it may mean providing both viewing and audio access to the one or more items. In some cases, providing at least greater access to the one or more items may mean providing completely unrestricted access to the one or more items. In any event, a more detailed discussion related to the various types of access that may be provided to the one or more items will be provided below with respect to the operations and processes to be described herein.

Referring now to FIGS. 3a and 3b illustrating, as indicated earlier, two embodiments (illustrated in FIG. 3a as computing device 10' and in FIG. 3b as computing device 10") of the computing device 10* of FIGS. 1, 2a, 2b, 2c 2d, and 2e. Referring particularly now to FIG. 3a, which illustrates a computing device 10' that includes a transfer indicator acquiring module 102', a verification input detecting module 104', an access providing module 106', a memory 114 (which may store one or more applications 160 and/or a movement library 170), one or more processors 116 (e.g., microprocessors, controllers, etc.), one or more sensors 120, a user interface 110 (e.g., one or more display monitors 330, one or more speakers 332, one or more keypad/keyboard 334, one or more sensors 120, a mouse, etc.), and a network interface 112 (e.g., network interface card or NIC).

In brief, the transfer indicator acquiring module 102' of FIG. 3a is a logic module that is designed to at least acquire one or more indicators that suggest that the computing device 10* has been transferred to a first user 20 from a second user 30, the first user 20 having at least greater accessing rights than the second user 20 to one or more items via the computing device 10*. The verification input detecting module 104' may be designed to detect, in response to the acquisition by the transfer indicator acquiring module 102' of the one or more indicators, input that verifies that the computing device 10* has been transferred to the first user 20. The access providing module 106' is a logic module that is designed to provide at least greater access via the computing device 10' to one or more items (e.g., electronic documents, audio or image files, software applications, passwords, and so forth) in response to the detection of the input that verifies that the computing device 10* has been transferred to the first user 20. For this particular embodiment of the computing device 10* of FIGS. 1, 2a, 2b, 2c, 2d, and 2e, the three logic modules (e.g., the transfer indicator acquiring module 102', the verification input detecting module 104', and the access providing module 106' are depicted in FIG. 3a as being implemented using purely circuitry components (e.g., hardware components) such as application specific integrated circuit or ASIC. Thus, the computing device 10' illustrated in FIG. 2a may be referred to as the "hardwired" or "hard" embodiment of the computing device 10* of FIGS. 1, 2a, 2b, 2c, 2d, and 2e.

Turning now to FIG. 3b, which illustrate a "soft" embodiment (e.g., computing device 10") of the computing device 10* of FIGS. 1, 2a, 2b, 2c, 2d, and 2e. In particular, FIG. 3b shows a computing device 10" that has components similar or the same as the components of the computing device 10' of FIG. 3a. For example, the computing device 10", similar to computing device 10' of FIG. 3a, may comprise of a memory 114 (storing one or more applications 160 and/or a movement library 170), one or more processors 116, one or more sensors 120, a user interface 110, and/or a network interface 112. And similar to the computing device 10' of FIG. 3a, the computing device 10" of FIG. 3b may include logic modules including a transfer indicator acquiring module 102", a verification input detecting module 104", and an access providing module 106" that functionally correspond to and mirror the transfer indicator acquiring module 102', the verification input detecting module 104', and the access providing module 106' of the computing device 10' of FIG. 3a. However, unlike the logic modules (e.g., the transfer indicator acquiring module 102', the verification input detecting module 104', and the access providing module 106") of the computing device 10' of FIG. 3a, the logic modules (e.g., the transfer indicator acquiring module 102", the verification input detecting module 104", and the access providing module 106") of the computing device 10" of FIG. 3b are implemented by one or more processors 116 executing computer readable instructions 152 (e.g., software and/or firmware) that may be stored in the memory 114.

Note that although FIG. 3a illustrates all of the logic modules (e.g., the transfer indicator acquiring module 102', the verification input detecting module 104', and the access providing module 106') being implemented using purely hardware components such as ASIC, and although FIG. 3b illustrates all of the logic modules (e.g., the transfer indicator acquiring module 102", the verification input detecting module 104", and the access providing module 106") being implemented using one or more processors 116 executing computer readable instructions 152, in various other embodiments, such logic modules may be implemented using a combination of hardware components, such as ASIC, and software components in the form of computer readable instructions 152 that may be executed using one or more processors 116 (or other types of circuitry such as field programmable gate arrays or FPGAs). For example, in some embodiments, at least one of the logic modules (e.g., transfer indicator acquiring module 102') may be implemented using specially designed circuitry (e.g., ASIC) while a second logic module (e.g., access providing module 106") may be implemented using a processor 116 (or other types of programmable circuitry such as FPGA) executing computer readable instructions 152 (e.g., software and/or firmware).

In various embodiments, the memory 114 of the computing device 10' of FIG. 3a and the computing device 10" of FIG. 3b may comprise of one or more of mass storage device, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In various embodiments, the one or more applications 160 stored in memory 114 of FIGS. 3a and 3b may include, for example, an operating system 162, one or more productivity applications 164 such as a word processing application or a spreadsheet application, one or more communication applications 166 such as an email or IM application, and one or more personal information manager applications 168 (e.g., Microsoft Outlook). Although not depicted, other types of applications such as gaming applications may also be part of the one or more applications 160.

Figure 3C:
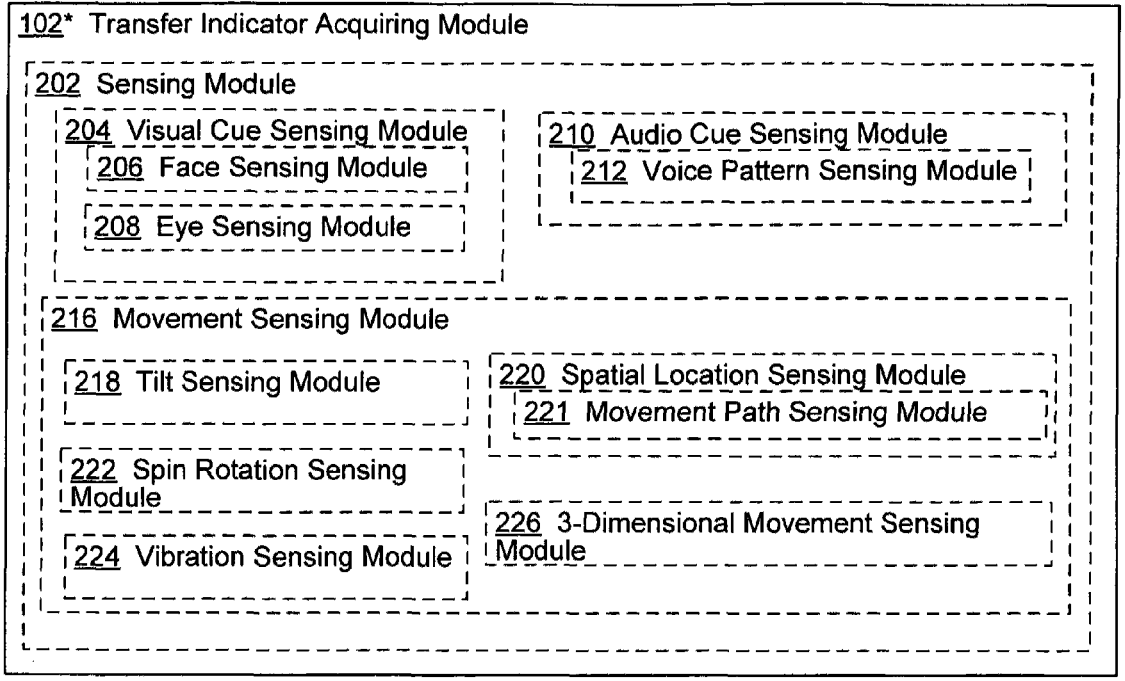
FIG. 3c shows another perspective of the transfer indicator acquiring module 102* of FIGS. 3a and 3b. [Note that "*" represents a wildcard, thus, transfer indicator acquiring module 102* may be in reference to the transfer indicator acquiring module 102' of FIG. 3a or the transfer indicator acquiring module 102" of FIG. 3b]

Turning now to FIG. 3c illustrating a particular implementation of the transfer indicator acquiring module 102* (e.g., the transfer indicator acquiring module 102' or the transfer indicator acquiring module 102") of FIGS. 3a and 3b. As illustrated, the transfer indicator acquiring module 102* may include one or more sub-logic modules in various alternative implementations. For example, in various implementations, the transfer indicator acquiring module 102* may include a sensing module 202 that includes a visual cue sensing module 204 (which may further include a face sensing module 206 and/or an eye sensing module 208), an audio cue sensing module 210 (which may further include a voice pattern sensing module 212), and/or a movement sensing module 216. In some embodiments, the movement sensing module 216, in turn, may include a tilt sensing module 218, a spatial location sensing module 220 (which may further include a movement path sensing module 221), a spin rotation sensing module 222, a vibration sensing module 224, and/or a three-dimensional movement sensing module 226. Specific details related to the transfer indicator acquiring module 102* as well as the above-described sub-modules of the transfer indicator acquiring module 102* will be provided below with respect to the operations and processes to be described herein.

Figure 3D:
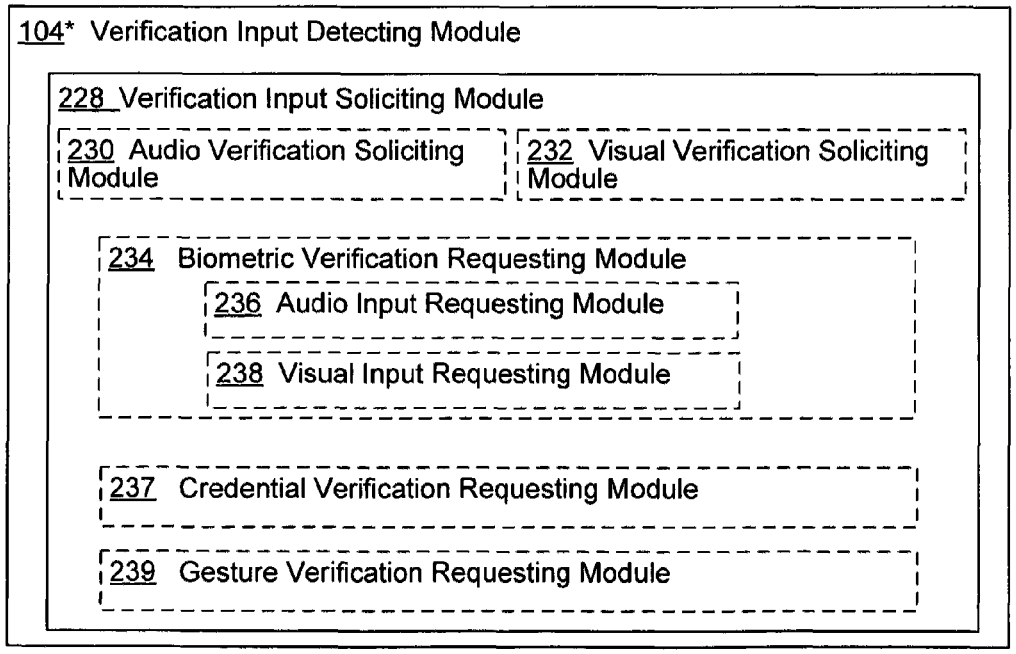
FIG. 3d shows another perspective of the verification input detecting module 104* of FIGS. 3a and 3b.

Referring now to FIG. 3d illustrating a particular implementation of the verification input detecting module 104* (e.g., the verification input detecting module 104' or the verification input detecting module 104") of FIGS. 3a and 3b. As illustrated, the verification input detecting module 104* may include one or more sub-logic modules in various alternative implementations. For example, in various implementations, the verification input detecting module 104* may include a verification input soliciting module 228. The verification input soliciting module 228, in turn, may further include an audio verification soliciting module 230, a visual verification soliciting module 232, a biometric verification requesting module 234 (which may further include an audio input requesting module 236 and/or a visual input requesting module 238), a password verification requesting module 237, and/or a gesture verification requesting module 239. Specific details related to the verification input detecting module 104* as well as the above-described sub-modules of the verification input detecting module 104* will be provided below with respect to the operations and processes to be described herein.

Figure 3E:
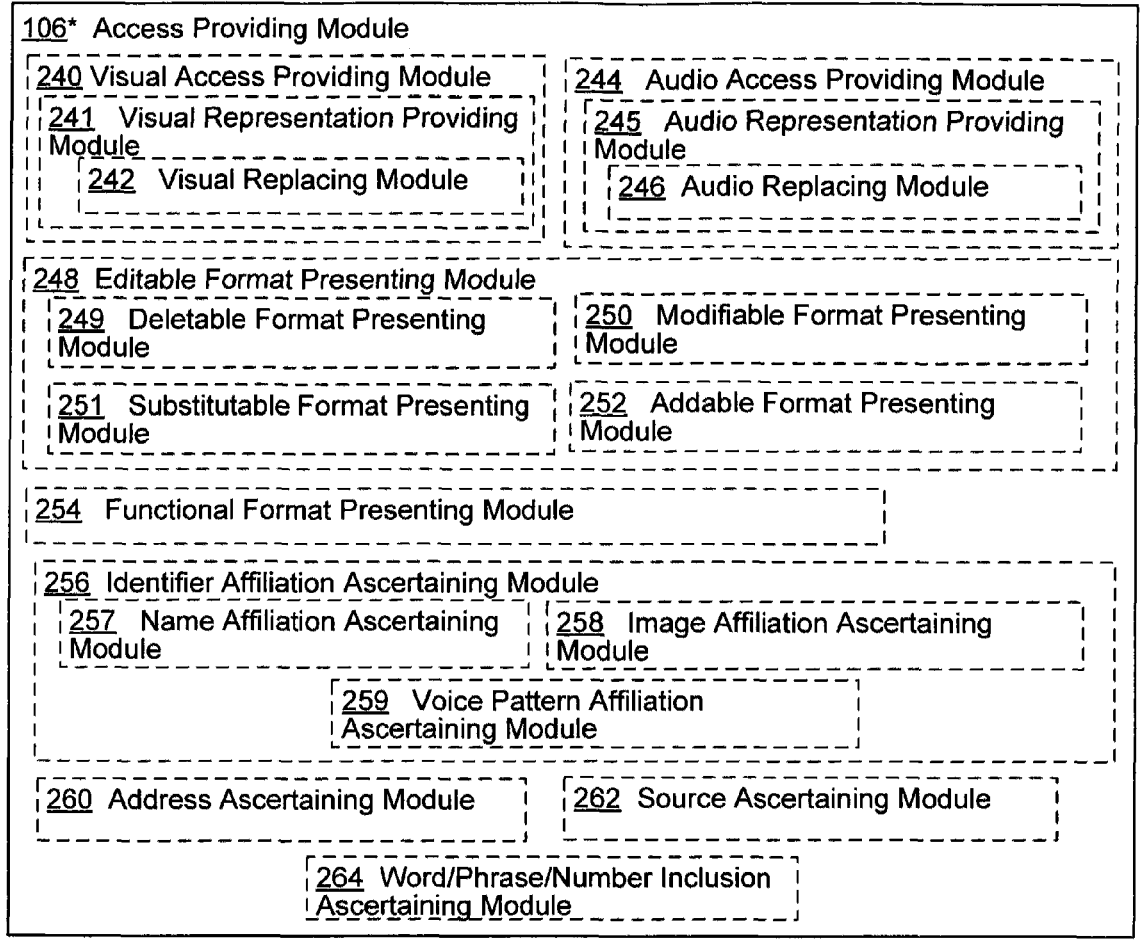
FIG. 3e shows another perspective of the access providing module 106* of FIGS. 3a and 3b.

Referring now to FIG. 3e illustrating a particular implementation of the access providing module 106* (e.g., the access providing module 106' or the access providing module 106") of FIGS. 3a and 3b. As illustrated, the access providing module 106* may include one or more sub-logic modules in various alternative implementations. For example, in various implementations, the access providing module 106* may include a visual access providing module 240 (which may include, in some cases, a visual representation providing module 241 that may further include a visual replacing module 242), an audio access providing module 244 (which may include, in some cases, an audio representation providing module 245 that may further include an audio replacing module 246), an editable format presenting module 248 (which may further include a deletable format presenting module 249, a modifiable format presenting module 250, a substitutable format presenting module 251, and/or an addable format presenting module 252), a functional format presenting module 254, an identifier affiliation ascertaining module 256 (which may further include a name affiliation ascertaining module 257, an image affiliation ascertaining module 258, and/or a voice pattern affiliation ascertaining module 259), an address ascertaining module 260, a source ascertaining module 262 and/or a word/phrase/number inclusion ascertaining module 264. Specific details related to the access providing module 106* as well as the above-described sub-modules of the access providing module 106* will be provided below with respect to the operations and processes to be described herein.

Figure 3F:
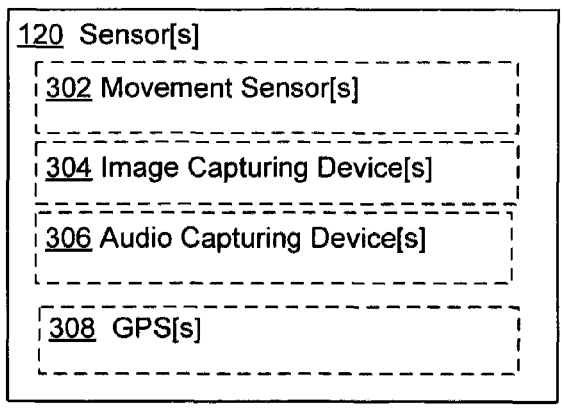
FIG. 3f shows various types of sensors 120 that may comprise the one or more sensors 120 that may be included with the computing device 10* of FIGS. 3a and 3b.

FIG. 3f illustrates a particular implementation of the one or more sensors 120 that may be included with the user interface 110 of the computing device 10* (e.g., the computing device 10' of FIG. 3a or the computing device 10" of FIG. 3b) of FIGS. 1, 2a, 2b, 2c, 2d, and 2e. As illustrated, the one or more sensors 120 that may be included with the computing device 10* may include one or more movement sensors 302 (e.g., one or more accelerometers, inertia sensors, and/or gyro sensors), one or more image capturing devices 304 (e.g., a web cam, a digital camera, infrared cameras, etc.), one or more audio capturing devices 306 (e.g., microphones), and one or more global positioning systems (GPSs).

Figure 4:
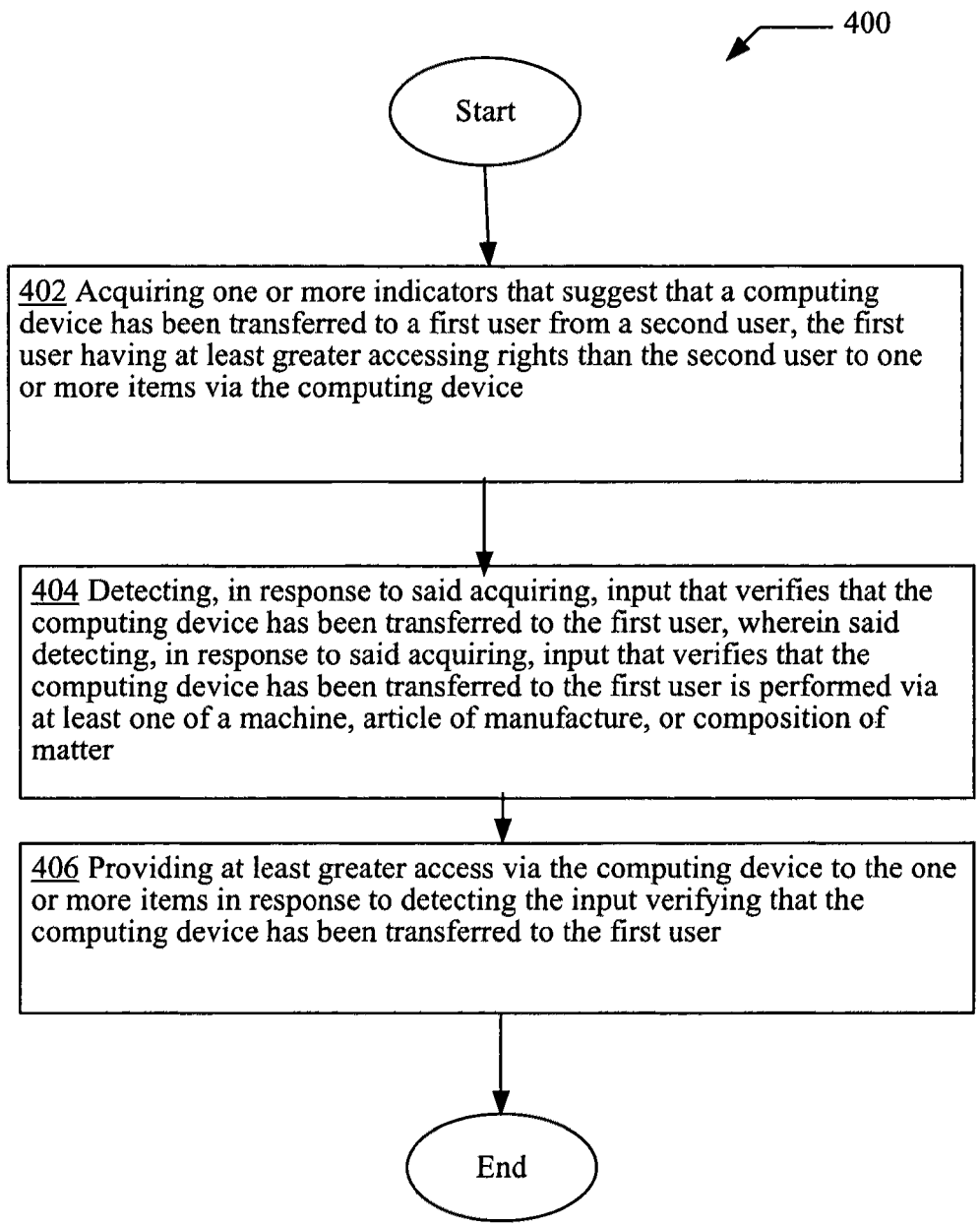
FIG. 4 is a high-level logic flowchart of a process.

A more detailed discussion related to the computing device 10* of FIGS. 1, 2a, 2b, 2c, 2d, and 2e (e.g., the computing device 10' of FIG. 3a or the computing device 10" of FIG. 3b) will now be provided with respect to the processes and operations to be described herein. FIG. 4 illustrates an operational flow 400 representing example operations for, among other things, providing at least greater access via a computing device 10* to one or more items (e.g., electronic items such as software applications, electronic documents including productivity documents, audio or image files, electronic messages including emails, passwords, so forth) in response to detecting input verifying that the computing device 10* has been transferred to a first user 20 (e.g., a user having superior access rights to the computing device 10* and/or to the one or more items) from a second user 30 (e.g., another user who may have inferior access rights than the first user 20 to the computing device 10* and/or to the one or more items). As will be further described in the following, in some embodiments, the input that verifies that the computing device 10* has been transferred to the first user 20 may be provided by the first user 20. In some cases, the detecting of the input may be in response to acquiring one or more indicators that suggest that the computing device 10* has been transferred to the first user 20 from the second user 30. In FIG. 4 and in the following figures that include various examples of operational flows, discussions and explanations will be provided with respect to the exemplary environment 100 described above and as illustrated in FIG. 1 and/or with respect to other examples (e.g., as provided in FIGS. 2a, 2b, 2c, 2d, 2e, 3a, 3b, 3c, 3d, 3e, and 3f) and contexts. However, it should be understood that the operational flows may be executed in a number of other environments and contexts, and/or in modified versions of FIGS. 2a, 2b, 2c, 2d, 2e, 3a, 3b, 3c, 3d, 3e, and 3f. Also, although the various operational flows are presented in the sequence(s) illustrated, it should be understood that the various operations may be performed in other orders other than those which are illustrated, or may be performed concurrently.

Further, in FIG. 4 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 4 as well as the other operations to be described herein are performed by at least one of a machine, an article of manufacture, or a composition of matter unless indicated otherwise.

In any event, after a start operation, the operational flow 400 of FIG. 4 may move to a transfer indicator acquiring operation 402 for acquiring one or more indicators that suggest that a computing device has been transferred to a first user from a second user, the first user having at least greater accessing rights than the second user to one or more items via the computing device. For instance, and as an illustration, the transfer indicator acquiring module 102* (e.g., the transfer indicator acquiring module 102' of FIG. 3a or the transfer indicator acquiring module 102" of FIG. 3b) of the computing device 10* of FIG. 1 (e.g., the computing device 10' of FIG. 3a or the computing device 10" of FIG. 3b) acquiring one or more indicators (e.g., audio, visual, and/or movement data) that when detected suggest that a computing device 10* has been transferred to a first user 20 from a second user 30, the first user 20 (e.g., a primary user or an owner) having at least greater accessing rights than the second user 30 to one or more items (e.g., electronic documents, image files, applications including productivity applications and/or gaming applications, etc.) via the computing device 10*. Note that in various implementations, the first user 20 may be a primary user of the computing device 10* or may be an owner of the computing device 10*. In some implementations, the computing device 10* may be in the control/possession of the second user 30 by being held by the second user 30 or by being in the immediate vicinity of the second user 30 (e.g., the computing device 10* being within arm's reach from the second user 30 and/or the second user 30 is on the display side or front side 17a of computing device 10* and is in arm's reach of the computing device 10*) prior to the transfer of the computing device 10* to the first user 20.

As further illustrated in FIG. 4, operation flow 400 may also include a verification input detecting operation 404 for detecting, in response to said acquiring, input that verifies that the computing device has been transferred to the first user. For instance, the verification input detecting module 104* (e.g., the verification input detecting module 104' of FIG. 3a or the verification input detecting module 104" of FIG. 3b) of the computing device 10* detecting, in response to said acquiring of the one or more indicators that suggest that the computing device 10* has been transferred to the first user 20 from the second user 30, input (e.g., biometric input data or other types of verification input data such as passwords) that verifies that the computing device 10* has been transferred to the first user 20.

In addition to the transfer indicator acquiring operation 402 and the verification input detecting operation 404, operational flow 400 may also include an access providing operation 406 for providing at least greater access via the computing device to the one or more items in response to detecting the input verifying that the computing device has been transferred to the first user as further illustrated in FIG. 4. For instance, the access providing module 106* (e.g., the access providing module 106' of FIG. 3a or the access providing module 106" of FIG. 3b) of the computing device 10* of FIG. 1 (e.g., the computing device 10' of FIG. 3a or the computing device 10" of FIG. 3b) providing at least greater access via the computing device 10* to the one or more items (e.g., electronic documents, audio or textual messages, image or audio files, passwords, applications, and so forth) in response to detecting the input verifying that the computing device 10* has been transferred to the first user 20. In various implementations, the access to be provided via the computing device 10* to the one or more items being greater than the access that was provided to the one or more items prior to the transfer of the computing device 10* from the second user 30 to the first user 20. As will be further described herein, there are a number of ways to provide greater access to the one or more items depending upon a number of factors including, for example, what types of items are to be accessed.

For example, if the one or more items are one or more productivity documents, such as word processing documents, then providing greater access to such items may merely be by including the true or actual representations of the documents into a directory (e.g., including the "true" document names or subject headings of the documents in the directory or replacing pseudo-names or subject headings in the form of obfuscating locum tenentes, which may have been included in the directory when the computing device 10* was in the possession of the second user 30, with the true document names or subject headings of the documents) that may be presented through the computing device 10*. Alternatively or additionally, greater access to the one or more documents may be provided by presenting editable forms of the documents, which may have been previously presented in read-only form when the computing device 10* was in the possession of the second user 30.

On the other hand, if the one or more items are one or more software applications, then providing access to such items may involve allowing use of one or more functionalities associated with the items (e.g., applications), which may not have been available for use when the computing device 10* was in the possession of the second user 30. For example, if the one or more items include a word processing application, then providing greater access to such an application 160 may involve enabling one or more editing functions of the application 160, which may not have been available when the computing device 10* was in the possession of the second user 30. Other ways of providing greater access to the one or more items will be further described herein.

Figure 5A:
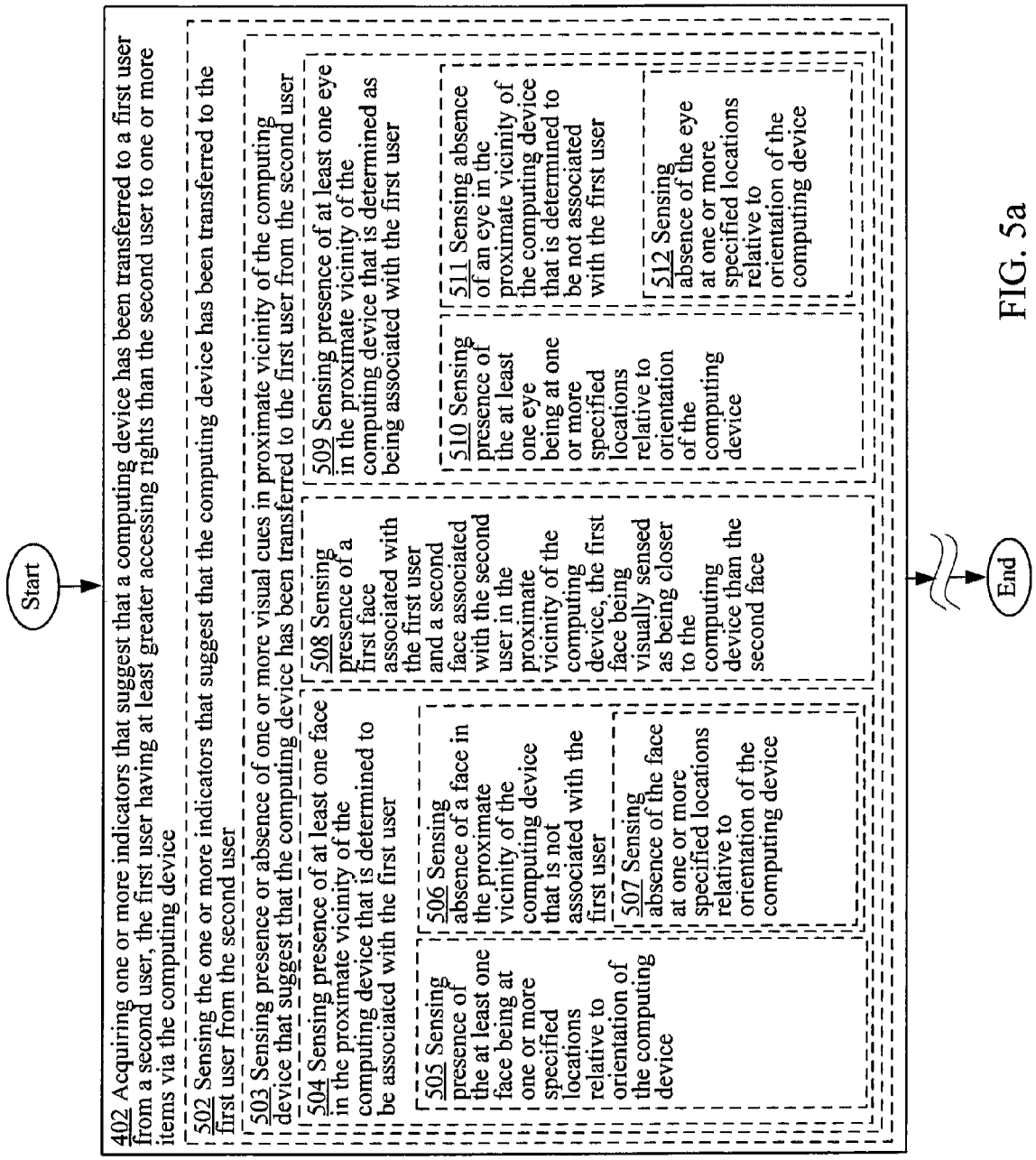
FIG. 5a is a high-level logic flowchart of a process depicting alternate implementations of the transfer indicator acquiring operation 402 of FIG. 4.

As will be described below, the transfer indicator acquiring operation 402, the verification input detecting operation 404, and the access providing operation 406 of FIG. 4 may be executed in a variety of different ways in various alternative implementations. FIGS. 5a, 5b, 5c, 5d, 5e, 5f, and 5g, for example, illustrate at least some of the alternative ways that the transfer indicator acquiring operation 402 of FIG. 4 may be executed in various alternative implementations. For example, in various implementations, the transfer indicator acquiring operation 402 of FIG. 4 may include an operation 502 for sensing the one or more indicators that suggest that the computing device has been transferred to the first user from the second user as depicted in FIG. 5a. For instance, the sensing module 202 (see FIG. 3c) of the computing device 10* of FIG. 1 sensing (e.g. detecting or determining) the one or more indicators (e.g., audio, visual, and/or movement indicators) that suggest that the computing device 10* has been transferred to the first user 20 from the second user 30.

As further illustrated in FIG. 5a, in various implementations, operation 502 may include an operation 503 for sensing presence or absence of one or more visual cues in proximate vicinity of the computing device that suggest that the computing device has been transferred to the first user from the second user. For instance, the visual cue sensing module 204 (see FIG. 3c of the computing device 10* of FIG. 1 (e.g., the computing device 10' of FIG. 3a or the computing device 10" of FIG. 3b) sensing presence or absence of one or more visual cues (e.g., detecting or not detecting a particular face) in proximate vicinity of the computing device 10* that suggest that the computing device 10* has been transferred to the first user 20 from the second user 30. In various embodiments, the one or more visual cues may be detected by the visual cue sensing module 204 using data provided by, for example, one or more image capturing devices 304 (see FIG. 3O of the computing device 10*.

In some cases, operation 503 may include an operation 504 for sensing presence of at least one face in the proximate vicinity of the computing device that is determined to be associated with the first user. For instance, the face sensing module 206 (see FIG. 3c) of the computing device 10* of FIG. 1 (e.g., the computing device 10' of FIG. 3a or the computing device 10" of FIG. 3b) sensing presence of at least one face in the proximate vicinity (e.g., within the immediate vicinity such as within three to five feet) of the computing device 10* that is determined to be associated with the first user 20.

As further illustrated in FIG. 5a, operation 504 may be implemented in a number of different ways in various alternative implementations. For example, in some implementations, operation 504 may include an operation 505 for sensing presence of the at least one face being at one or more specified locations relative to orientation of the computing device as further depicted in FIG. 5a. For instance, the face sensing module 206 (see FIG. 3c) of the computing device 10*, using one or more cameras 16 and using a facial recognition application, sensing presence of the at least one face 22 (see FIG. 3e) being at one or more specified locations relative to orientation of the computing device 10*. For example, the face sensing module 206 sensing that a face 22 that may be associated with the first user 20 is located centered on the front side 17a of the computing device 10*.

In the same or different implementations, operation 504 may include an operation 506 for sensing absence of a face in the proximate vicinity of the computing device that is not associated with the first user. For instance, the face sensing module 206 (see FIG. 3c) of the computing device 10*, using one or more cameras 16 and using a facial recognition application, sensing absence of a face (e.g., the face of the second user 30) in the proximate vicinity of the computing device 10* that is not associated with the first user 20. In some cases, the face that was detected as being absence may have been previously sensed in the proximate vicinity of the computing device 10* when, for example, the computing device 10* was in the possession of the second user 30. In other words, the face that is detected as being absent being the face of the second user 30.

In cases, operation 506 may further include an operation 507 for sensing absence of the face at one or more specified locations relative to orientation of the computing device. For instance, the face sensing module 206 of the computing device 10* sensing absence of the face (e.g., the face of the second user 30) at one or more specified locations (e.g., on the centered front side 17a of the computing device 10*) relative to orientation (e.g., relative to the front side 17a) of the computing device 10*.

In some implementations, operation 503 for sensing presence or absence of one or more visual cues in proximate vicinity of the computing device that suggest that the computing device has been transferred to the first user from the second user may additionally or alternatively include an operation 508 for sensing presence of a first face associated with the first user and a second face associated with the second user in the proximate vicinity of the computing device, the first face being visually sensed as being closer to the computing device than the second face as depicted in FIG. 5a. For instance, the face sensing module 206 of the computing device 10* sensing presence of a first face associated with the first user 20 and a second face associated with the second user 30 in the proximate vicinity of the computing device 10*, the first face being visually sensed as being closer to the computing device 10* than the second face 30. For example, the face sensing module 206 using one or more cameras 16 may visually determine which face (e.g., which face of the first user 20, the second user 30, or any other user) is closer to at least the front side 17a of the computing device 10*.

In the same or different implementations, operation 503 may additionally or alternatively include an operation 509 for sensing presence of at least one eye in the proximate vicinity of the computing device that is determined as being associated with the first user as further illustrated in FIG. 5a. For instance, the eye sensing module 208 (see FIG. 3c) of the computing device 10* sensing presence of at least one eye in the proximate vicinity of the computing device 10* that is determined by the eye sensing module 208 as being associated with the first user 20. Such a determination may be made using, for example a retina scanning system or application.

In some cases, operation 509 may involve an operation 510 for sensing presence of the at least one eye being at one or more specified locations relative to orientation of the computing device as further depicted in FIG. 5a. For instance, the eye sensing module 208 of the computing device 10* sensing presence of the at least one eye being at one or more specified locations (e.g., centered front side 17a) relative to orientation (e.g., front side 17a) of the computing device 10*.

In the same or different implementations, operation 509 may include an operation 511 for sensing absence of an eye in the proximate vicinity of the computing device that is determined to be not associated with the first user as further depicted in FIG. 5a. For instance, the eye sensing module 208 of the computing device 10* sensing absence of an eye (e.g., an eye not associated with the first user 20 or an eye associated with the second user 30) in the proximate vicinity of the computing device 10* that is determined by the eye sensing module 208 to be not associated with the first user 20.

As further illustrated in FIG. 5a, in some implementations, operation 511 may include an operation 512 for sensing absence of the eye at one or more specified locations relative to orientation of the computing device. For instance, the eye sensing module 208 of the computing device 10* sensing absence of the eye (e.g., an unrecognized eye or an eye associated with the second user 30) at one or more specified locations (e.g., predefined locations) relative to orientation of the computing device 10*.

Figure 5B:
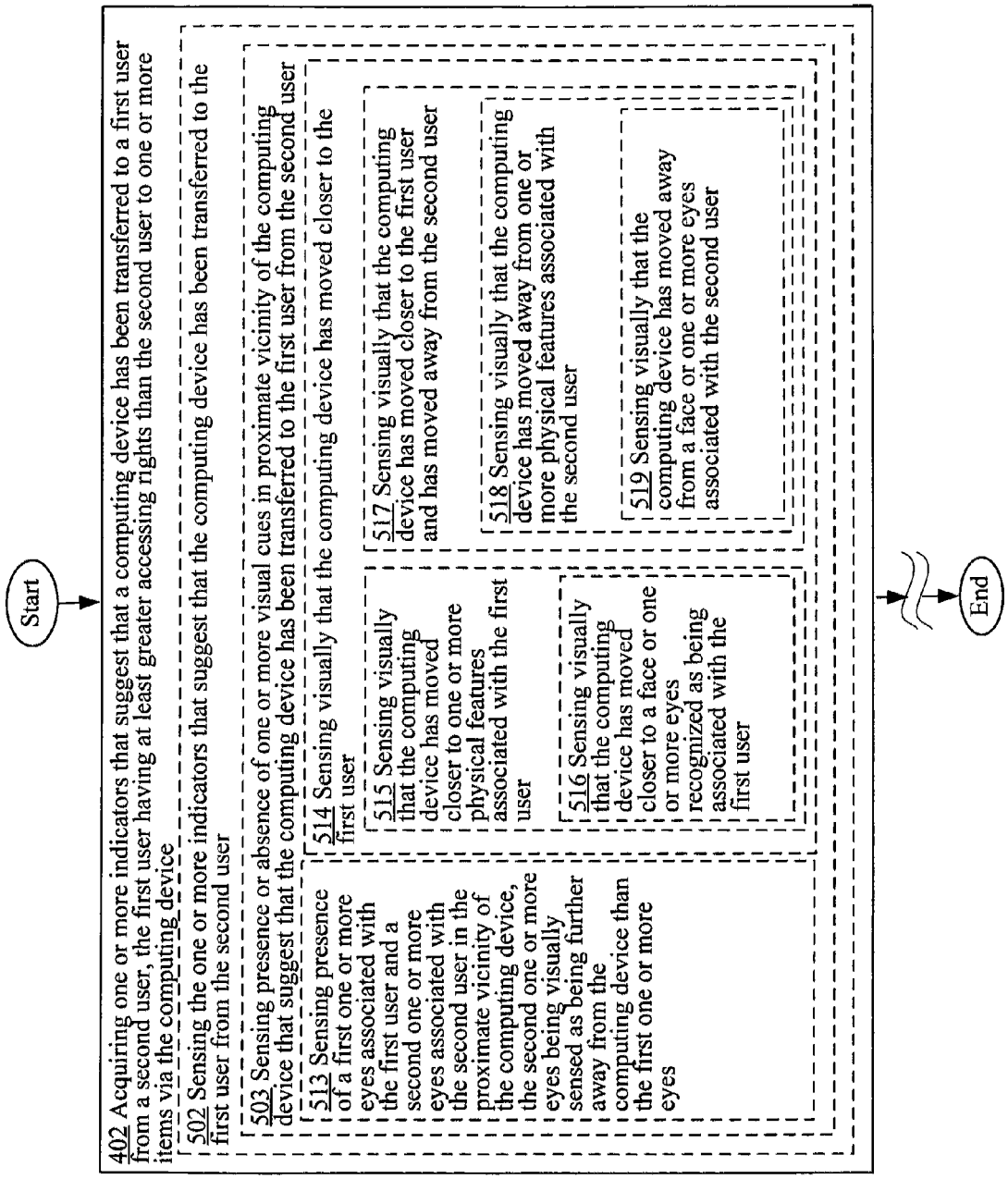
FIG. 5b is a high-level logic flowchart of a process depicting alternate implementations of the transfer indicator acquiring operation 402 of FIG. 4.

Turning now to FIG. 5b, in some cases, operation 503 may include an operation 513 for sensing presence of a first one or more eyes associated with the first user and a second one or more eyes associated with the second user in the proximate vicinity of the computing device, the second one or more eyes being visually sensed as being further away from the computing device than the first one or more eyes. For instance, the eye sensing module 208 of the computing device 10* sensing presence of a first one or more eyes associated with the first user 20 and a second one or more eyes associated with the second user 30 in the proximate vicinity of the computing device 10*, the second one or more eyes being visually sensed as being further away from the computing device 10* than the first one or more eyes.

In the same or different implementations, operation 503 may include an operation 514 for sensing visually that the computing device has moved closer to the first user. For instance, the visual cue sensing module 204 (see FIG. 3c) of the computing device 10* sensing (e.g., detecting) visually via, for example, one or more cameras 16, that the computing device 10* has moved closer to the first user 20. Note that although the computing device 10* is illustrated as having only a single camera 16 on the front side 17a of the computing device 10*, in alternative embodiments, the computing device 10* may include multiple cameras on the front side 17a of the computing device 10*. There are a number of ways to execute this operation. For example, detecting that a face or an eye recognized as being associated with the first user 20 is getting bigger.

As further illustrated in FIG. 5b, in some cases, operation 514 may further include one or more additional operations. For example, in some cases operation 514 may include an operation 515 for sensing visually that the computing device has moved closer to one or more physical features associated with the first user. For instance, the visual cue sensing module 204 of the computing device 10* sensing visually that the computing device 10* has moved closer to one or more physical features (e.g., face 22 or eye 24 of the first user 20 in FIG. 2e) associated with the first user 20.

As further illustrated in FIG. 5b, operation 515 in some implementations may include an operation 516 for sensing visually that the computing device has moved closer to a face or one or more eyes recognized as being associated with the first user. For instance, the visual cue sensing module 204 of the computing device 10* sensing visually (e.g., via one or more cameras 16) that the computing device 10* has moved closer to a face 22 or one or more eyes 24 recognized by the visual cue sensing module 204 as being associated with the first user 20.

In the same or different implementations, operation 514 for sensing visually that the computing device has moved closer to the first user may include an operation 517 for sensing visually that the computing device has moved closer to the first user and has moved away from the second user. For instance, the visual cue sensing module 204 of the computing device 10* sensing visually that the computing device 10* has moved closer to the first user 20 and has moved away from the second user 30.

In some cases, operation 517 may further include an operation 518 for sensing visually that the computing device has moved away from one or more physical features associated with the second user. For instance, the visual cue sensing module 204 of the computing device 10* sensing visually that the computing device 10* has moved away from one or more physical features (e.g., eye, face, head, and/or other features) associated with the second user 30.

As further illustrated in FIG. 5b, in some implementations, operation 518 may further include an operation 519 for sensing visually that the computing device has moved away from a face or one or more eyes associated with the second user. For instance, the visual cue sensing module 204 of the computing device 10* sensing visually that the computing device 10* has moved away from a face or one or more eyes associated with the second user 30.

Figure 5C:
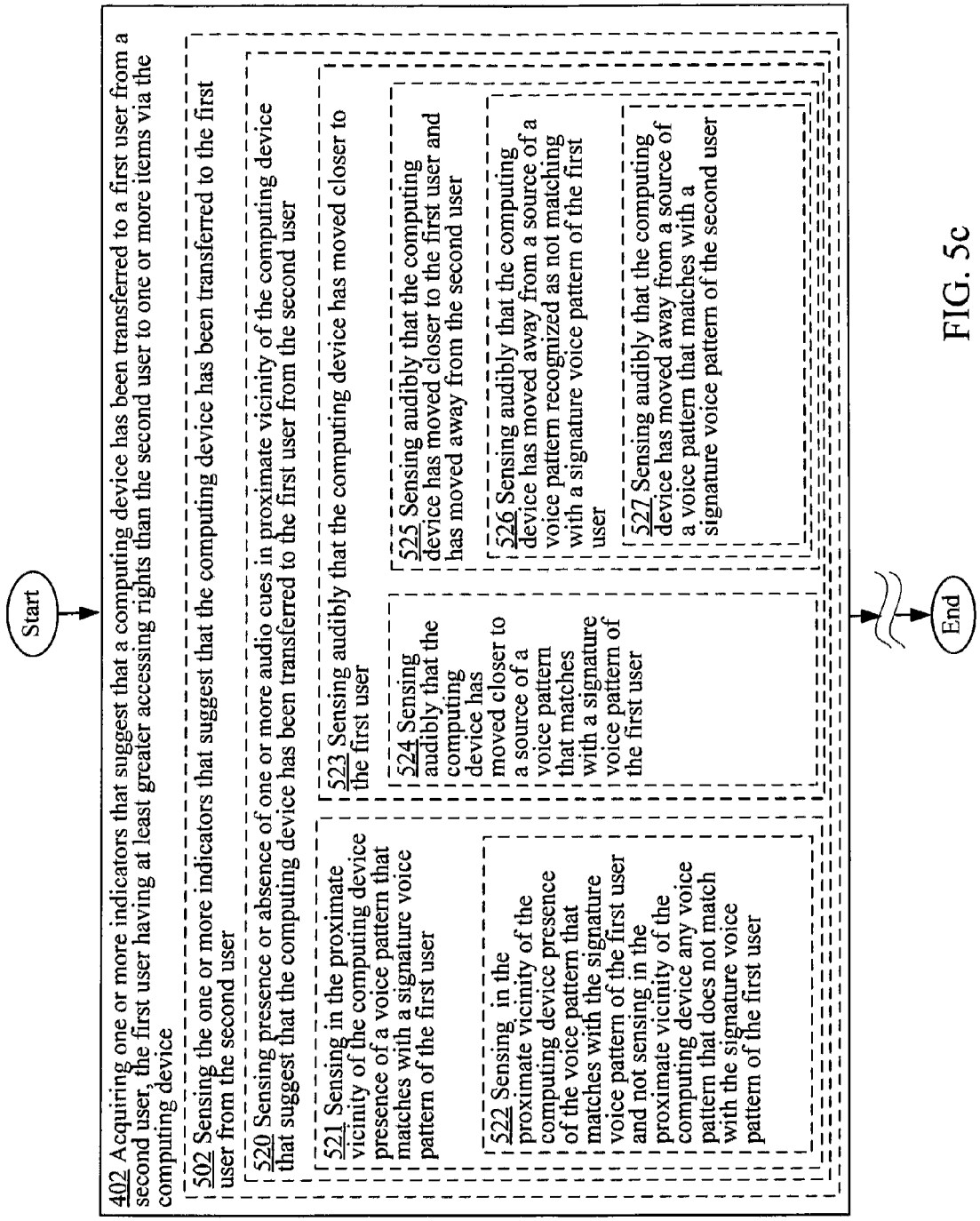
FIG. 5c is a high-level logic flowchart of a process depicting alternate implementations of the transfer indicator acquiring operation 402 of FIG. 4.

Turning now to FIG. 5c, in various implementations, the operation 502 for sensing the one or more indicators that suggest that the computing device has been transferred to the first user from the second user may include an operation 520 for sensing presence or absence of one or more audio cues in proximate vicinity of the computing device that suggest that the computing device has been transferred to the first user from the second user. For instance, the audio cue sensing module 210 (see FIG. 3c) of the computing device 10* sensing presence or absence of one or more audio cues in proximate vicinity (of the computing device 10* that suggest that the computing device 10* has been transferred to the first user 20 from the second user 30. For example, in some cases, such an operation may involve initially detecting the presence of a voice pattern that matches with the signature voice pattern of the first user 20* in the proximate vicinity of the computing device 10*. In various embodiments, the one or more audio cues may be detected by the audio cue sensing module 210 using data provided by, for example, one or more audio capturing devices 306 (see FIG. 3f) of the computing device 10*.

As further illustrated in FIG. 5c, in various implementations operation 520 may comprise one or more additional operations. For example, in some cases, operation 520 may include an operation 521 for sensing in the proximate vicinity of the computing device presence of a voice pattern that matches with a signature voice pattern of the first user. For instance, the voice pattern sensing module 212 (see FIG. 3c) of the computing device 10* sensing in the proximate vicinity of the computing device 10* presence of a voice pattern that matches with a signature voice pattern of the first user 20.

In some implementations, operation 521 may further include an operation 522 for sensing in the proximate vicinity of the computing device presence of the voice pattern that matches with the signature voice pattern of the first user and not sensing in the proximate vicinity of the computing device any voice pattern that does not match with the signature voice pattern of the first user. For instance, the voice pattern sensing module 212 of the computing device 10* sensing in the proximate vicinity of the computing device 10* presence of the voice pattern that matches with the signature voice pattern of the first user 20 and not sensing in the proximate vicinity of the computing device 10* any voice pattern that does not match with the signature voice pattern of the first user 20.

As further illustrated in FIG. 5c in some implementations operation 520 for sensing presence or absence of one or more audio cues in proximate vicinity of the computing device that suggest that the computing device has been transferred to the first user from the second user may include an operation 523 for sensing audibly that the computing device has moved closer to the first user. For instance, the audio cue sensing module 210 of the computing device 10* sensing audibly that the computing device 10* has moved closer to the first user 20*. Such an operation may be executed in some cases by, for example, determining that a source of a voice pattern that matches with the signature voice pattern of the first user 20 appears to be audibly getting closer to the computing device 10*.

In some cases, operation 523, in turn, may further include an operation 524 for sensing audibly that the computing device has moved closer to a source of a voice pattern that matches with a signature voice pattern of the first user. For instance, the audio cue sensing module 210 of the computing device 10* sensing audibly that the computing device 10* has moved closer to a source of a voice pattern that matches with a signature voice pattern of the first user 20 as determined by the voice pattern sensing module 212 of the computing device 10*.

In the same or alternative implementations, operation 523 may include an operation 525 for sensing audibly that the computing device has moved closer to the first user and has moved away from the second user. For instance, the audio cue sensing module 210 of the computing device 10* sensing audibly that the computing device 10* has moved closer to the first user 20 and has moved away from the second user 30.

As further depicted in FIG. 5c, operation 525 may further include one or more additional operations in various alternative implementations. For example, in some cases, operation 525 may include an operation 526 for sensing audibly that the computing device has moved away from a source of a voice pattern recognized as not matching with a signature voice pattern of the first user. For instance, the audio cue sensing module 210 including the voice pattern sensing module 212 of the computing device 10* sensing audibly that the computing device 10* has moved away from a source of a voice pattern recognized by the voice pattern sensing module 212 as not matching with a signature voice pattern of the first user 20.

As further illustrated in FIG. 5c, operation 526, in some implementations, may further comprise an operation 527 for sensing audibly that the computing device has moved away from a source of a voice pattern that matches with a signature voice pattern of the second user. For instance, the audio cue sensing module 210 including the voice pattern sensing module 212 of the computing device 10* sensing audibly that the computing device 10* has moved away from a source of a voice pattern that matches with a signature voice pattern of the second user 30 as recognized by the voice pattern sensing module 212.

Figure 5D:
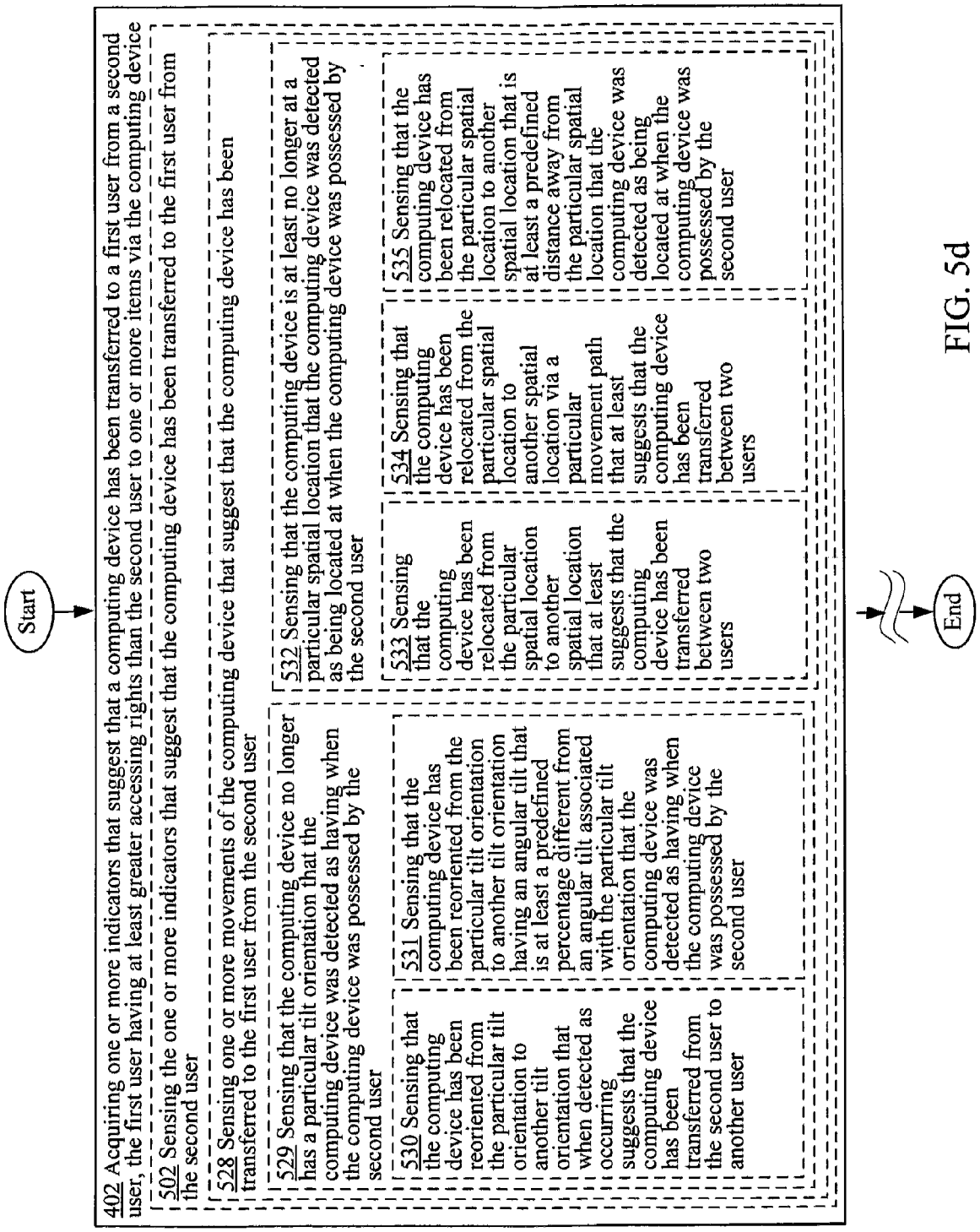
FIG. 5d is a high-level logic flowchart of a process depicting alternate implementations of the transfer indicator acquiring operation 402 of FIG. 4.

Referring now to FIG. 5d, in some implementations, the operation 502 for sensing the one or more indicators that suggest that the computing device has been transferred to the first user from the second user may include an operation 528 for sensing one or more movements of the computing device that suggest that the computing device has been transferred to the first user from the second user. For instance, the movement sensing module 216 (see FIG. 3c) of the computing device 10* sensing one or more movements of the computing device 10* that suggest that the computing device 10* has been transferred to the first user 20 from the second user 30. The phrase "sensing directly one or more movements" is in reference to the direct detection of the movements of the computing device 10* rather than detecting such movements of the computing device 10* based on visual and/or audio cues.

As further illustrated in FIG. 5d, operation 528 may include one or more additional operations in various alternative implementations. For example, in some cases, operation 528 may include an operation 529 for sensing that the computing device no longer has a particular tilt orientation that the computing device was detected as having when the computing device was possessed by the second user. For instance, the tilt sensing module 218 (see FIG. 3c) of the computing device 10* sensing by using one or more movement sensors 302 that the computing device 10* no longer has a particular tilt orientation that the computing device 10* was detected as having when the computing device 10* was possessed by the second user 30.

In some cases, operation 529 may include an operation 530 for sensing that the computing device has been reoriented from the particular tilt orientation to another tilt orientation that when detected as occurring suggests that the computing device has been transferred from the second user to another user. For instance, the tilt sensing module 218 of the computing device 10* sensing that the computing device 10* has been reoriented from the particular tilt orientation to another tilt orientation that when detected as occurring at least suggests that the computing device 10* has been transferred from the second user 30 to another user.

In the same or different implementations, operation 529 may include an operation 531 for sensing that the computing device has been reoriented from the particular tilt orientation to another tilt orientation having an angular tilt that is at least a predefined percentage different from an angular tilt associated with the particular tilt orientation that the computing device was detected as having when the computing device was possessed by the second user. For instance, the tilt sensing module 218 of the computing device 10* sensing that the computing device 10* has been reoriented from the particular tilt orientation to another tilt orientation having an angular tilt that is at least a predefined percentage different from an angular tilt associated with the particular tilt orientation that the computing device 10* was detected as having when the computing device 10* was possessed by the second user 30.

In the same or different implementations, the operation 528 for sensing one or more movements of the computing device that suggest that the computing device has been transferred to the first user from the second user may additionally or alternatively include an operation 532 for sensing that the computing device is at least no longer at a particular spatial location that the computing device was detected as being located at when the computing device was possessed by the second user as further illustrated in FIG. 5d. For instance, the spatial location sensing module 220 (see FIG. 3c) of the computing device 10* sensing by using one or more movement sensors 302 that the computing device 10* is at least no longer at a particular spatial location that the computing device 10* was detected as being located at when the computing device 10* was possessed by the second user 30.

As further illustrated in FIG. 5d, in various implementations operation 532 may include one or more additional operations including an operation 533 for sensing that the computing device has been relocated from the particular spatial location to another spatial location that at least suggests that the computing device has been transferred between two users. For instance, the spatial location sensing module 220 of the computing device 10* sensing that the computing device 10* has been relocated from the particular spatial location to another spatial location that at least suggests that the computing device 10* has been transferred between two users.

In the same or different implementations, operation 532 may include an operation 534 for sensing that the computing device has been relocated from the particular spatial location to another spatial location via a particular movement path that at least suggests that the computing device has been transferred between two users. For instance, the spatial location sensing module 220 including the movement path sensing module 221 (see FIG. 3c) of the computing device 10* sensing that the computing device 10* has been relocated from the particular spatial location to another spatial location via a particular movement path as sensed by the movement path sensing module 221 that at least suggests that the computing device 10* has been transferred between two users.

In the same or different implementations, operation 532 may include an operation 535 for sensing that the computing device has been relocated from the particular spatial location to another spatial location that is at least a predefined distance away from the particular spatial location that the computing device was detected as being located at when the computing device was possessed by the second user. For instance, the spatial location sensing module 220 of the computing device 10*sensing that the computing device 10* has been relocated from the particular spatial location to another spatial location that is at least a predefined distance away from the particular spatial location that the computing device 10* was detected as being located at when the computing device 10* was possessed by the second user 20. In some implementations, such an operation may be executed in order to disregard "noise" movements that may as a result of random or accidental movements of the computing device 10* (e.g., those random or accidental movements of the computing device 10* caused by, for example, the second user 30 who may be holding the computing device 10).

Figure 5E:
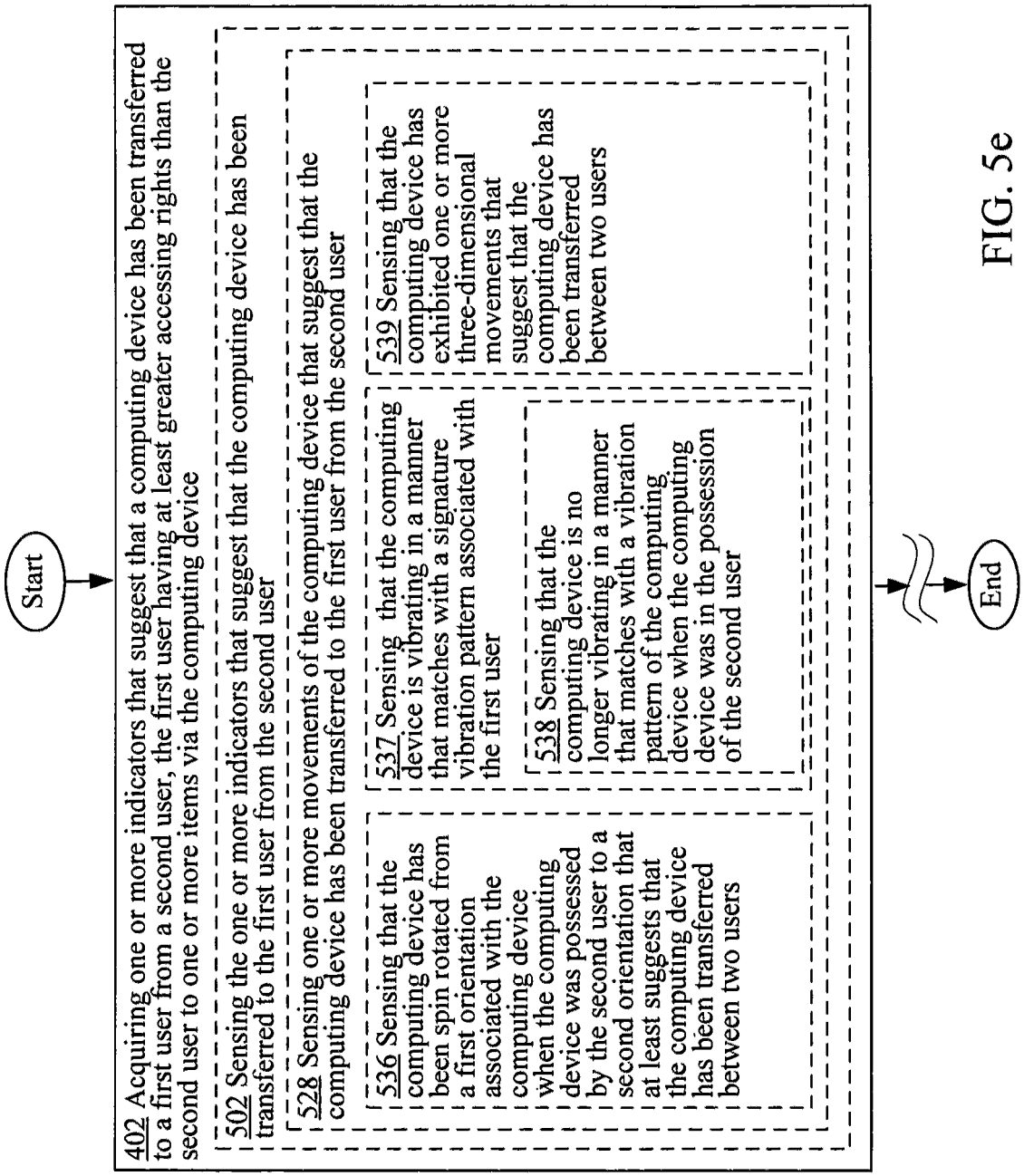
FIG. 5e is a high-level logic flowchart of a process depicting alternate implementations of the transfer indicator acquiring operation 402 of FIG. 4.

Turning now to FIG. 5e, in various implementations, operation 528 for sensing one or more movements of the computing device that suggest that the computing device has been transferred to the first user from the second user may include an operation 536 for sensing that the computing device has been spin rotated from a first orientation associated with the computing device when the computing device was possessed by the second user to a second orientation that at least suggests that the computing device has been transferred between two users. For instance, the spin rotation sensing module 222 of the computing device 10* sensing by using one or more movement sensors 302 that the computing device 10* has been spin rotated from a first orientation associated with the computing device 10* when the computing device 10* was possessed by the second user 30 to a second orientation that at least suggests that the computing device 10* has been transferred between two users.

In the same or different implementations, operation 528 may include an operation 537 for sensing that the computing device is vibrating in a manner that matches with a signature vibration pattern associated with the first user. For instance, the vibration sensing module 224 (see FIG. 3c) of the computing device 10* sensing by using one or more movement sensors 302 that the computing device 10* is vibrating in a manner that matches with a signature vibration pattern (e.g., heart beat or particular tremor) associated with the first user 20.

As further illustrated in FIG. 5e, in some implementations, operation 537 may include an operation 538 for sensing that the computing device is no longer vibrating in a manner that matches with a vibration pattern of the computing device when the computing device was in the possession of the second user. For instance, the vibration sensing module 224 (see FIG. 3c) of the computing device 10* sensing that the computing device 10* is no longer vibrating in a manner that matches with a vibration pattern of the computing device 10* when the computing device 10* was in the possession of the second user 30. When such vibration changes are detected, it may be an inference that the second user 30 may have at least given up possession of the computing device 10*.

In some cases, operation 528 may additionally or alternative include an operation 539 for sensing that the computing device has exhibited one or more three-dimensional movements that suggest that the computing device has been transferred between two users. For instance, the three-dimensional movement sensing module 226 (see FIG. 3c) of the computing device 10* sensing that the computing device 10* has exhibited one or more three-dimensional movements (e.g., overall three-dimensional movements of the computing device 10* that may comprise of various types of specific movements including tilt movements, spin rotation movements, spatial locational movements, and so forth) that suggest that the computing device 10* has been transferred between two users. For example, suppose the computing device 10* exhibits certain three-dimensional movements, which may be as a result of the second user 30 moving the computing device 10*. Upon detection, a determination may be made as to whether the detected three-dimensional movements matches with signature three-dimensional movements of the computing device 10* that are known to be associated with transfer of the computing device 10* between two users. If indeed, the detected three-dimensional movement matches with the signature three-dimensional movements then at least an inference may be made that the computing device 10* has been transferred between two users (e.g., transferred from the second user 30 to the first user 20).

Figure 5F:
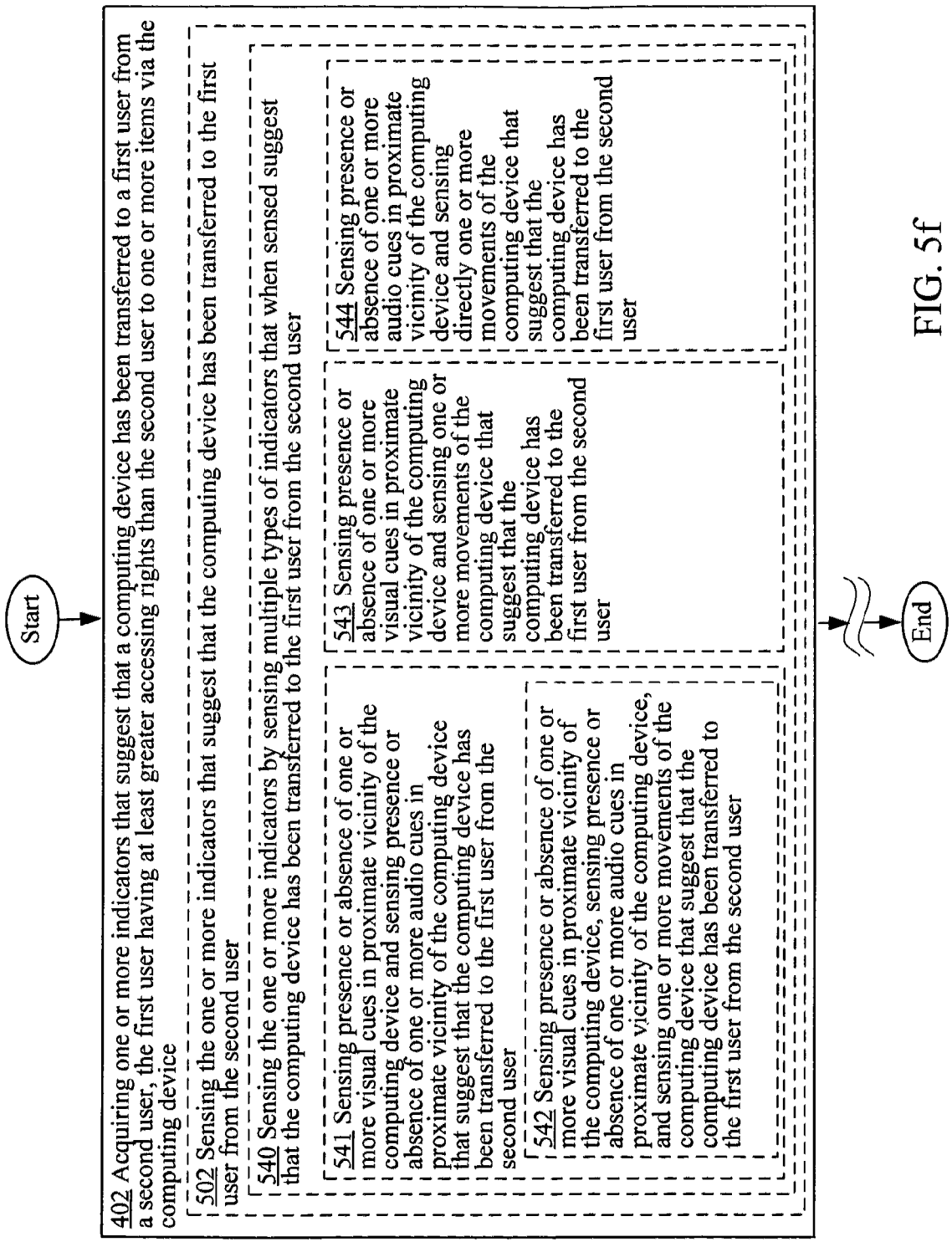
FIG. 5*f* is a high-level logic flowchart of a process depicting alternate implementations of the transfer indicator acquiring operation 402 of FIG. 4.

Referring now to FIG. 5f, in various implementations, operation 502 for sensing the one or more indicators that suggest that the computing device has been transferred to the first user from the second user may include an operation 540 for sensing the one or more indicators by sensing multiple types of indicators that when sensed suggest that the computing device has been transferred to the first user from the second user. For instance, the sensing module 202 of the computing device 10* sensing the one or more indicators by sensing multiple types of indicators (e.g., audio indicator, visual indicator, and/or movement indicator) that when sensed suggest that the computing device 10* has been transferred to the first user 20 from the second user 30.

As further illustrated in FIG. 5f, in some implementations operation 540 may further include an operation 541 for sensing presence or absence of one or more visual cues in proximate vicinity of the computing device and sensing presence or absence of one or more audio cues in proximate vicinity of the computing device that suggest that the computing device has been transferred to the first user from the second user. For instance, the visual cue sensing module 204 of the computing device 10* sensing presence or absence of one or more visual cues (e.g., presence or absence of a face or an eye) in proximate vicinity of the computing device 10* and the audio cue sensing module 210 of the computing device 10* sensing presence or absence of one or more audio cues (e.g., sensing presence or absence of voice patterns) in proximate vicinity of the computing device 10* that suggest that the computing device 10* has been transferred to the first user 20 from the second user 30.

As further illustrated in FIG. 5f, in some implementations operation 541 may further include an operation 542 for sensing presence or absence of one or more visual cues in proximate vicinity of the computing device, sensing presence or absence of one or more audio cues in proximate vicinity of the computing device, and sensing one or more movements of the computing device that suggest that the computing device has been transferred to the first user from the second user. For instance, the visual cue sensing module 204 of the computing device 10* sensing presence or absence of one or more visual cues in proximate vicinity of the computing device 10*, the audio cue sensing module 210 of the computing device 10* sensing presence or absence of one or more audio cues in proximate vicinity of the computing device 10*, and the movement sensing module 216 of the computing device 10* sensing one or more movements of the computing device 10* that suggest that the computing device 10* has been transferred to the first user 20 from the second user 30.

In some alternative implementations, operation 540 may alternatively include an operation 543 for sensing presence or absence of one or more visual cues in proximate vicinity of the computing device and sensing one or more movements of the computing device that suggest that the computing device has been transferred to the first user from the second user. For instance the visual cue sensing module 204 of the computing device 10* sensing presence or absence of one or more visual cues in proximate vicinity of the computing device 10* and the movement sensing module 216 of the computing device 10* sensing one or more movements of the computing device 10* that suggest that the computing device 10* has been transferred to the first user 20 from the second user 30.

In some alternative implementations, operation 540 may alternatively include an operation 544 for sensing presence or absence of one or more audio cues in proximate vicinity of the computing device and sensing one or more movements of the computing device that suggest that the computing device has been transferred to the first user from the second user. For instance, the audio cue sensing module 210 of the computing device 10* sensing presence or absence of one or more audio cues in proximate vicinity of the computing device 10* and the movement sensing module 216 sensing one or more movements of the computing device 10* that suggest that the computing device 10* has been transferred to the first user 20 from the second user 30.

Figure 5G:
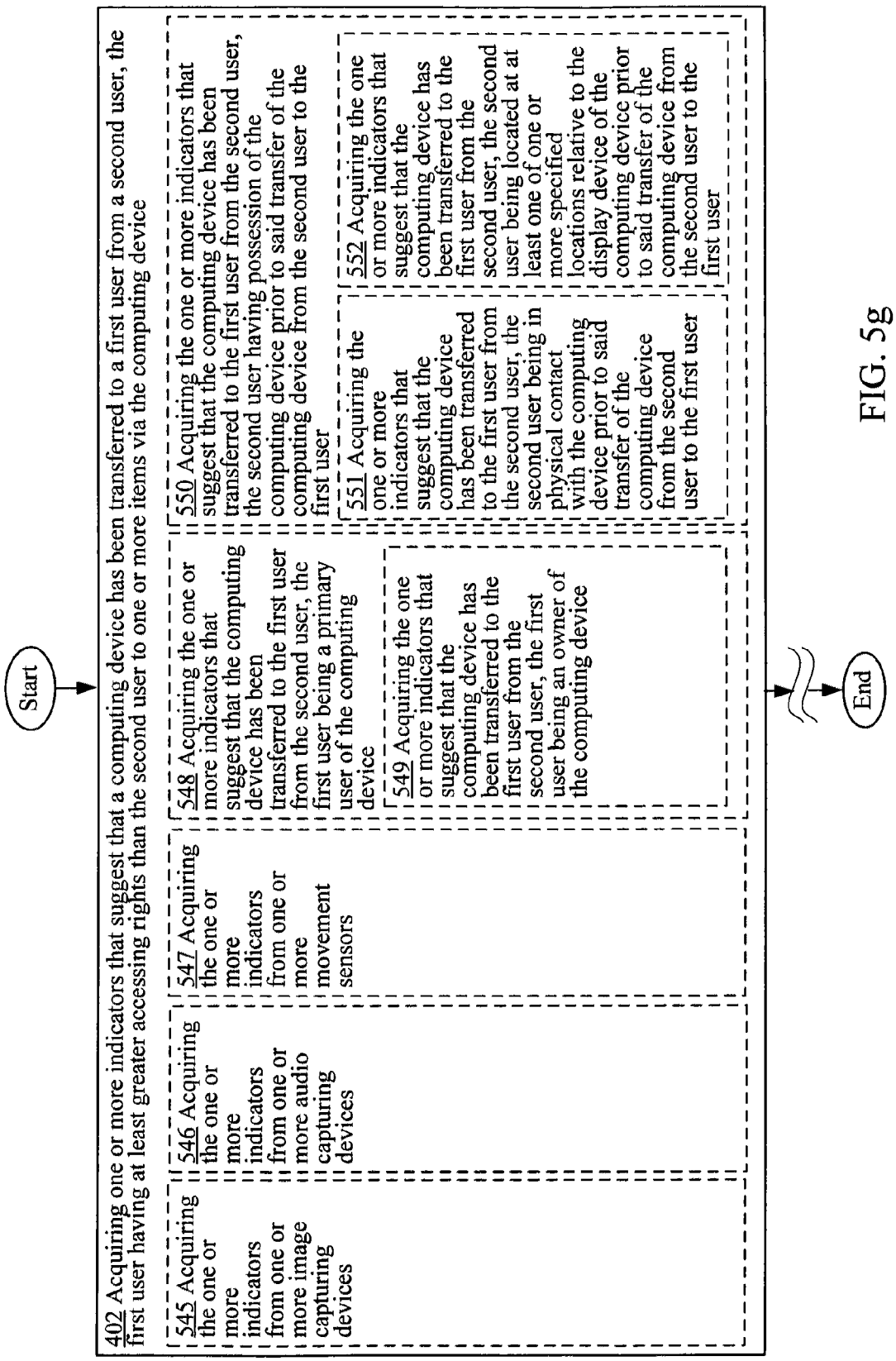
FIG. 5*g* is a high-level logic flowchart of a process depicting alternate implementations of the transfer indicator acquiring operation 402 of FIG. 4.

Turning now to FIG. 5g, in various implementations, the transfer indicator acquiring operation 402 for acquiring one or more indicators that suggest that a computing device has been transferred to a first user from a second user, the first user having at least greater accessing rights than the second user to one or more items via the computing device may include an operation 545 for acquiring the one or more indicators from one or more image capturing devices. For instance, the transfer indicator acquisition module 102* of the computing device 10* acquiring the one or more indicators from one or more image capturing devices 304 (e.g., a digital camera, a webcam, an infrared device, and so forth).

In the same or different implementations, the transfer indicator acquiring operation 402 may additionally or alternatively include an operation 546 for acquiring the one or more indicators from one or more audio capturing devices. For instance, the transfer indicator acquisition module 102* of the computing device 10* acquiring the one or more indicators from one or more audio capturing devices 306 (e.g., microphones).

In the same or different implementations, the transfer indicator acquiring operation 402 may additionally or alternatively include an operation 547 for acquiring the one or more indicators from one or more movement sensors. For instance, the transfer indicator acquisition module 102* of the computing device 10* acquiring the one or more indicators from one or more movement sensors 302 such as one or more inertia sensors, one or more accelerometers (e.g. three-axis or 3D accelerometers), one or more gyroscopes, and/or other types of movement/motion sensors.

In the same or different implementations, the transfer indicator acquiring operation 402 may additionally or alternatively include an operation 548 for acquiring the one or more indicators that suggest that the computing device has been transferred to the first user from the second user, the first user being a primary user of the computing device. For instance, the transfer indicator acquisition module 102* of the computing device 10* acquiring the one or more indicators that suggest that the computing device 10* has been transferred to the first user 20 from the second user 30, the first user 20 being a primary user (e.g., an owner of the computing device 10* or a user assigned to the computing device 10*) of the computing device 10*.

As illustrated in FIG. 5g, operation 548 in some implementations may include an operation 549 for acquiring the one or more indicators that suggest that the computing device has been transferred to the first user from the second user, the first user being an owner of the computing device. For instance, the transfer indicator acquisition module 102* of the computing device 10* acquiring the one or more indicators that suggest that the computing device 10* has been transferred to the first user 20 from the second user 30, the first user 20 being an owner of the computing device 10*.

In the same or different implementations, the transfer indicator acquiring operation 402 may additionally or alternatively include an operation 550 for acquiring the one or more indicators that suggest that the computing device has been transferred to the first user from the second user, the second user having possession of the computing device prior to said transfer of the computing device from the second user to the first user. For instance, the transfer indicator acquisition module 102* of the computing device 10* acquiring the one or more indicators that suggest that the computing device 10* has been transferred to the first user 20 from the second user 30, the second user 30 having possession of (e.g., being in physical contact or holding) the computing device 10* prior to said transfer of the computing device 10* from the second user 30 to the first user 20.

In some cases, operation 550 may further include an operation 551 for acquiring the one or more indicators that suggest that the computing device has been transferred to the first user from the second user, the second user being in physical contact with the computing device prior to said transfer of the computing device from the second user to the first user. For instance, the transfer indicator acquisition module 102* of the computing device 10* acquiring the one or more indicators that suggest that the computing device 10* has been transferred to the first user 20 from the second user 30, the second user 30 being in physical contact with the computing device 10* prior to said transfer of the computing device 10* from the second user 30 to the first user 20.

In some implementations, operation 550 may additionally or alternatively include an operation 552 for acquiring the one or more indicators that suggest that the computing device has been transferred to the first user from the second user, the second user being located at at least one of one or more specified locations relative to the display device of the computing device prior to said transfer of the computing device from the second user to the first user. For instance, the transfer indicator acquisition module 102* of the computing device 10* acquiring the one or more indicators that suggest that the computing device 10* has been transferred to the first user 20 from the second user 30, the second user 30 being located at least one of one or more specified locations (e.g., centered on the front side 17a of the computing device 10*) relative to the display device 12 of the computing device 10* prior to said transfer of the computing device 10* from the second user 30 to the first user 20.

Figure 6:
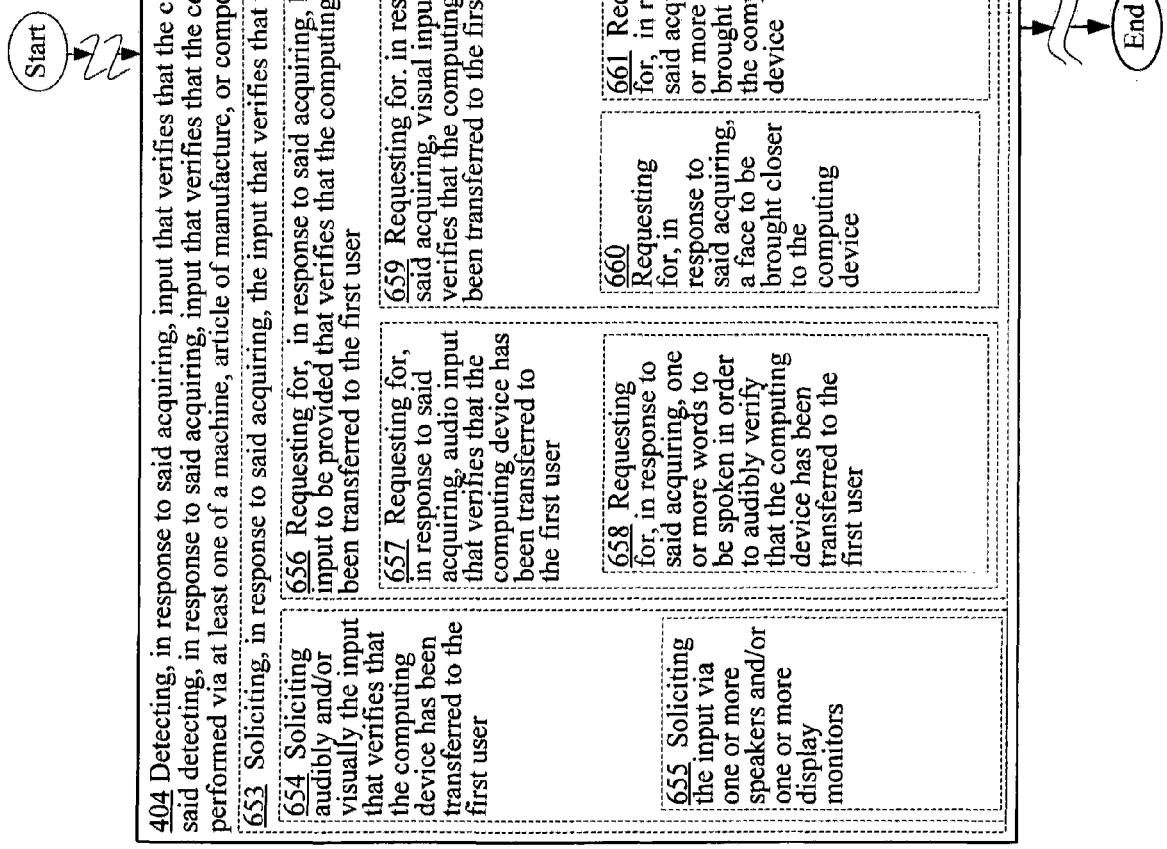
FIG. 6 is a high-level logic flowchart of a process depicting alternate implementations of the verification input detecting operation 404 of FIG. 4.

Referring back to the verification input detecting operation 404 of FIG. 4, the verification input detecting operation 404 similar to the transfer indicator acquiring operation 402 of FIG. 4 may be executed in a number of different ways in various alternative implementations as illustrated in FIG. 6. In some implementations, for example, the verification input soliciting operation 404 may include an operation 653 for soliciting, in response to said acquiring, the input that verifies that the computing device has been transferred to the first user. For instance, the verification input soliciting module 228 of the computing device 10* soliciting, in response to said acquiring of the one or more indicators, the input that verifies that the computing device 10* has been transferred to the first user 20. Note that in various embodiments the solicitation of the input that verifies that the computing device 10* has been transferred to the first user 20 may be executed automatically in response to said acquiring of the one or more indicators that suggest that the computing device 10* has been transferred to the first user 20 from the second user 30.

As further illustrated in FIG. 6, operation 653 may, in turn, include one or more additional operations in various alternative implementations. For example, in some implementations, operation 653 may include an operation 654 for soliciting audibly and/or visually the input that verifies that the computing device has been transferred to the first user. For instance, the audio verification soliciting module 230 and/or the visual verification soliciting module 232 (see FIG. 3d) of the computing device 10* soliciting audibly and/or visually the input (e.g., biometric input and/or password input) that verifies that the computing device 10* has been transferred to the first user 20.

In some implementations, operation 654 may further include an operation 655 for soliciting the input via one or more speakers and/or one or more display monitors. For instance, the audio verification soliciting module 230 and/or the visual verification soliciting module 232 soliciting the input via one or more speakers 332 and/or one or more display monitors 330 (e.g., a touchscreen, an LCD display, and so forth).

In the same or different implementations, operation 653 may include an operation 656 for requesting for, in response to said acquiring, biometric input that verifies that the computing device has been transferred to the first user. For instance, the biometric verification requesting module 234 (see FIG. 3d) of the computing device 10* requesting for, in response to said acquiring of the one or more indicators that suggest that the computing device 10* has been transferred to the first user 20 from the second user 30, biometric input that verifies that the computing device 10* has been transferred to the first user 20. In other words, if the first user 20 has retained possession of the computing device 10* then requesting the first user 20* to provide biometric data to verify that the computing device 10* has indeed been transferred to the first user 20.

As further illustrated in FIG. 6, operation 656 may include one or more additional operations in various alternative implementations. For example, in some implementations, operation 656 may include an operation 657 for requesting for, in response to said acquiring, audio input that verifies that the computing device has been transferred to the first user. For instance, the audio input requesting module 236 (see FIG. 3d) of the computing device 10* requesting for, in response to said acquiring of the one or more indicators that suggest that the computing device 10* has been transferred to the first user 20 from the second user 30, audio input that verifies that the computing device 10* has been transferred to the first user 20. For example, if the first user 20 indeed has possession of the computing device 10* then audibly and/or visually request (via speaker 232 and/or display monitor 230) that the first user 20 vocalize to the computing device 10* (e.g., speak to a microphone 19 of the computing device 10*—see FIG. 2e).

In some cases, operation 657 may further include an operation 658 for requesting for, in response to said acquiring, one or more words to be spoken in order to audibly verify that the computing device has been transferred to the first user. For instance, audio input requesting module 236 (see FIG. 3d) of the computing device 10* requesting for, in response to said acquiring, one or more words to be spoken in order to audibly verify that the computing device 10* has been transferred to the first user 20. For example, if the first user 20 indeed has possession of the computing device 10* then audibly and/or visually request (via speaker 232 and/or display monitor 230) the first user 20 to say his or her name or to recite one or more words.

In the same or different implementations, operation 656 may include an operation 659 for requesting for, in response to said acquiring, visual input that verifies that the computing device has been transferred to the first user. For instance, the visual input requesting module 238 (see FIG. 3d) of the computing device 10* requesting for, in response to said acquiring of the one or more indicators that suggest that the computing device 10* has been transferred to the first user 20 from the second user 30, visual input that verifies that the computing device 10* has been transferred to the first user 20. For example, if the first user 20 indeed has possession of the computing device 10* then audibly and/or visually request (via speaker 232 and/or display monitor 230) that the first user 20 more clearly show some identifiable feature of the first user 20 to the camera 16 of the computing device 10*.

As further illustrated in FIG. 6, operation 659 in some implementations may include an operation 660 for requesting for, in response to said acquiring, a face to be brought closer to the computing device. For instance, the visual input requesting module 238 of the computing device 10* requesting for, in response to said acquiring, a face to be brought closer to the computing device 10*. For example, if the first user 20 has possession of the computing device 10* then requesting the first user 20 to bring his or her face closer to the camera 16 of the computing device 10* in order to execute, for example, a facial recognition application.

In the same or different implementations, operation 659 may include an operation 661 for requesting for, in response to said acquiring, one or more eyes to be brought closer to the computing device. For instance, the visual input requesting module 238 of the computing device 10* requesting for, in response to said acquiring, one or more eyes to be brought closer to the computing device 10*. For example, if the first user 20 has possession of the computing device 10* then requesting the first user 20 to bring his or her eye or eyes closer to the camera 16 of the computing device 10* in order to do, for example, a retinal scan.

As illustrated in FIG. 6, in various implementations, operation 653 for soliciting, in response to said acquiring, the input that verifies that the computing device has been transferred to the first user may include an operation 662 for requesting for, in response to said acquiring, one or more credentials to be entered that verifies that the computing device has been transferred to the first user. For instance, the credential verification requesting module 237 (see FIG. 3d) of the computing device 10* requesting for, in response to said acquiring of the one or more indicators that suggest that the computing device 10* has been transferred to the first user 20 from the second user 30, one or more credentials (e.g., password, username, secret answer to a question, etc.) to be entered via, for example, a touchscreen or a keypad that verifies that the computing device 10* has been transferred to the first user 20.

In the same or different implementations, operation 653 may additionally or alternatively include an operation 663 for requesting for, in response to said acquiring, a gesture to be executed that verifies that the computing device has been transferred to the first user. For instance, the gesture verification requesting module 239 (see FIG. 3d) of the computing device 10* requesting for, in response to said acquiring of the one or more indicators that suggest that the computing device 10* has been transferred to the first user 20 from the second user 30, a gesture to be executed (e.g., one or more finger movements on a touchscreen or hand/body gesture in front of a camera 16) that verifies that the computing device 10* has been transferred to the first user 20.

In some implementations, operation 663 may further comprise an operation 664 for requesting for, in response to said acquiring, the gesture to be executed through a touch screen in order to verify that the computing device has been transferred to the first user. For instance, the gesture verification requesting module 239 of the computing device 10* requesting for, in response to said acquiring, the gesture to be executed through a touch screen (e.g., display monitor 330 in FIG. 3a or in FIG. 3b) in order to verify that the computing device 10* has been transferred to the first user 20. For example, if the first user 20 has possession of the computing device 10* then the first user 20 may be asked to execute on the touchscreen a "secret gesture" that only the first user 20 (and the logic of the computing device 10*) knows about.

In some cases, operation 664 may further include an operation 665 for requesting for, in response to said acquiring, the gesture to be executed through a touch screen using one or more fingers. For instance, the gesture verification requesting module 239 of the computing device 10* requesting for, in response to said acquiring, the gesture to be executed through a touch screen using one or more fingers.

Figure 7A:
FIG. 7*a* is a high-level logic flowchart of a process depicting alternate implementations of the access providing operation 406 of FIG. 4.

Referring back to the access providing operation 406 of FIG. 4, the access providing operation 406 similar to the transfer indicator acquiring operation 402 and the verification input detecting operation 404 of FIG. 4 may be executed in a number of different ways in various alternative embodiments as illustrated in FIGS. 7a, 7b, 7c, 7d, and 7e. In some implementations, for example, the access providing operation 406 of FIG. 4 may include an operation 766 for providing at least greater access to the one or more items by providing greater access to the one or more items that were at least not partially accessible by the second user when the second user had possession of the computing device as illustrated in FIG. 7a. For instance, the access providing module 106* (e.g., the access providing module 106' of FIG. 3a or the access providing module 106" of FIG. 3b) of the computing device 10* providing at least greater access to one or more items by providing greater access to the one or more items (e.g., one or more applications 160, documents, audio or image files, passwords, and so forth) that were at least not partially accessible by the second user 30 when the second user 30 had possession of the computing device 10*.

In some implementations, operation 766 may include an operation 767 for providing at least greater access to the one or more items by providing greater access to the one or more items that were totally inaccessible by the second user when the second user had possession of the computing device. For instance, the access providing module 106* of the computing device 10* providing at least greater access to the one or more items by providing greater access to the one or more items (e.g., one or more documents and/or one or more applications 160) that were totally or entirely inaccessible (e.g., not visually or audibly visible, not editorially accessible, and/or not functionally accessible) by the second user 30 when the second user 30 had possession of the computing device 10*.

In the same or different implementations, the access providing operation 406 of FIG. 4 may include an operation 768 for providing total or unrestricted access to the one or more items as further illustrated in FIG. 7a. For instance, the access providing module 106* of the computing device 10* providing total or unrestricted access (e.g., absolute editorial access and/or functional access) to the one or more items (e.g., one or more applications 160 and/or one or more documents or files) in response to receiving the input verifying that the computing device 10* has been transferred to the first user 20.

In the same or different implementations, the access providing operation 406 may include an operation 769 for providing at least greater access to the one or more items by providing greater access to one or more items from a second level of access to the one or more items enjoyed by the second user when the second user had possession of the computing device to a first level of access to the one or more items, the second level of access being a diminished level of access to the one or more items compared with the first level of access. For instance, the access providing module 106* of the computing device 10* providing at least greater access via the computing device 10* to the one or more items by providing greater access to one or more items (e.g., word processing document) from a second level of access (e.g., read-only access) to the one or more items enjoyed by the second user 30 when the second user 30 had possession (e.g., had control) of the computing device 10* to a first level of access (e.g., full read/write access including editorial access) to the one or more items, the second level of access being a diminished level of access to the one or more items compared with the first level of access.

In the same or different implementations, the access providing operation 406 may additionally or alternatively include an operation 770 for providing greater visual access via the computing device to the one or more items as further illustrated in FIG. 7a. For instance, the visual access providing module 240 (see FIG. 3e) of the computing device 10* providing greater visual access via the computing device 10* to the one or more items in response to receiving the input verifying that the computing device 10* has been transferred to the first user 20. For example, if the one or more items are one or more textual messages (e.g., emails), then displaying the entire content of the messages rather than, for example, not displaying any indications of the existence of the one or more messages or displaying only the subject headings of the one or more messages as may have been the case when the computing device 10* was in the possession of the second user 30.

As further illustrated in FIG. 7a, in various implementations, operation 770 may include one or more additional operations. For example, in some implementations, operation 770 may include an operation 771 for providing visually one or more visual representations of the one or more items via the computing device, the one or more visual representations not being previously presented through the computing device when the second user had possession of the computing device. For instance, the visual representation providing module 241 (see FIG. 3e) of the computing device 10* providing visually one or more visual representations of the one or more items (e.g., displaying via a display monitor 330 one or more document titles of one or more documents) via the computing device 10*, the one or more visual representations not being previously presented through the computing device 10* when the second user 30 had possession of the computing device 10*.

In some cases, operation 771 may, in turn, include an operation 772 for replacing visually through the computing device and in response to said detecting of the input one or more obfuscating locum tenentes of one or more true visual representations of the one or more items with the one or more true visual representations, the one or more obfuscating locum tenentes having been presented through the computing device when the second user had possession of the computing device. For instance, the visual replacing module 242 (see FIG. 3e) of the computing device 10* replacing visually through the computing device 10* and in response to said detecting of the input one or more obfuscating locum tenentes (e.g., fake document titles) of one or more true visual representations of the one or more items (e.g., word processing documents) with the one or more true visual representations, the one or more obfuscating locum tenentes having been presented (e.g., displayed) through the computing device 10* when the second user 30 had possession of the computing device 10*.

As further illustrated in FIG. 7a, in the same or different implementations, the access providing operation 406 may include an operation 773 for providing greater audio access via the computing device to the one or more items. For instance, the audio access providing module 244 (see FIG. 3e) of the computing device 10* providing greater audio access via the computing device 10* to the one or more items (e.g., voice messages) in response to receiving the input verifying that the computing device 10* has been transferred to the first user 20. For example, if the one or more items are one or more voice messages then allowing greater access to such items may mean allowing, for example, the first user 20 to audibly play the one or more voice messages.

As further depicted in FIG. 7a, operation 773 may include one or more additional operations in various alternative implementations. For example, in some implementations, operation 773 may include an operation 774 for providing audibly one or more audio representations of the one or more items via the computing device, the one or more audio representations not being previously presented through the computing device when the second user had possession of the computing device. For instance, the audio representation providing module 245 (see FIG. 3e) of the computing device 10* providing audibly one or more audio representations of the one or more items (e.g., one or more voice messages) via the computing device 10*, the one or more audio representations (e.g., audio indications of received messages) not being previously presented (e.g., visually displayed and/or audibly presented) through the computing device 10* when the second user 30 had possession of the computing device 10*.

In some cases, operation 774 may, in turn, include an operation 775 for replacing audibly through the computing device and in response to said detecting of the input one or more obfuscating locum tenentes of one or more true audio representations of the one or more items with the one or more true audio representations, the one or more obfuscating locum tenentes having been presented through the computing device when the second user had possession of the computing device. For instance, the audio replacing module 246 (see FIG. 3e) of the computing device 10* replacing audibly through the computing device 10* and in response to said detecting of the input one or more obfuscating locum tenentes (e.g., fake voice messages) of one or more true audio representations of the one or more items (e.g., voice messages) with the one or more true audio representations (e.g., actual voice messages), the one or more obfuscating locum tenentes having been presented through the computing device 10* when the second user 30 had possession of the computing device 10*.

Figure 7B:
FIG. 7*b* is a high-level logic flowchart of a process depicting alternate implementations of the access providing operation 406 of FIG. 4.

Turning now to FIG. 7b, in various implementations, the access providing operation 406 of FIG. 4 may include an operation 776 for presenting, via the computing device and in response at least in part to said detecting the input verifying that the computing device has been transferred to the first user, the one or more items in one or more formats that allow one or more editorial actions to be executed on one or more parts of the one or more items, the one or more editorial actions not previously available to be executed on the one or more parts of the one or more items when the second user was in possession of the computing device. For instance, the editable format presenting module 248 (see FIG. 3e) of the computing device 10* presenting, via the computing device 10* and in response at least in part to said detecting the input verifying that the computing device 10* has been transferred to the first user 20, the one or more items (e.g., word processing or spreadsheet documents) in one or more formats that allow one or more editorial actions to be executed on one or more parts of the one or more items, the one or more editorial actions not previously available to be executed on the one or more parts of the one or more items when the second user 30 was in possession of the computing device 10*.

As further illustrated in FIG. 7b, operation 776 may include one or more additional operations in various alternative implementations. For example, in some implementations, operation 776 may include an operation 777 for presenting, via the computing device and in response at least in part to said detecting the input verifying that the computing device has been transferred to the first user, the one or more items in one or more formats that allow all editorial actions to be executed on one or more parts of the one or more items, the editorial actions not being previously available to be executed on the one or more parts of the one or more items when the second user was in possession of the computing device. For instance, the editable format presenting module 248 of the computing device 10* presenting, via the computing device 10* and in response at least in part to said detecting the input verifying that the computing device 10* has been transferred to the first user 20, the one or more items (e.g., one or more presentation documents) in one or more formats (e.g., read/write formats) that allow all editorial actions (e.g., deletions, modifications, additions, and so forth) to be executed on one or more parts of the one or more items, the editorial actions not being previously available to be executed on the one or more parts of the one or more items when the second user 30 was in possession of the computing device 10*.

In the same or different implementations, operation 776 may additionally or alternatively include an operation 778 for presenting, via the computing device and in response at least in part to said detecting the input verifying that the computing device has been transferred to the first user, the one or more items in one or more formats that allow one or more deletions to be executed on one or more parts of the one or more items, the one or more deletions of the one or more parts of the one or more items not previously available for execution when the second user was in possession of the computing device. For instance, the deletable format presenting module 249 (see FIG. 3*e*) of the computing device 10\* presenting, via the computing device 10\* and in response at least in part to said detecting the input verifying that the computing device 10\* has been transferred to the first user 20, the one or more items in one or more formats that allow one or more deletions to be executed on one or more parts (e.g., a sentence or a word) of the one or more items (e.g., word processing documents), the one or more deletions of the one or more parts of the one or more items not previously available for execution when the second user 30 was in possession of the computing device 10\*.

In the same or different implementations, operation 776 may additionally or alternatively include an operation 779 for presenting, via the computing device and in response at least in part to said detecting the input verifying that the computing device has been transferred to the first user, the one or more items in one or more formats that allow one or more modifications to be executed on the one or more parts of the one or more items, the one or more modifications of the one or more parts of the one or more items not previously available for execution when the second user was in possession of the computing device. For instance, the modifiable format presenting module 250 (see FIG. 3*e*) of the computing device 10\* presenting, via the computing device 10\* and in response at least in part to said detecting the input verifying that the computing device 10\* has been transferred to the first user 20, the one or more items (e.g., word processing documents or image files) in one or more formats that allow one or more modifications (e.g., revisions or alterations) to be executed on the one or more parts of the one or more items, the one or more modifications of the one or more parts of the one or more items not previously available for execution when the second user 30 was in possession of the computing device 10\*.

In the same or different implementations, operation 776 may additionally or alternatively include an operation 780 for presenting, via the computing device and in response at least in part to said detecting the input verifying that the computing device has been transferred to the first user, the one or more items in one or more formats that allow one or more substitutions to be executed on the one or more parts of the one or more items, the one or more substitutions of the one or more parts of the one or more items not previously available for execution when the second user was in possession of the computing device. For instance, the substitutable format presenting module 251 (see FIG. 3*e*) of the computing device 10\* presenting, via the computing device 10\* and in response at least in part to said detecting the input verifying that the computing device 10\* has been transferred to the first user 20, the one or more items (e.g., spreadsheet documents) in one or more formats that allow one or more substitutions (e.g., substitute numbers) to be executed on the one or more parts of the one or more items, the one or more substitutions of the one or more parts of the one or more items not previously available for execution when the second user 30 was in possession of the computing device 10\*.

In the same or different implementations, operation 776 may additionally or alternatively include an operation 781 for presenting, via the computing device and in response at least in part to said detecting the input verifying that the computing device has been transferred to the first user, the one or more items in one or more formats that allow one or more additions to be executed on the one or more items, the one or more additions to the one or more items not previously available for execution when the second user was in possession of the computing device. For instance, the addable format presenting module 252 (see FIG. 3*e*) of the computing device 10\* presenting, via the computing device 10\* and in response at least in part to said detecting the input verifying that the computing device 10\* has been transferred to the first user 20, the one or more items (e.g., graphics or diagramming documents) in one or more formats that allow one or more additions to be executed on the one or more items, the one or more additions to the one or more items not previously available for execution when the second user 30 was in possession of the computing device 10\*.

Figure 7C:
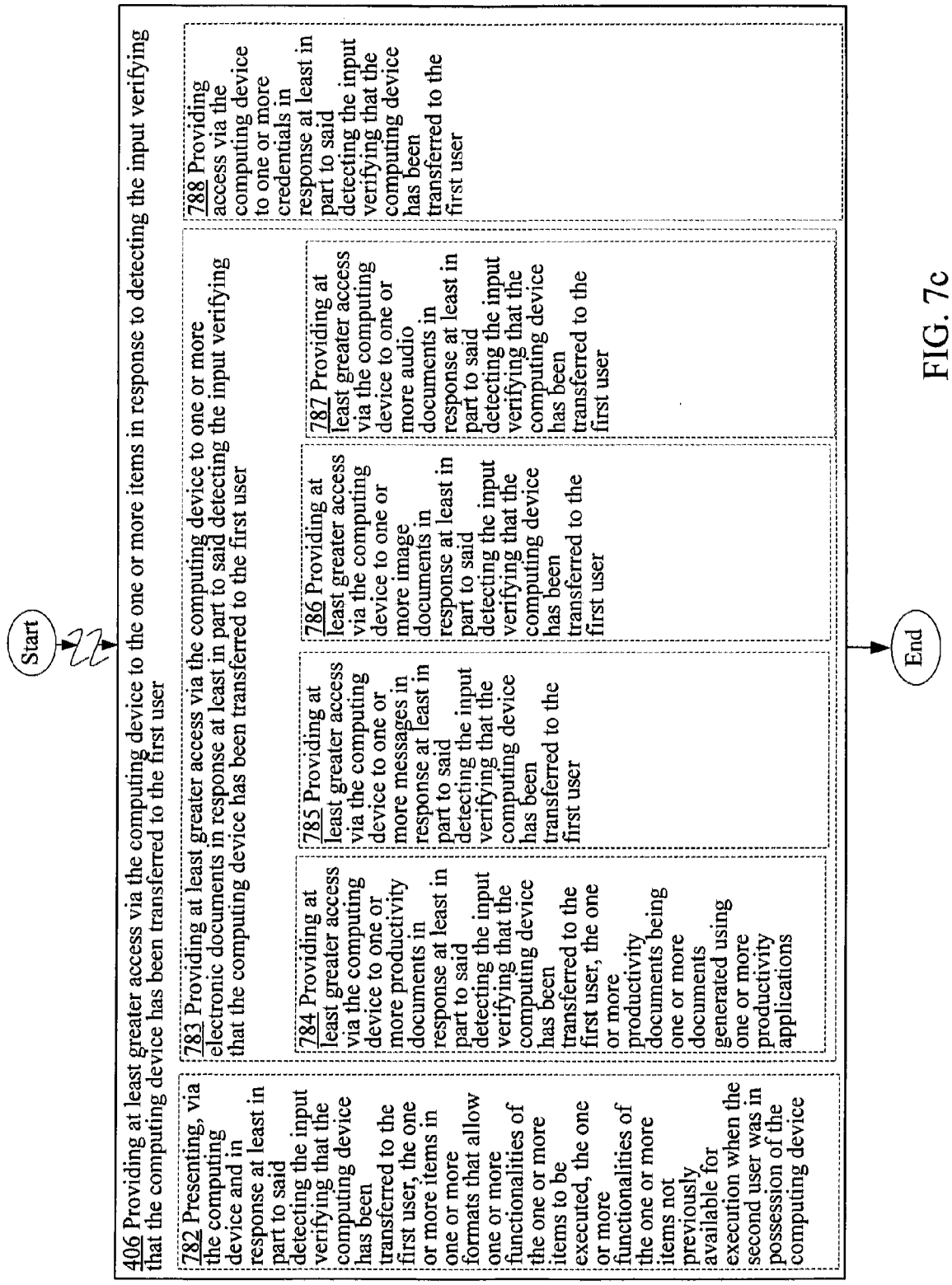
FIG. 7*c* is a high-level logic flowchart of a process depicting alternate implementations of the access providing operation 406 of FIG. 4.

Turning now to FIG. 7*c*, in various implementations, the access providing operation 406 of FIG. 4 may include an operation 782 for presenting, via the computing device and in response at least in part to said detecting the input verifying that the computing device has been transferred to the first user, the one or more items in one or more formats that allow one or more functionalities of the one or more items to be executed, the one or more functionalities of the one or more items not previously available for execution when the second user was in possession of the computing device. For instance, the functional format presenting module 254 (see FIG. 3*e*) of the computing device 10\* presenting, via the computing device 10\* and in response at least in part to said detecting the input verifying that the computing device 10\* has been transferred to the first user 20, the one or more items (e.g., one or more applications 160 such as a word processing application) in one or more formats that allow one or more functionalities (e.g., saving or copying features) of the one or more items to be executed, the one or more functionalities of the one or more items not previously available for execution when the second user 30 was in possession of the computing device 10\*.

As further illustrated in FIG. 7*c*, in some implementations, the access providing operation 406 may include an operation 783 for providing at least greater access via the computing device to one or more electronic documents in response at least in part to said detecting the input verifying that the computing device has been transferred to the first user. For instance, the access providing module 106\* of the computing device 10\* providing at least greater access via the computing device 10\* to one or more electronic documents (e.g., productivity documents, image files, and/or audio files) in response at least in part to said detecting the input verifying that the computing device 10\* has been transferred to the first user 20.

As further illustrated in FIG. 7*c*, operation 783 may include one or more additional operations in various alternative implementations. For example, in some cases, operation 783 may include an operation 784 for providing at least greater access via the computing device to one or more productivity documents in response at least in part to said detecting the input verifying that the computing device has been transferred to the first user, the one or more productivity documents being one or more documents generated using one or more productivity applications. For instance, the access providing module 106\* of the computing device 10\* providing at least greater access via the computing device 10\* to one or more productivity documents in response at least in part to said detecting the input verifying that the computing device 10\* has been transferred to the first user 20, the one or more productivity documents being one or more documents generated using one or more productivity applications (e.g., a word processing application, a spreadsheet application, a presentation application, a diagramming application, and so forth).

In some implementations, operation 783 may additionally or alternatively include an operation 785 for providing at least greater access via the computing device to one or more messages in response at least in part to said detecting the input verifying that the computing device has been transferred to the first user as further depicted in FIG. 7c. For instance, the access providing module 106* of the computing device 10* providing at least greater access via the computing device 10* to one or more messages in response at least in part to said detecting the input verifying that the computing device 10* has been transferred to the first user 20.

In some implementations, operation 783 may additionally or alternatively include an operation 786 for providing at least greater access via the computing device to one or more image documents in response at least in part to said detecting the input verifying that the computing device has been transferred to the first user. For instance, the access providing module 106* of the computing device 10* providing at least greater access via the computing device 10* to one or more image documents (e.g., video clips and/or digital image files) in response at least in part to said detecting the input verifying that the computing device 10* has been transferred to the first user 20.

In some implementations, operation 783 may additionally or alternatively include an operation 787 for providing at least greater access via the computing device to one or more audio documents in response at least in part to said detecting the input verifying that the computing device has been transferred to the first user. For instance, the access providing module 106* of the computing device 10* providing at least greater access via the computing device 10* to one or more audio documents (e.g., audio recordings and/or voice messages) in response at least in part to said detecting the input verifying that the computing device 10* has been transferred to the first user 20.

Referring back to FIG. 7c, in various implementations, the access providing operation 406 of FIG. 4 may additionally or alternatively include an operation 788 for providing access via the computing device to one or more credentials in response at least in part to said detecting the input verifying that the computing device has been transferred to the first user. For instance, the access providing module 106* of the computing device 10* providing access via the computing device 10* to one or more credentials (e.g., passwords) in response at least in part to said detecting the input verifying that the computing device 10* has been transferred to the first user 20.

Figure 7D:
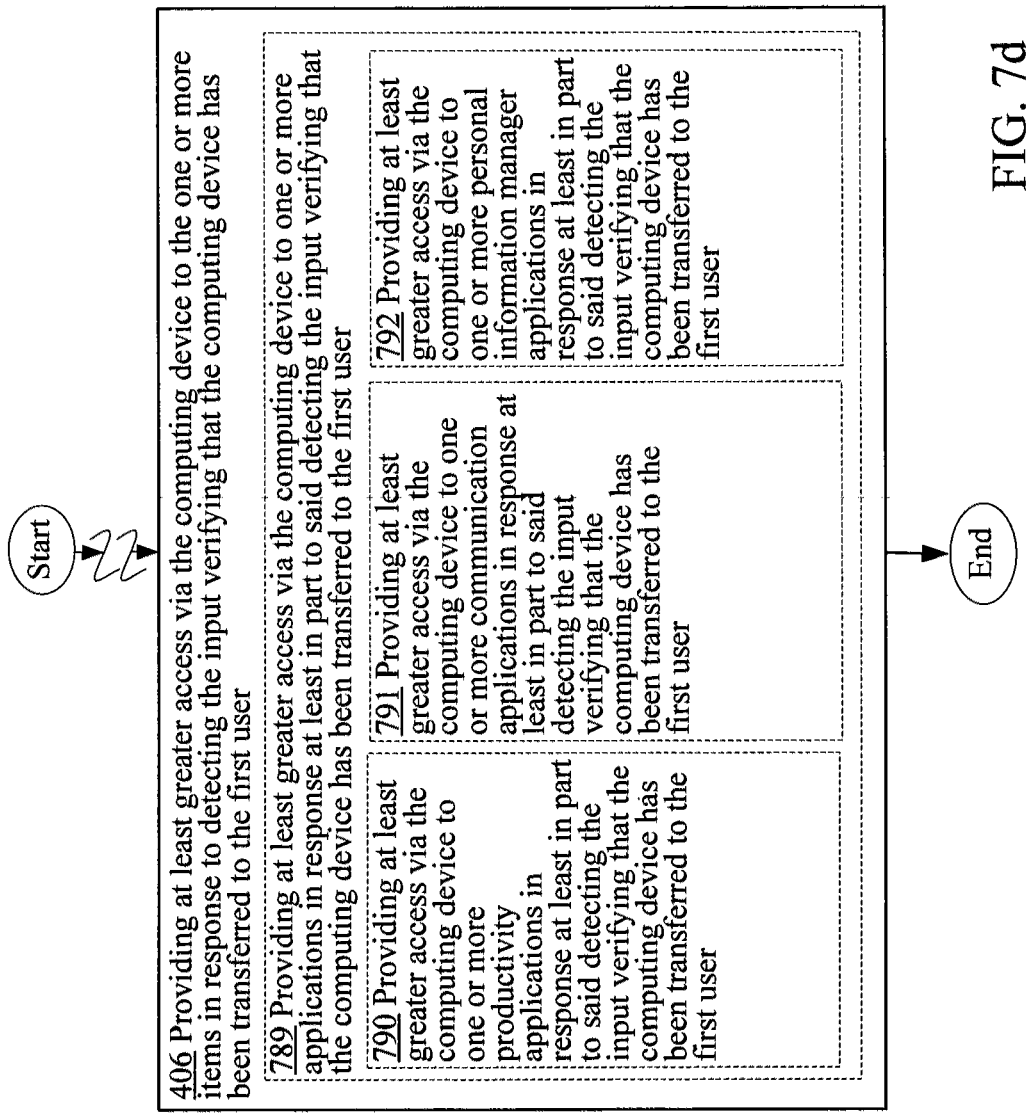
FIG. 7*d* is a high-level logic flowchart of a process depicting alternate implementations of the access providing operation 406 of FIG. 4.

Referring now to FIG. 7d, in some implementations, the access providing operation 406 may additionally or alternatively include an operation 789 for providing at least greater access via the computing device to one or more applications in response at least in part to said detecting the input verifying that the computing device has been transferred to the first user. For instance, the access providing module 106* of the computing device 10* providing at least greater access (e.g., greater access to one or more functionalities) via the computing device 10* to one or more applications 160 (see FIG. 3a or 3b) in response at least in part to said detecting the input verifying that the computing device 10* has been transferred to the first user 20. Note that although FIGS. 3a and 3b illustrate applications 160 as including, for example, one or more of operating system (OS) 162, one or more productivity applications 164, one or more communication applications 166, and/or one or more personal information manager applications 168, other types of applications may also be included as part of the one or more applications 160 including, for example, one or more gaming applications, one or more navigation applications, and/or other types of applications.

As further illustrated in FIG. 7d, operation 789 in various implementations may include one or more additional operations including an operation 790 for providing at least greater access via the computing device to one or more productivity applications in response at least in part to said detecting the input verifying that the computing device has been transferred to the first user. For instance, the access providing module 106* of the computing device 10* providing at least greater access via the computing device 10* to one or more productivity applications 160 in response at least in part to said detecting the input verifying that the computing device 10* has been transferred to the first user 20.

Alternatively or additionally, in some implementations, operation 789 may include an operation 791 for providing at least greater access via the computing device to one or more communication applications in response at least in part to said detecting the input verifying that the computing device has been transferred to the first user. For instance, the access providing module 106* of the computing device 10* providing at least greater access via the computing device 10* to one or more communication applications (e.g., email application, Instant messaging application, and so forth in response at least in part to said detecting the input verifying that the computing device 10* has been transferred to the first user 20.

In some implementations, operation 789 may additionally or alternatively include an operation 792 for providing at least greater access via the computing device to one or more personal information manager applications in response at least in part to said detecting the input verifying that the computing device has been transferred to the first user. For instance, the access providing module 106* of the computing device 10* providing at least greater access via the computing device 10* to one or more personal information manager applications (e.g., Microsoft Outlook) in response at least in part to said detecting the input verifying that the computing device 10* has been transferred to the first user 20.

Figure 7E:
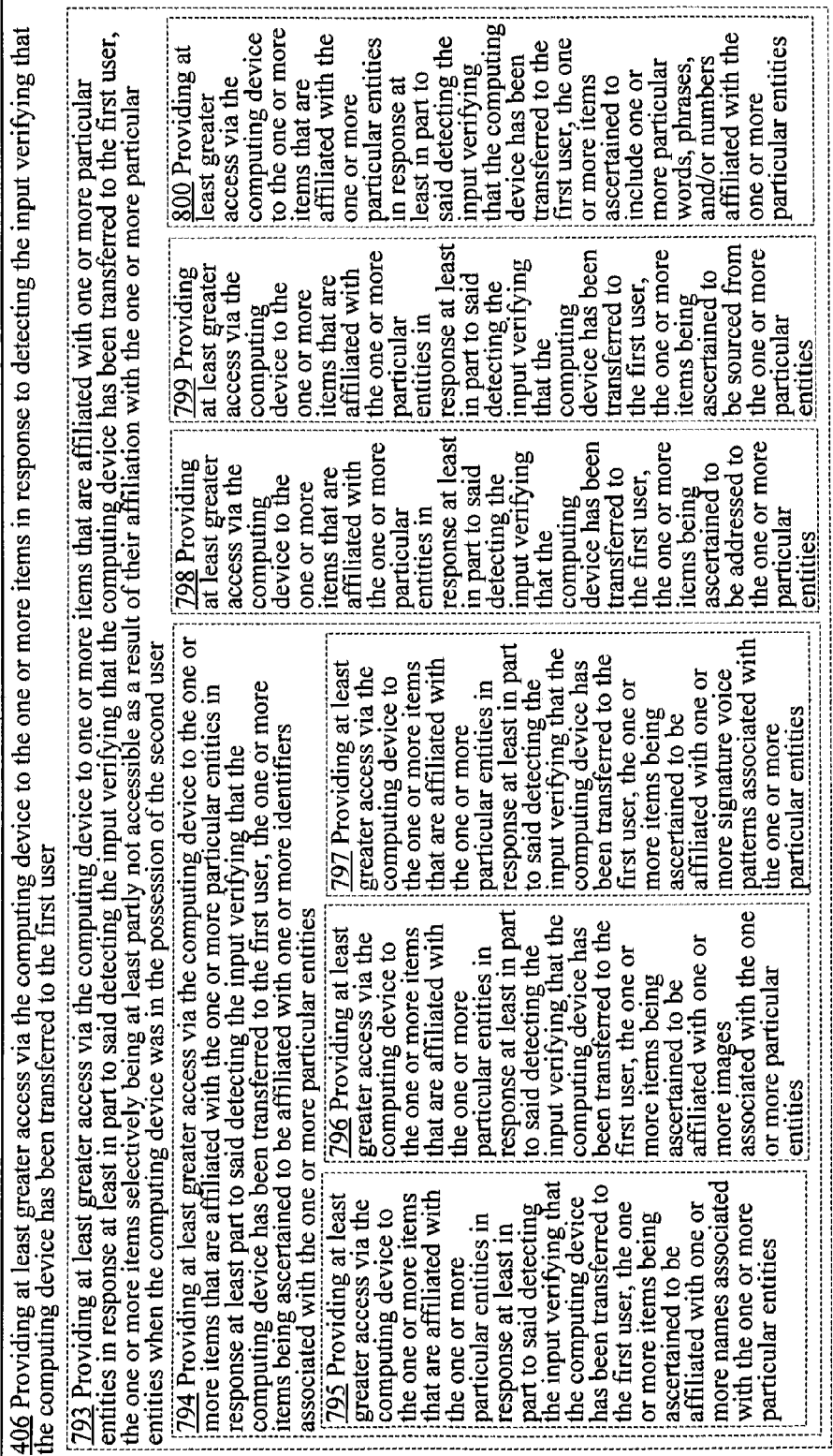
FIG. 7*e* is a high-level logic flowchart of a process depicting alternate implementations of the access providing operation 406 of FIG. 4.

Turning now to FIG. 7e, in various implementations, the access providing operation 406 may include an operation 793 for providing at least greater access via the computing device to one or more items that are affiliated with one or more particular entities in response at least in part to said detecting the input verifying that the computing device has been transferred to the first user, the one or more items selectively being at least partly not accessible as a result of their affiliation with the one or more particular entities when the computing device was in the possession of the second user. For instance, the access providing module 106* of the computing device 10* providing at least greater access via the computing device 10* to one or more items (e.g., messages) that are affiliated with one or more particular entities (e.g., the one or more items being sent by the one or more particular entities) in response at least in part to said detecting the input verifying that the computing device 10* has been transferred to the first user 20, the one or more items selectively being at least partly not accessible as a result of their affiliation with the one or more particular entities when the computing device 10* was in the possession of the second user 30.

As further illustrated in FIG. 7e, operation 793 may include one or more additional operations in various alternative implementations. For example, in some cases, operation 793 may actually include an operation 794 for providing at least greater access via the computing device to the one or more items that are affiliated with the one or more particular entities in response at least part to said detecting the input verifying that the computing device has been transferred to the first user, the one or more items being ascertained to be affiliated with one or more identifiers associated with the one or more particular entities. For instance, the access providing module 106* including the identifier affiliation ascertaining module 256 (see FIG. 3e) of the computing device 10* providing at least greater access via the computing device 10* to the one or more items that are affiliated with the one or more particular entities in response at least in part to said detecting the input verifying that the computing device 10* has been transferred to the first user 20, the one or more items being ascertained by the identifier affiliation ascertaining module 256 to be affiliated with one or more identifiers (e.g., telephone numbers, avatar name, etc.) associated with the one or more particular entities.

As further illustrated in FIG. 7e, in various implementations, operation 794 may include one or more additional operations including, for example, an operation 795 for providing at least greater access via the computing device to the one or more items that are affiliated with the one or more particular entities in response at least in part to said detecting the input verifying that the computing device has been transferred to the first user, the one or more items being ascertained to be affiliated with one or more names associated with the one or more particular entities. For instance, the access providing module 106* including the name affiliation ascertaining module 257 (see FIG. 3e) of the computing device 10* providing at least greater access via the computing device 10* to the one or more items that are affiliated with the one or more particular entities in response at least in part to said detecting the input verifying that the computing device 10* has been transferred to the first user 20, the one or more items being ascertained by name affiliation ascertaining module 257 to be affiliated with one or more names (e.g., legal names or usernames) associated with the one or more particular entities.

In the same or different implementations, operation 794 may additionally or alternatively include an operation 796 for providing at least greater access via the computing device to the one or more items that are affiliated with the one or more particular entities in response at least in part to said detecting the input verifying that the computing device has been transferred to the first user, the one or more items being ascertained to be affiliated with one or more images associated with the one or more particular entities. For instance, the access providing module 106* including the image affiliation ascertaining module 258 (see FIG. 3d) of the computing device 10* providing at least greater access via the computing device 10* to the one or more items that are affiliated with the one or more particular entities in response at least in part to said detecting the input verifying that the computing device 10* has been transferred to the first user 20, the one or more items being ascertained by the image affiliation ascertaining module 258 to be affiliated with one or more images (e.g., facial images) associated with the one or more particular entities.

In the same or different implementations, operation 794 may additionally or alternatively include an operation 797 for providing at least greater access via the computing device to the one or more items that are affiliated with the one or more particular entities in response at least in part to said detecting the input verifying that the computing device has been transferred to the first user, the one or more items being ascertained to be affiliated with one or more signature voice patterns associated with the one or more particular entities. For instance, the access providing module 106* including the voice pattern affiliation ascertaining module 259 (see FIG. 3e) of the computing device 10* providing at least greater access via the computing device 10* to the one or more items that are affiliated with the one or more particular entities in response at least in part to said detecting the input verifying that the computing device 10* has been transferred to the first user 20, the one or more items being ascertained by the voice pattern affiliation ascertaining module 259 to be affiliated with one or more signature voice patterns associated with the one or more particular entities (e.g., persons).

In some implementations, operation 793 for providing at least greater access via the computing device to one or more items that are affiliated with one or more particular entities in response at least in part to said detecting the input verifying that the computing device has been transferred to the first user, the one or more items selectively being at least partly not accessible as a result of their affiliation with the one or more particular entities when the computing device was in the possession of the second user may include an operation 798 for providing at least greater access via the computing device to the one or more items that are affiliated with the one or more particular entities in response at least in part to said detecting the input verifying that the computing device has been transferred to the first user, the one or more items being ascertained to be addressed to the one or more particular entities as depicted in FIG. 7e. For instance, the access providing module 106* including the address ascertaining module 260 (see FIG. 3e) of the computing device 10* providing at least greater access via the computing device 10* to the one or more items that are affiliated with the one or more particular entities in response at least in part to said detecting the input verifying that the computing device 10* has been transferred to the first user 20, the one or more items (e.g., draft messages from the first user 20) being ascertained by the address ascertaining module 260 to be addressed to the one or more particular entities.

In some implementations, operation 793 may additionally or alternatively include an operation 799 for providing at least greater access via the computing device to the one or more items that are affiliated with the one or more particular entities in response at least in part to said detecting the input verifying that the computing device has been transferred to the first user, the one or more items being ascertained to be sourced from the one or more particular entities. For instance, the access providing module 106* including the source ascertaining module 262 (see FIG. 3e) of the computing device 10* providing at least greater access via the computing device 10* to the one or more items that are affiliated with the one or more particular entities in response at least in part to said detecting the input verifying that the computing device 10* has been transferred to the first user 20, the one or more items being ascertained by the source ascertaining module 262 to be sourced from (e.g., generated from or received from) the one or more particular entities.

In some implementations, operation 696 may additionally or alternatively include an operation 800 for providing at least greater access via the computing device to the one or more items that are affiliated with the one or more particular entities in response at least in part to said detecting the input verifying that the computing device has been transferred to the first user, the one or more items ascertained to include one or more particular words, phrases, and/or numbers affiliated with the one or more particular entities. For instance, the access providing module 106* including the word/phrase/number inclusion ascertaining module 264 (see FIG. 3e) of the computing device 10* providing at least greater access via the computing device 10* to the one or more items that are affiliated with the one or more particular entities in response at least in part to said detecting the input verifying that the computing device 10* has been transferred to the first user 20, the one or more items ascertained by the word/phrase/number inclusion ascertaining module 264 to include one or more particular words, phrases, and/or numbers (e.g., nicknames, motto, subject headings, telephone numbers, and so forth) affiliated with the one or more particular entities.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware in one or more machines or articles of manufacture), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation that is implemented in one or more machines or articles of manufacture; or, yet again alternatively, the implementer may opt for some combination of hardware, software, and/or firmware in one or more machines or articles of manufacture. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware in one or more machines or articles of manufacture.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuitry (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuitry, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A computationally-implemented method, comprising:
   (a) acquiring one or more indicators that a computing device has been transferred to a first user from a second user, the first user having at least greater accessing rights than the second user to one or more items via the computing device;
   (b) detecting, in response to said acquiring, input that verifies that the computing device has been transferred to the first user, including at least requesting biometric input that verifies the one or more indicators that the computing device has been transferred to the first user, wherein the one or more indicators include at least one or more sensed movements of the computing device; and
   (c) providing at least greater access via the computing device to the one or more items in response to detecting the input verifying that the computing device has been transferred to the first user, including at least:
      (1) providing greater visual access via the computing device to the one or more items, including at least:
         (A) providing visually one or more visual representations of the one or more items via the computing device, the one or more visual representations not being previously presented through the computing device when the second user had possession of the computing device, including at least:
            (i) replacing visually through the computing device and in response to said detecting of the input one or more obfuscating locum tenentes of one or more true visual representations of the one or more items with the one or more true visual representations, the one or more obfuscating locum tenentes having been presented through the computing device when the second user had possession of the computing device; and
   wherein at least one of the acquiring, detecting, or providing is performed at least in part with one or more processing devices.

2. A computationally-implemented system, comprising:
   (a) circuitry for acquiring one or more indicators that a computing device has been transferred to a first user from a second user, the first user having at least greater accessing rights than the second user to one or more items via the computing device;
   (b) circuitry for detecting input that verifies that the computing device has been transferred to the first user, the circuitry for detecting being responsive at least in part to the circuitry for acquiring, including at least:
      (1) circuitry for soliciting the input that verifies the one or more indicators that the computing device has been transferred to the first user, including at least:
         (A) circuitry for requesting biometric input that verifies the one or more indicators that the computing device has been transferred to the first user, wherein the one or more indicators include at least one or more sensed movements of the computing device; and
   (c) circuitry for providing at least greater access via the computing device to the one or more items, the circuitry for providing being responsive at least in part to the circuitry for detecting, including at least:
(1) circuitry for providing greater visual access via the computing device to the one or more items, including at least:
(A) circuitry for providing visually one or more visual representations of the one or more items via the computing device, the one or more visual representations not being previously presented through the computing device when the second user had possession of the computing device, including at least:
(i) circuitry for replacing visually through the computing device and in response to said detecting of the input one or more obfuscating locum tenentes of one or more true visual representations of the one or more items with the one or more true visual representations, the one or more obfuscating locum tenentes having been presented through the computing device when the second user had possession of the computing device.

3. The computationally-implemented system of claim 2, wherein said circuitry for acquiring one or more indicators that a computing device has been transferred to a first user from a second user, the first user having at least greater accessing rights than the second user to one or more items via the computing device comprises:
circuitry for sensing the one or more indicators that suggest that the computing device has been transferred to the first user from the second user.

4. The computationally-implemented system of claim 3, wherein said circuitry for sensing one or more indicators that suggest that the computing device has been transferred to the first user from the second user comprises:
circuitry for sensing presence or absence of one or more visual cues in proximate vicinity of the computing device that suggest that the computing device has been transferred to the first user from the second user.

5. The computationally-implemented system of claim 4, wherein said circuitry for sensing presence or absence of one or more visual cues in proximate vicinity of the computing device that suggest that the computing device has been transferred to the first user from the second user comprises:
circuitry for sensing presence of at least one face in the proximate vicinity of the computing device that is determined to be associated with the first user.

6. The computationally-implemented system of claim 5, wherein said circuitry for sensing presence of at least one face in the proximate vicinity of the computing device that is determined to be associated with the first user comprises:
circuitry for sensing presence of the at least one face being at one or more specified locations relative to orientation of the computing device.

7. The computationally-implemented system of claim 4, wherein said circuitry for sensing presence or absence of one or more visual cues in proximate vicinity of the computing device that suggest that the computing device has been transferred to the first user from the second user comprises:
circuitry for sensing presence of a first face associated with the first user and a second face associated with the second user in the proximate vicinity of the computing device, the first face being visually sensed as being closer to the computing device than the second face.

8. The computationally-implemented system of claim 4, wherein said circuitry for sensing presence or absence of one or more visual cues in proximate vicinity of the computing device that suggest that the computing device has been transferred to the first user from the second user comprises:
circuitry for sensing presence of at least one eye in the proximate vicinity of the computing device that is determined as being associated with the first user.

9. The computationally-implemented system of claim 8, wherein said circuitry for sensing presence of at least one eye in the proximate vicinity of the computing device that is determined as being associated with the first user comprises:
circuitry for sensing presence of the at least one eye being at one or more specified locations relative to orientation of the computing device.

10. The computationally-implemented system of claim 4, wherein said circuitry for sensing presence or absence of one or more visual cues in proximate vicinity of the computing device that suggest that the computing device has been transferred to the first user from the second user comprises:
circuitry for sensing visually that the computing device has moved closer to the first user.

11. The computationally-implemented system of claim 10, wherein said circuitry for sensing visually that the computing device has moved closer to the first user comprises:
circuitry for sensing visually that the computing device has moved closer to one or more physical features associated with the first user.

12. The computationally-implemented system of claim 10, wherein said circuitry for sensing visually that the computing device has moved closer to the first user comprises:
circuitry for sensing visually that the computing device has moved closer to the first user and has moved away from the second user.

13. The computationally-implemented system of claim 3, wherein said circuitry for sensing one or more indicators that suggest that the computing device has been transferred to the first user from the second user comprises:
circuitry for sensing presence or absence of one or more audio cues in proximate vicinity of the computing device that suggest that the computing device has been transferred to the first user from the second user.

14. The computationally-implemented system of claim 13, wherein said circuitry for sensing presence or absence of one or more audio cues in proximate vicinity of the computing device that suggest that the computing device has been transferred to the first user from the second user comprises:
circuitry for sensing in the proximate vicinity of the computing device presence of a voice pattern that matches with a signature voice pattern of the first user.

15. The computationally-implemented system of claim 13, wherein said circuitry for sensing presence or absence of one or more audio cues in proximate vicinity of the computing device that suggest that the computing device has been transferred to the first user from the second user comprises:
circuitry for sensing audibly that the computing device has moved closer to the first user.

16. The computationally-implemented system of claim 15, wherein said circuitry for sensing audibly that the computing device has moved closer to the first user comprises:
circuitry for sensing audibly that the computing device has moved closer to the first user and has moved away from the second user.

17. The computationally-implemented system of claim 3, wherein said circuitry for sensing the one or more indicators that suggest that the computing device has been transferred to the first user from the second user comprises:
circuitry for sensing one or more movements of the computing device that suggest that the computing device has been transferred to the first user from the second user.

18. The computationally-implemented system of claim 17, wherein said circuitry for sensing one or more movements of the computing device that suggest that the computing device has been transferred to the first user from the second user comprises:
   circuitry for sensing that the computing device no longer has a particular tilt orientation that the computing device was detected as having when the computing device was possessed by the second user.

19. The computationally-implemented system of claim 17, wherein said circuitry for sensing one or more movements of the computing device that suggest that the computing device has been transferred to the first user from the second user comprises:
   circuitry for sensing that the computing device is at least no longer at a particular spatial location that the computing device was detected as being located at when the computing device was possessed by the second user.

20. The computationally-implemented system of claim 17, wherein said circuitry for sensing one or more movements of the computing device that suggest that the computing device has been transferred to the first user from the second user comprises:
   circuitry for sensing that the computing device has been spin rotated from a first orientation associated with the computing device when the computing device was possessed by the second user to a second orientation that at least suggests that the computing device has been transferred between two users.

21. The computationally-implemented system of claim 17, wherein said circuitry for sensing one or more movements of the computing device that suggest that the computing device has been transferred to the first user from the second user comprises:
   circuitry for sensing that the computing device is vibrating in a manner that matches with a signature vibration pattern associated with the first user.

22. The computationally-implemented system of claim 17, wherein said circuitry for sensing one or more movements of the computing device that suggest that the computing device has been transferred to the first user from the second user comprises:
   circuitry for sensing that the computing device has exhibited one or more three-dimensional movements that suggest that the computing device has been transferred between two users.

23. The computationally-implemented system of claim 3, wherein said circuitry for sensing one or more indicators that suggest that the computing device has been transferred to the first user from the second user comprises:
   circuitry for sensing the one or more indicators by sensing multiple types of indicators that when sensed suggest that the computing device has been transferred to the first user from the second user.

24. The computationally-implemented system of claim 23, wherein said circuitry for sensing the one or more indicators by sensing multiple types of indicators that when sensed suggest that the computing device has been transferred to the first user from the second user comprises:
   circuitry for sensing presence or absence of one or more visual cues in proximate vicinity of the computing device and sensing one or more movements of the computing device that suggest that the computing device has been transferred to the first user from the second user.

25. The computationally-implemented system of claim 2, wherein said circuitry for requesting biometric input that verifies the one or more indicators that the computing device has been transferred to the first user, wherein the one or more indicators include at least one or more sensed movements of the computing device comprises:
   circuitry for requesting audio input that verifies that the computing device has been transferred to the first user.

26. The computationally-implemented system of claim 25, wherein said circuitry for requesting audio input that verifies that the computing device has been transferred to the first user comprises:
   circuitry for requesting one or more words to be spoken in order to audibly verify that the computing device has been transferred to the first user.

27. The computationally-implemented system of claim 2, wherein said circuitry for requesting biometric input that verifies the one or more indicators that the computing device has been transferred to the first user, wherein the one or more indicators include at least one or more sensed movements of the computing device comprises:
   circuitry for requesting visual input that verifies that the computing device has been transferred to the first user that has at least greater access rights than the second user to the one or more items via the computing device.

28. The computationally-implemented system of claim 27, wherein said circuitry for requesting visual input that verifies that the computing device has been transferred to the first user that has at least greater access rights than the second user to the one or more items via the computing device comprises:
   circuitry for requesting a face to be brought closer to the computing device.

29. The computationally-implemented system of claim 27, wherein said circuitry for requesting visual input that verifies that the computing device has been transferred to the first user that has at least greater access rights than the second user to the one or more items via the computing device comprises:
   circuitry for requesting one or more eyes to be brought closer to the computing device.

30. The computationally-implemented system of claim 2, wherein said circuitry for soliciting the input that verifies the one or more indicators that the computing device has been transferred to the first user comprises:
   circuitry for requesting a gesture to be executed that verifies that the computing device has been transferred to the first user.

31. The computationally-implemented system of claim 30, wherein said circuitry for requesting a gesture to be executed that verifies that the computing device has been transferred to the first user comprises:
   circuitry for requesting the gesture to be executed through a touch screen in order to verify that the computing device has been transferred to the first user.

32. The computationally-implemented system of claim 31, wherein said circuitry for requesting the gesture to be executed through a touch screen in order to verify that the computing device has been transferred to the first user comprises:
   circuitry for requesting the gesture to be executed through a touch screen using one or more fingers.

33. The computationally-implemented system of claim 2, wherein said circuitry for providing at least greater access via the computing device to the one or more items, the circuitry for providing being responsive at least in part to the circuitry for detecting comprises:
   circuitry for providing at least greater access to the one or more items by providing greater access to the one or more items that were at least not partially accessible by the second user when the second user had possession of the computing device.

34. The computationally-implemented system of claim 2, wherein said circuitry for providing at least greater access via the computing device to the one or more items, the circuitry for providing being responsive at least in part to the circuitry for detecting comprises:
- circuitry for providing at least greater access to the one or more items by providing a first level of access to the one or more items, the first level of access being a greater level of access relative to a second level of access to the one or more items enjoyed by the second user when the second user had possession of the computing device.

35. The computationally-implemented system of claim 2, wherein said circuitry for providing at least greater access via the computing device to the one or more items, the circuitry for providing being responsive at least in part to the circuitry for detecting comprises:
- circuitry for providing greater audio access via the computing device to the one or more items.

36. The computationally-implemented system of claim 35, wherein said circuitry for providing greater audio access via the computing device to the one or more items comprises:
- circuitry for providing audibly one or more audio representations of the one or more items via the computing device, the one or more audio representations not being previously presented through the computing device when the second user had possession of the computing device.

37. The computationally-implemented system of claim 36, wherein said circuitry for providing audibly one or more audio representations of the one or more items via the computing device, the one or more audio representations not being previously presented through the computing device when the second user had possession of the computing device comprises:
- circuitry for replacing audibly through the computing device and in response to said detecting of the input one or more obfuscating locum tenentes of one or more true audio representations of the one or more items with the one or more true audio representations, the one or more obfuscating locum tenentes having been presented through the computing device when the second user had possession of the computing device.

38. The computationally-implemented system of claim 2, wherein said circuitry for providing at least greater access via the computing device to the one or more items, the circuitry for providing being responsive at least in part to the circuitry for detecting comprises:
- circuitry for presenting, via the computing device and in response at least in part to said detecting the input verifying that the computing device has been transferred to the first user, the one or more items in one or more formats that allow one or more editorial actions to be executed on one or more parts of the one or more items, the one or more editorial actions not previously available to be executed on the one or more parts of the one or more items when the second user was in possession of the computing device.

39. The computationally-implemented system of claim 2, wherein said circuitry for providing at least greater access via the computing device to the one or more items, the circuitry for providing being responsive at least in part to the circuitry for detecting comprises:
- circuitry for presenting, via the computing device and in response at least in part to said detecting the input verifying that the computing device has been transferred to the first user, the one or more items in one or more formats that allow one or more functionalities of the one or more items to be executed, the one or more functionalities of the one or more items not previously available for execution when the second user was in possession of the computing device.

40. The computationally-implemented system of claim 2, wherein said circuitry for providing at least greater access via the computing device to the one or more items, the circuitry for providing being responsive at least in part to the circuitry for detecting comprises:
- circuitry for providing at least greater access via the computing device to one or more items ascertained to be sourced from one or more particular entities in response at least in part to said detecting the input verifying that the computing device has been transferred to the first user, the one or more items selectively being at least partly not accessible as a result of their ascertainment as being sourced from the one or more particular entities when the computing device was in the possession of the second user.

41. The computationally-implemented system of claim 40, wherein circuitry for providing at least greater access via the computing device to one or more items ascertained to be sourced from one or more particular entities in response at least in part to said detecting the input verifying that the computing device has been transferred to the first user, the one or more items selectively being at least partly not accessible as a result of their ascertainment as being sourced from the one or more particular entities when the computing device was in the possession of the second user comprises:
- circuitry for providing at least greater access via the computing device to the one or more items ascertained to be sourced from the one or more particular entities in response at least in part to said detecting the input verifying that the computing device has been transferred to the first user, the one or more items being one or more messages ascertained to be sourced from the one or more particular entities.

42. The computationally-implemented system of claim 40, wherein said circuitry for providing at least greater access via the computing device to one or more items ascertained to be sourced from one or more particular entities in response at least in part to said detecting the input verifying that the computing device has been transferred to the first user, the one or more items selectively being at least partly not accessible as a result of their ascertainment as being sourced from the one or more particular entities when the computing device was in the possession of the second user comprises:
- circuitry for providing at least greater access via the computing device to the one or more items ascertained to be sourced from the one or more particular entities in response at least in part to said detecting the input verifying that the computing device has been transferred to the first user, the one or more items ascertained to include at least one of particular words, phrases, or numbers affiliated with the one or more particular entities.

43. The computationally-implemented system of claim 2, wherein said circuitry for acquiring one or more indicators that a computing device has been transferred to a first user from a second user, the first user having at least greater accessing rights than the second user to one or more items via the computing device comprises:
- circuitry for sensing the one or more movements of the computing device including at least circuitry for sensing at least one of inertia, acceleration or gyroscopic motion of the computing device.

44. A computationally-implemented system, comprising:
(a) means for acquiring one or more indicators that a computing device has been transferred to a first user from a second user, the first user having at least greater accessing rights than the second user to one or more items via the computing device;
(b) means for detecting input that verifies that the computing device has been transferred to the first user, the circuitry means for detecting being responsive at least in part to the means for acquiring, including at least:
   (1) means for requesting biometric input that verifies the one or more indicators that the computing device has been transferred to the first user, wherein the one or more indicators include at least one or more sensed movements of the computing device; and
(c) means for providing at least greater access via the computing device to the one or more items, the means for providing being responsive at least in part to the means for detecting, including at least:
   (1) means for providing greater visual access via the computing device to the one or more items, including at least:
      (A) means for providing visually one or more visual representations of the one or more items via the computing device, the one or more visual representations not being previously presented through the computing device when the second user had possession of the computing device, including at least:
         (i) means for replacing visually through the computing device and in response to said detecting of the input one or more obfuscating locum tenentes of one or more true visual representations of the one or more items with the one or more true visual representations, the one or more obfuscating locum tenentes having been presented through the computing device when the second user had possession of the computing device.

* * * * *

UNITED STATES PATENT AND TRADEMARK OFFICE
CERTIFICATE OF CORRECTION

PATENT NO. : 9,317,111 B2
APPLICATION NO. : 13/200743
DATED : April 19, 2016
INVENTOR(S) : Royce A. Levien et al.

Page 1 of 1

It is certified that error appears in the above-identified patent and that said Letters Patent is hereby corrected as shown below:

In the Claims

Column 59, Line 9:

"circuitry means for detecting" should be
-- means for detecting --

Signed and Sealed this
Nineteenth Day of July, 2016

Michelle K. Lee
*Director of the United States Patent and Trademark Office*